(12) United States Patent  
Breternitz et al.

(10) Patent No.: US 9,152,532 B2
(45) Date of Patent: Oct. 6, 2015

(54) SYSTEM AND METHOD FOR CONFIGURING A CLOUD COMPUTING SYSTEM WITH A SYNTHETIC TEST WORKLOAD

(75) Inventors: Mauricio Breternitz, Austin, TX (US); Keith A. Lowery, Garland, TX (US); Patryk Kaminski, Austin, TX (US); Anton Chernoff, Harvard, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 206 days.

(21) Appl. No.: 13/568,459

(22) Filed: Aug. 7, 2012

(65) Prior Publication Data

US 2014/0047272 A1    Feb. 13, 2014

(51) Int. Cl.
*G06F 11/00* (2006.01)
*G06F 11/34* (2006.01)
*G06F 11/26* (2006.01)
*G06F 9/50* (2006.01)

(52) U.S. Cl.
CPC .......... *G06F 11/3495* (2013.01); *G06F 9/5072* (2013.01); *G06F 11/26* (2013.01); *G06F 11/3414* (2013.01); *G06F 11/3433* (2013.01)

(58) Field of Classification Search
CPC ... G06F 11/26; G06F 11/263; G06F 11/2733; G06F 11/277
USPC ...................................................... 714/32, 33
See application file for complete search history.

(56) References Cited

U.S. PATENT DOCUMENTS

| | | | |
|---|---|---|---|
| 7,228,458 B1* | 6/2007 | Kesavan ........................... | 714/41 |
| 8,069,023 B1* | 11/2011 | Frailong et al. ................. | 703/13 |
| 8,601,000 B1 | 12/2013 | Stefani | |
| 2001/0039497 A1 | 11/2001 | Hubbard | |
| 2005/0038989 A1 | 2/2005 | Esfahany | |
| 2005/0060391 A1 | 3/2005 | Kaminsky | |
| 2007/0168733 A1* | 7/2007 | Devins et al. .................... | 714/33 |
| 2007/0174429 A1 | 7/2007 | Mazzaferri | |
| 2007/0282567 A1* | 12/2007 | Dawson et al. ............... | 702/186 |
| 2008/0097960 A1* | 4/2008 | Dias et al. ......................... | 707/2 |

(Continued)

FOREIGN PATENT DOCUMENTS

WO    WO 0173545    10/2001

OTHER PUBLICATIONS

PCT International Searching Authority, International Search Report and Written Opinion for PCT Application No. PCT/US2013/052994, Oct. 28, 2013.

(Continued)

*Primary Examiner* — Joshua Lohn
(74) *Attorney, Agent, or Firm* — Faegre Baker Daniels LLP

(57) ABSTRACT

The present disclosure relates to a method and system for configuring a computing system, such as a cloud computing system. A method includes selecting, based on a user selection received via a user interface, a workload for execution on a cluster of nodes of the computing system. The workload is selected from a plurality of available workloads including an actual workload and a synthetic test workload. The method further includes configuring the cluster of nodes of the computing system to execute the selected workload such that processing of the selected workload is distributed across the cluster of nodes. The synthetic test workload may be generated by a code synthesizer based on a set of user-defined workload parameters provided via a user interface that identify execution characteristics of the synthetic test workload.

24 Claims, 45 Drawing Sheets

(56) References Cited

U.S. PATENT DOCUMENTS

| | | | |
|---|---|---|---|
| 2008/0235454 | A1 | 9/2008 | Duron |
| 2008/0313330 | A1 | 12/2008 | Miller |
| 2009/0158074 | A1 | 6/2009 | Oh |
| 2011/0131335 | A1 | 6/2011 | Spaltro |
| 2012/0017112 | A1* | 1/2012 | Broda et al. ............. 714/4.4 |
| 2012/0137002 | A1 | 5/2012 | Ferris |
| 2012/0197973 | A1 | 8/2012 | Tukol |
| 2013/0054792 | A1* | 2/2013 | Sharaf ................. 709/224 |
| 2014/0047272 | A1* | 2/2014 | Breternitz et al. ........... 714/32 |

OTHER PUBLICATIONS

Ganesan, Karthik et al., *Synthesizing Memory-Level Parallelism Aware Miniature Clones for SPEC CPU2006 ft and ImplantBench Workloads*, 2010 International Symposium on Performance Analysis of Systems and Software, Mar. 2010.

Ren, Manman et al., *A Tuning Framework for Software-Managed Memory Hierarchies*, PACT08, Oct. 25- 29, 2008, Toronto, Ontario Canada, Copyright 2008.

Ferdman, Michael et al., *Clearing the Clouds a Study of Emerging Scale-out Workloads on Modern Hardware*, ASPLOS '12 Mar. 3-7, 2012, London, England, UK, Copyright 2012.

Herodotou, Herodotos et al., *Profiling, What-if Analysis, and Cost-based Optimization of MapReduce Programs*, The $37^{th}$ International Conference on Very Large Data Bases, Aug. 29-Sep. 3, 2011, Seattle, Washington, Proceedings of the VLDB Endowment, vol. 4, No. 11, Copyright 2011.

* cited by examiner

Cloud Computing Configuration System ⟵ 200

▸ Authentication & Settings Library ⟵ 204

▾ Instances 250

| Instances | Instance Types | Other Instances Settings |

⟵ 252    ⟵ 254

[Add] [Delete]

⟵ 264

| | ID | Name | Memory | VCPUs | Storage | Quota | RXTX Quota | RXTX Cap |
|---|---|---|---|---|---|---|---|---|
| ○ | 1 | t1.micro | 613 MB | 1 | 0 GB | 0 GB | 0 GB | 0 GB |
| ○ | 2 | m1.small | 1741 MB | 1 | 160 GB | 0 GB | 0 GB | 0 GB |
| ○ | 3 | m1.large | 7680 MB | 4 | 850 GB | 0 GB | 0 GB | 0 GB |
| ○ | 4 | m1.xlarge | 15360 MB | 8 | 1690 GB | 0 GB | 0 GB | 0 GB |
| ○ | 5 | m2.xlarge | 17510 MB | 2 | 420 GB | 0 GB | 0 GB | 0 GB |
| ○ | 6 | m2.2xlarge | 35021 MB | 4 | 850 GB | 0 GB | 0 GB | 0 GB |
| ○ | 7 | m2.4xlarge | 70042 MB | 8 | 1690 GB | 0 GB | 0 GB | 0 GB |
| ○ | 8 | c1.medium | 1741 MB | 2 | 350 GB | 0 GB | 0 GB | 0 GB |
| ○ | 9 | c1.xlarge | 7168 MB | 8 | 1690 GB | 0 GB | 0 GB | 0 GB |

⟵ 265

▸ Network Configuration

▸ Workload Container Configuration

[Load Settings From File] [Save Settings To File]
☑ Include authentication data

FIG. 9

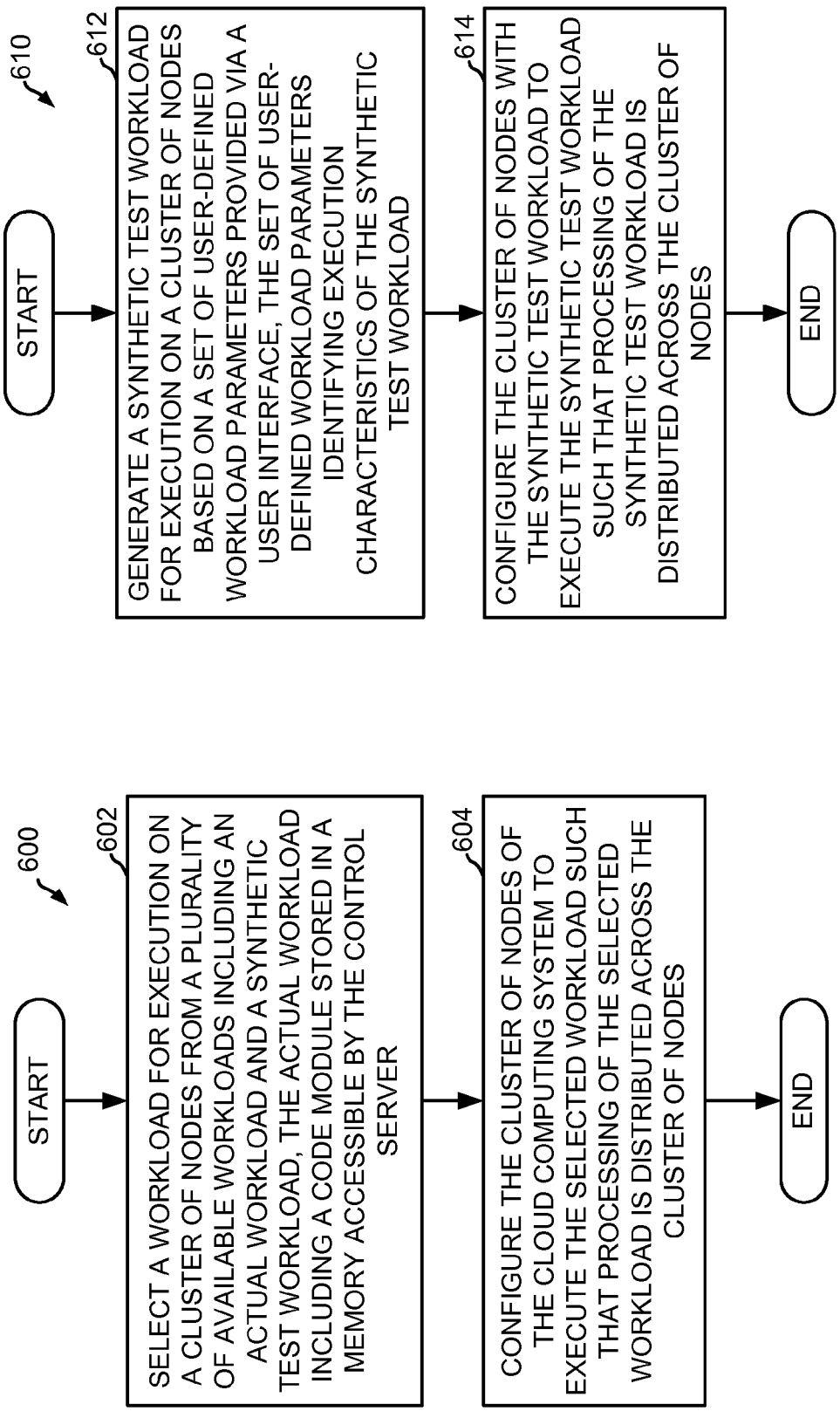

```
1   {
2   Groups: [
3   {
4     Group: A,
5     Destinations: [
6       { Group: A,
7         Latency: L1, Bandwitdh: B1, ..., ErrorRate: E1 },
8       { Group: B,
9         Latency: L2, Bandwitdh: B2, ..., ErrorRate: E2 },
10      { Group: M,
11        Latency: L3, Bandwitdh: B3, ..., ErrorRate: E3 },
12    ]
13  },
14  {
15    Group: B,
16    Destinations: [
17      { Group: A,
18        Latency: L4, Bandwitdh: B4, ..., ErrorRate: E4 },
19      { Group: B,
20        Latency: L5, Bandwitdh: B5, ..., ErrorRate: E5 },
21      { Group: M,
22        Latency: L6, Bandwitdh: B6, ..., ErrorRate: E6 },
23    ]
24  },
25  ...,
26  {
27    Group: M,
28    Destinations: [
29      { Group: A,
30        Latency: L7, Bandwitdh: B7, ..., ErrorRate: E7 },
31      { Group: B,
32        Latency: L8, Bandwitdh: B8, ..., ErrorRate: E8 },
33      { Group: M,
34        Latency: L9, Bandwitdh: B9, ..., ErrorRate: E9 },
35    ]
36  }
37  ]}
```

SYSTEM AND METHOD FOR CONFIGURING A CLOUD COMPUTING SYSTEM WITH A SYNTHETIC TEST WORKLOAD

CROSS-REFERENCE TO RELATED APPLICATIONS

This application is related to the following co-pending applications, all owned by the instant assignee and filed on even date herewith: U.S. application Ser. No. 13/568,395 entitled "SYSTEM AND METHOD FOR ALLOCATING A CLUSTER OF NODES FOR A CLOUD COMPUTING SYSTEM BASED ON HARDWARE CHARACTERISTICS," inventors Mauricio Breternitz et al.; U.S. application Ser. No. 12/568,432 entitled "SYSTEM AND METHOD FOR TUNING A CLOUD COMPUTING SYSTEM," inventors Mauricio Breternitz et al.; U.S. application Ser. No. 12/568,441 entitled "SYSTEM AND METHOD FOR EMULATING A DESIRED NETWORK CONFIGURATION IN A CLOUD COMPUTING SYSTEM," inventors Mauricio Breternitz et al.; U.S. application Ser. No. 13/568,455 entitled "SYSTEM AND METHOD FOR MODIFYING A HARDWARE CONFIGURATION OF A CLOUD COMPUTING SYSTEM," inventors Mauricio Breternitz et al.; U.S. application Ser. No. 13/568,368 entitled "SYSTEM AND METHOD FOR CONFIGURING CLOUD COMPUTING SYSTEMS," inventors Mauricio Breternitz et al.; and U.S. application Ser. No. 13/568,463 entitled "SYSTEM AND METHOD FOR CONFIGURING BOOT-TIME PARAMETERS OF NODES OF A CLOUD COMPUTING SYSTEM," inventors Mauricio Breternitz et al., the disclosures of which are all expressly incorporated by reference herein.

FIELD OF THE DISCLOSURE

The present disclosure is generally related to the field of computing systems, and more particularly to methods and systems for configuring a cloud computing system with a synthetic test workload and for analyzing the performance of the cloud computing system based on execution of the synthetic test workload.

BACKGROUND

Cloud computing involves the delivery of hosted services over a network, such as the Internet, for example. Cloud computing systems provide for the delivery of computing capacity and storage capacity as a service to end users. Cloud computing systems include multiple servers, or "nodes", operating on a distributed communication network, and each node includes local processing capability and memory. For example, each node of the cloud computing system includes at least one processing device for providing computing capability and a memory for providing storage capacity. Rather than running an application locally or storing data locally, a user may run the application or store data remotely on the cloud or "cluster" of nodes. End users may access cloud-based applications through a web browser or some other software application on a local computer, for example, while the software application and/or data related to the software application are stored and/or executed on the cloud nodes at a remote location. Cloud computing resources are typically allocated to the end user on demand, with the cloud computing system cost corresponding to the actual amount of resources utilized by the end user.

Computing tasks are distributed across multiple nodes of the cloud computing system in the form of a workload. The nodes operate to share processing of the workload. A workload (also referred to as a "kernel") includes a computing job or task that is performed and executed on the cloud of nodes. A workload, which comprises a collection of software or firmware code and any necessary data, includes any application or program or a portion of an application or program that is executed on the cluster of nodes. For example, one exemplary workload is an application that implements one or more algorithms. Exemplary algorithms include, for example, clustering, sorting, classifying, or filtering a dataset. Other exemplary workloads include service-oriented applications that are executed to provide a computing service to an end-user. In some embodiments, a workload includes a single application that is cloned and executed on multiple nodes simultaneously. A load balancer distributes requests to be executed with the workload across the cluster of nodes such that the nodes share the processing load associated with the workload. The cluster of nodes collaborates results of an execution of the workload to produce a final result.

A workload container, which comprises one or more processors of a node executing a workload container module (e.g., software or firmware code), operates on each node. The workload container is an execution framework for workloads to provide a software environment that initiates and orchestrates the execution of workloads on a cluster of nodes. Workload containers typically provide an execution framework for a particular class of workloads on the cluster of nodes. The workload container configures the associated node to operate as a node of the cloud such that the node executes the workload, shares the results of the workload execution with other nodes of the cloud, and collaborates and communicates with other nodes of the cloud. In one embodiment, the workload container includes application program interfaces (API's) or XML-based interfaces for interfacing with other nodes as well as with other applications and hardware of the associated node.

One exemplary workload container is Apache Hadoop, which is Java-based, that provides a map-reduce framework and a distributed file system (HDFS) for map-reduce workloads. A cluster of nodes operating with the Hadoop workload container typically includes a master node as well as multiple worker nodes. The Hadoop workload container coordinates the assignment of the master or worker status to each node and informs each node that it is operating in a cloud. The master node tracks job (i.e., workload) initiation and completion as well as file system metadata. In the "map" phase of the map-reduce framework, a task or workload is partitioned into multiple portions (i.e., multiple groups of one or more processing threads), and the portions of the workload are distributed to the worker nodes that process the threads and the associated input data. In the "reduce" phase, the output from each worker node is collected and combined to produce a final result or answer. The distributed file system (HDFS) of Hadoop is utilized to store data and to communicate data between the worker nodes. The HDFS file system supports data replication to increase the likelihood of data reliability by storing multiple copies of the data and files.

Setting up or configuring a cluster of nodes in prior art cloud computing platforms is a complex process that requires a steep learning curve. The cloud software and workloads must be individually deployed to each node, and any configuration changes must also be deployed to each node individually. Analyzing the performance of the cluster of nodes and optimizing the cloud set-up involves multiple independent variables and is often time-consuming, requiring ad-hoc interfaces adapted for monitoring and analyzing particular applications. In particular, the cloud operator or engineer must create commands to obtain data about how the workload is running as well as to obtain the actual results of the workload. Additionally, such data is in a format that is specific to the system configuration at hand, and the data must be integrated by the cloud operator or engineer in a form that is suitable for performance analysis. The cloud operator or engineer is required to learn specific details of the cloud mechanism, any networking issues, system administration-related tasks, as well as deployment and data formats of the available performance analysis tools. Further, monitoring and analyzing performance of workloads on the cluster of nodes is complex, time consuming, and dependent on the particular cloud configuration. The cloud operator or engineer is not always privy to all of the configuration and hardware information for the particular cloud system, making accurate performance analysis difficult.

Several cloud computing platforms are available today, including Amazon Web Services (AWS) and OpenStack, for example. Amazon's AWS, which includes Elastic Compute Cloud (EC2), rents a cluster of nodes (servers) to an end-user for use as a cloud computing system. AWS allows the user to allocate a cluster of nodes and to execute a workload on the cluster of nodes. AWS limits the user to execute workloads only on Amazon-provided server hardware with various restrictions, such as requiring specific hardware configurations and software configurations. OpenStack allows a user to build and manage a cluster of nodes on user-provided hardware. AWS and OpenStack lack a mechanism for quickly configuring and deploying workload and workload container software to each node, for modifying network parameters, and for aggregating performance data from all nodes of the cluster.

A known method of testing the performance of a particular local processor includes creating a synthetic, binary code based on user-specified parameters that can be executed by the local processor. However, generation of the binary synthetic code requires the user to hard-code the user-specified parameters, requiring significant development time and prior knowledge of the architecture of the target processor. Such hard-coded synthetic code must be written to target a particular instruction set architecture (ISA) (e.g. x86) and a particular microarchitecture of the targeted processor. Instruction set architecture refers to the component of computer architecture that identifies data types/formats, instructions, data block size, processing registers, memory addressing modes, memory architecture, interrupt and exception handling, I/O, etc. Microarchitecture refers to the component of computer architecture that identifies the data paths, data processing elements (e.g., logic gates, arithmetic logic units (ALUs), etc.), data storage elements (e.g., registers, cache, etc.), etc., and how the processor implements the instruction set architecture. As such, the synthetic code must be re-engineered with modified or new hard-coded parameters and instructions to execute variations of an instruction set architecture and different microarchitectures of other processor(s). As such, such hard-coded synthetic code is not suitable for testing multiple nodes of a cloud computing system.

Another method of testing the performance of a local processor is to execute an industry-standard workload or trace, such as a workload provided by the Standard Performance Evaluation Corporation (SPEC), to compare the processor's performance with a performance benchmark. However, executing the entire industry-standard workload often requires large amounts of simulation time. Extracting relevant, smaller traces from the workload for execution by the processor may reduce simulation time but also requires extra engineering effort to identify and extract the relevant traces. Further, the selection of an industry-standard workload, or the extraction of smaller traces from a workload, must be repeated for distinct architectural configurations of the processor(s).

Current cloud systems that deliver computing capacity and storage capacity as a service to end users lack a mechanism to change the boot-time configuration of each node of the cluster of nodes of the cloud system. For example, boot-time configuration changes must be hard-coded onto each node of the cloud by an engineer or programmer in order to modify boot-time parameters of the nodes, which requires considerable time and is cumbersome. Further, the engineer must have detailed knowledge of the hardware and computer architecture of the cluster of node prior to writing the configuration code.

Typical cloud systems that deliver computing capacity and storage capacity as a service to end users lack a mechanism to allow a user to specify and to modify a network configuration of the allocated cluster of nodes. In many cloud systems, users can only request a general type of nodes and have little or no direct control over the network topology, i.e., the physical and logical network connectivity of the nodes, and the network performance characteristics of the requested nodes. Amazon AWS, for example, allows users to select nodes that are physically located in a same general region of the country or world (e.g., Eastern or Western United States, Europe, etc.), but the network connectivity of the nodes and the network performance characteristics of the nodes are not selectable or modifiable. Further, some of the selected nodes may be physically located far away from other selected nodes, despite being in the same general region of the country or even in the same data center. For example, the nodes allocated by the cloud system may be located on separate racks in a distributed data center that are physically far apart, resulting in decreased or inconsistent network performance between nodes.

Similarly, in typical cloud systems, the end user has limited or no control over the actual hardware resources of the node cluster. For example, when allocating nodes, the user can only request nodes of a general type. Each available type of node may be classified by the number of the CPU(s) of the node, the available memory, available disk space, and general region of the country or world where the node is located. However, the allocated node may not have the exact hardware characteristics as the selected node type. Selectable node types are coarse classifications. For example, the node types may include small, medium, large, and extra large corresponding to the amount of system memory and disk space as well as the number of processing cores of the node. However, even with nodes selected having a same general type, the actual computing capacity and storage capacity of the nodes allocated by the system may vary. For example, the available memory and disk space as well as operating frequency and other characteristics may vary or fall within a range of values. For example, a "medium" node may include any node having a system memory of 1500 MB to 5000 MB and storage capacity of 200 GB to 400 GB. As such, the user is not always privy to the actual hardware configuration of the allocated nodes. Further, even among nodes having the same number of processors and memory/disk space, other hardware characteristics of these nodes may vary. For example, similar nodes vary based on the operating frequency of the nodes, the size of the cache, a 32-bit architecture versus a 64-bit architecture, the manufacturer of the nodes, the instruction set architecture, etc., and user has no control over these characteristics of the selected nodes.

Often the user does not have a clear understanding of the specific hardware resources required by his application or workload. The difficulty in setting up the node cluster to execute the workload results in the user having limited opportunity to try different hardware configurations. Combined with the user's lack of knowledge of the actual hardware resources of the allocated nodes, this often results in unnecessary user costs for under-utilized hardware resources. Various monitoring tools are available that can measure the CPU, memory, and disk and network utilization of a single physical processing machine. However, current cloud systems do not provide a mechanism to allow a user to deploy these monitoring tools to the nodes of the cluster to monitor hardware usage. As such, actual hardware utilization during workload execution is unknown to the user. Most public cloud services offer an accounting mechanism that can provide basic information about the cost of the requested hardware resources used by the user while running a workload. However, such mechanisms only provide basic information about the costs of the requested hardware resources, and do not identify the actual hardware resources used during workload execution.

In many cloud systems, a limited number of configuration parameters are available to the user for adjusting and improving a configuration of the node cluster. For example, a user may only be able to select different nodes having different general node types to alter the cloud configuration. Further, each configuration change must be implemented manually by the user by selecting different nodes for the node cluster and starting the workload with the different nodes. Such manual effort to apply configuration changes and to test the results is costly and time consuming. Further, the various performance monitoring tools that are available for testing node performance are typically adapted for a single physical processing machine, and current cloud systems lack a mechanism to allow a user to deploy these monitoring tools to the nodes of the cluster to test performance of the node cluster with the different configurations.

Therefore, a need exists for methods and systems for automating the creation, deployment, provision, execution, and data aggregation of workloads on a node cluster of arbitrary size. A need further exists for methods and systems to quickly configure and deploy workload and workload container software to each node and to aggregate and analyze workload performance data from all nodes of the cluster. A need further exists for methods and systems to test the performance of multiple nodes of a cloud computing system and to provide automated configuration tuning of the cloud computing system based on the monitored performance. A need further exists for methods and systems to generate retargetable synthetic test workloads for execution on the cloud computing system for testing node processors having various computer architectures. A need further exists for methods and systems that provide for the modification of a boot-time configuration of nodes of a cloud computing system. A need further exists for methods and systems that facilitate the modification of a network configuration of the cluster of nodes of the cloud system. A need further exists for methods and systems that allow for the automated selection of suitable nodes for the cluster of nodes based on a desired network topology, a desired network performance, and/or a desired hardware performance of the cloud system. A need further exists for methods and systems to measure the usage of hardware resources of the node cluster during workload execution and to provide hardware usage feedback to a user and/or automatically modify the node cluster configuration based on the monitored usage of the hardware resources.

SUMMARY OF EMBODIMENTS OF THE DISCLOSURE

In an exemplary embodiment of the present disclosure, a method of configuring a computing system carried out by one or more computing devices is provided. The method includes selecting, based on a user selection received via a user interface, a workload for execution on a cluster of nodes of the computing system. The workload is selected from a plurality of available workloads including an actual workload and a synthetic test workload. The actual workload includes a code module stored in memory accessible by the one or more computing devices. The method further includes configuring the cluster of nodes of the computing system to execute the selected workload such that processing of the selected workload is distributed across the cluster of nodes.

Among other advantages, some embodiments may allow for the selection and generation of synthetic test workloads used, for example, in testing the performance of the computing system based on desired characteristics of a workload. The synthetic test workload is retargetable such that alternative computer architectures of a computing system may be targeted. Other advantages will be recognized by those of ordinary skill in the art.

In another exemplary embodiment of the present disclosure, a computing configuration system is provided. The system includes a workload configurator operative to select, based on a user selection received via a user interface, a workload for execution on a cluster of nodes of a computing system. The workload is selected from a plurality of available workloads including an actual workload and a synthetic test workload. The actual workload includes a code module stored in a memory accessible by the one or more computing devices. The system further includes a node configurator operative to configure the cluster of nodes of the computing system to execute the selected workload such that processing of the selected workload is distributed across the cluster of nodes.

In yet another exemplary embodiment of the present disclosure, a method of configuring a computing system carried out by one or more computing devices is provided. The method includes generating, by a code synthesizer of the one or more computing devices, a synthetic test workload for execution on a cluster of nodes of the computing system based on a set of user-defined workload parameters provided via a user interface. The set of user-defined workload parameters identify execution characteristics of the synthetic test workload. The method further includes configuring the cluster of nodes of the computing system with the synthetic test workload to execute the synthetic test workload such that processing of the synthetic test workload is distributed across the cluster of nodes.

In still another exemplary embodiment of the present disclosure, a computing configuration system is provided. The system includes a workload configurator operative to generate a synthetic test workload for execution on a cluster of nodes of a computing system based on a set of user-defined workload parameters provided via a user interface. The set of user-defined workload parameters identify execution characteristics of the synthetic test workload. The system further includes a node configurator operative to configure the cluster of nodes of the computing system with the synthetic test workload to execute the synthetic test workload such that processing of the synthetic test workload is distributed across the cluster of nodes.

BRIEF DESCRIPTION OF THE DRAWINGS

The invention will be more readily understood in view of the following description when accompanied by the below figures and wherein like reference numerals represent like elements:

FIG. 9 illustrates an Instance Types tab of the Instances module of FIG. 8 for facilitating the selection of a node type for nodes of the cluster of nodes of FIG. 1;

FIG. 34 is a flow chart of an exemplary method of operation of the configurator of FIG. 3 for configuring a cloud computing system with at least one of an actual workload and a synthetic test workload;

FIG. 35 is a flow chart of an exemplary method of operation of the configurator of FIG. 3 for configuring a cloud computing system with a synthetic test workload;

FIG. 42 illustrates an exemplary data file that identifies a plurality of communication network characteristics of a node cluster;

DETAILED DESCRIPTION

While the embodiments disclosed herein are described with respect to a cloud computing system, the methods and systems of the present disclosure may be implemented with any suitable computing system that includes multiple nodes cooperating to execute a workload.

As referenced herein, a node of a computing system includes at least one processing device and a memory accessible by the at least one processing device. A node may also be referred to as a server, a virtual server, a virtual machine, an instance, or a processing node, for example.

Figure 1:
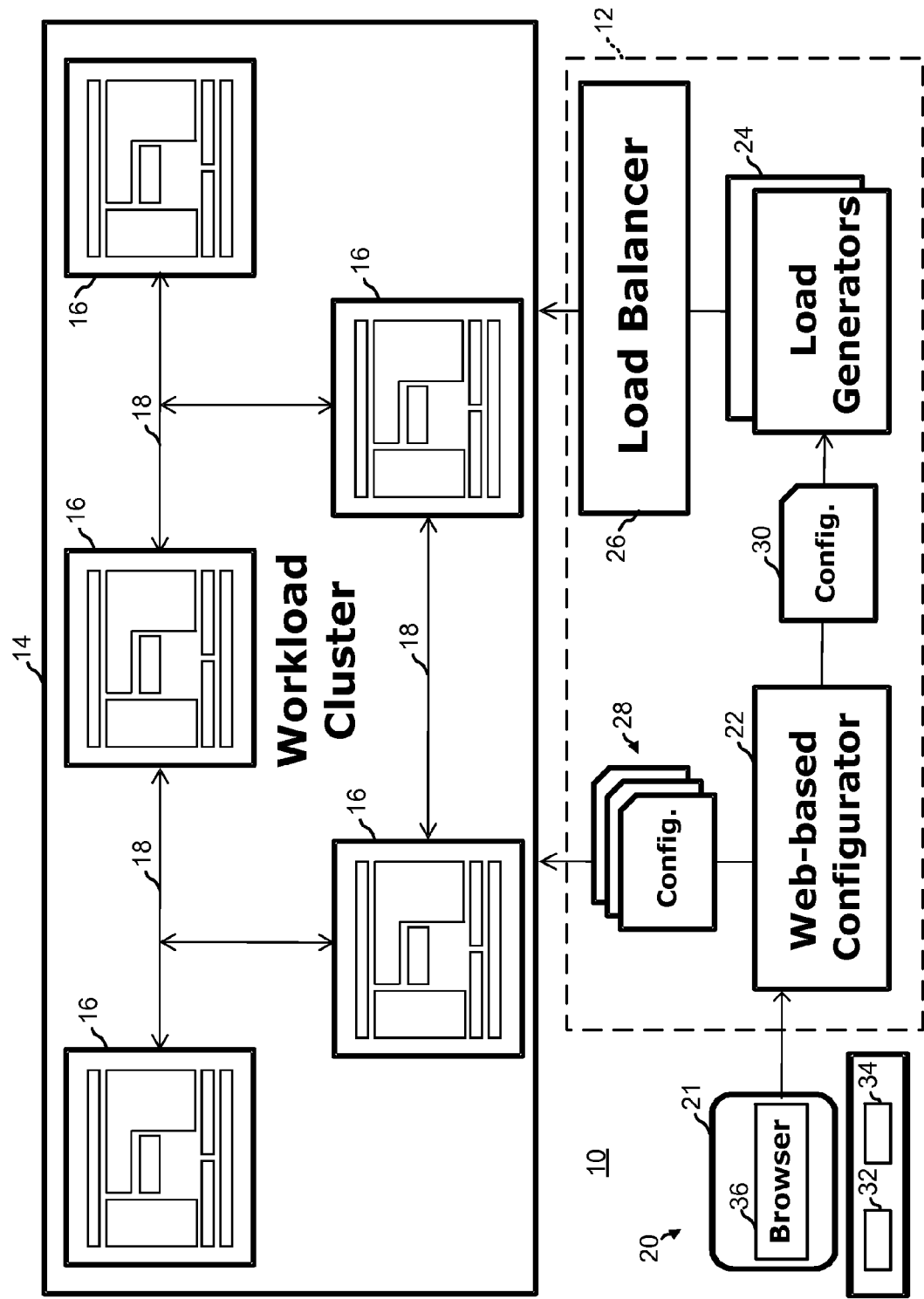
FIG. 1 is a block diagram of a cloud computing system in accordance with an embodiment including a cluster of nodes operating on a communication network, a control server in communication with the cluster of nodes, and a configurator of the control server.

FIG. 1 illustrates an exemplary cloud computing system 10 according to various embodiments that is configured to deliver computing capacity and storage capacity as a service to end users. Cloud computing system 10 includes a control server 12 operatively coupled to a cluster of nodes 14. The cluster of nodes 14 is connected to a distributed communication network 18, and each node 16 includes local processing capability and memory. In particular, each node 16 includes at least one processor 40 (FIG. 2) and at least one memory 42 (FIG. 2) that is accessible by the processor 40. Communication network 18 includes any suitable computer networking protocol, such as an internet protocol (IP) format including Transmission Control Protocol/Internet Protocol (TCP/IP) or User Datagram Protocol (UDP), an Ethernet network, a serial network, or other local or wide area network (LAN or WAN), for example.

As described herein, nodes 16 are selected by control server 12 from a cloud of multiple available nodes 16 connected on communication network 18 to designate the cluster of nodes 14. The available nodes 16 are provided on one or more server storage racks in a data center, for example, and include a variety of hardware configurations. In one embodiment, available nodes 16 from multiple data centers and/or other hardware providers are accessible by control server 12 for selection and configuration as a cluster of nodes 14 for a cloud computing system 10. For example, one or more third-party data centers (e.g., Amazon Web Services, etc.) and/or user-provided hardware may be configured for cloud computing by control server 12. In one example, thousands of nodes 16 may be available for selection and configuration by control server 12, although any number of nodes 16 may be available. While five nodes 16 are illustrated in FIG. 1, any suitable number of nodes 16 may be selected for cloud computing system 10. Control server 12 includes one or more computing devices, illustratively server computers, each including one or more processors. In the illustrated embodiment, control server 12 is a dedicated server computer 12 physically separate from node cluster 14. In one embodiment, control server 12 is physically remote from the data center housing the available nodes 16. Control server 12 alternatively may be one or more nodes 16 of the selected cluster of nodes 14. Control server 12 serves as a cloud computing configuration system operative to allocate and configure nodes 16, to start a workload on nodes 16, to collect and report performance data, etc., as described herein.

Control server 12 illustratively includes a configurator 22, a load generator 24, and a load balancer 26. As referenced herein, configurator 22, load generator 24, and load balancer 26 comprise one or more processors that execute software or firmware code stored in an internal or external memory accessible by the one or more processors. The software/firmware code contains instructions corresponding to the functions of configurator 22, load generator 24, and load balancer 26 that, when executed by the one or more processors, cause the one or more processors to perform the functions described herein. Configurator 22, load generator 24, and/or load balancer 26 may alternatively include application-specific integrated circuits (ASICs), field-programmable gate arrays (FPGAs), digital signal processors (DSPs), hardwired logic, or combinations thereof. Configurator 22 is operative to select and configure one or more nodes 16 for inclusion in the cluster of nodes 14, to configure parameters of communication network 18, to select, configure, and deploy a workload container module and a workload for execution on the cluster of nodes 14, and to gather and analyze performance data associated with the execution of the workload, as described herein. Configurator 22 is operative to generate configuration files 28 that are provided to and processed at nodes 16 for configuring software on nodes 16 and at least one configuration file 30 provided to load generator 24 for providing workload request parameters to load generator 24.

Load generator 24 is operative to generate requests that serve as input used by node cluster 14 for workload execution. In other words, node cluster 14 executes the workload based on the requests and the input parameters and data provided with the requests. In one embodiment, the requests from load generator 24 are initiated by a user. For example, a user or customer may request (e.g., via user interface 200) a search or a sort operation for a specified search term or dataset, respectively, and load generator 24 generates a corresponding search or sort request. In one embodiment, configurator 22 generates a configuration file 30 that describes the user requests received via user interface 200. Nodes 16 execute the workload using the identified terms to be searched or the dataset to be sorted. Load generator 24 may generator other suitable requests depending on the type of workload to be executed. Load balancer 26 is operative to distribute the requests provided by load generator 24 among nodes 16 to direct which nodes 16 execute which requests. Load balancer 26 is also operative to divide a request from load generator 24 into parts and to distribute the parts to nodes 16 such that multiple nodes 16 operate in parallel to execute the request.

Configurator 22 is illustratively web-based such that a user may access configurator 22 over the Internet, although configurator 22 may be accessed over any suitable network or communication link. An exemplary user's computer 20 is illustrated in FIG. 1 including a display 21, a processor 32 (e.g., central processing unit (CPU)), and a memory 34 accessible by processor 32. Computer 20 may include any suitable computing device such as a desktop computer, a laptop, a mobile device, a smartphone, etc. A web-browser 36, which includes software or firmware code, is run on computer 20 and is used to access a graphical user interface provided by configurator 22 and to display the graphical user interface on display 21. See, for example, graphical user interface 200 illustrated in FIGS. 7-30.

Various other arrangements of components and corresponding connectivity of cloud computing system 10, that are alternatives to what is illustrated in the figures, may be utilized and such arrangements of components and corresponding connectivity would remain in accordance with the embodiments herein disclosed.

Figure 2:
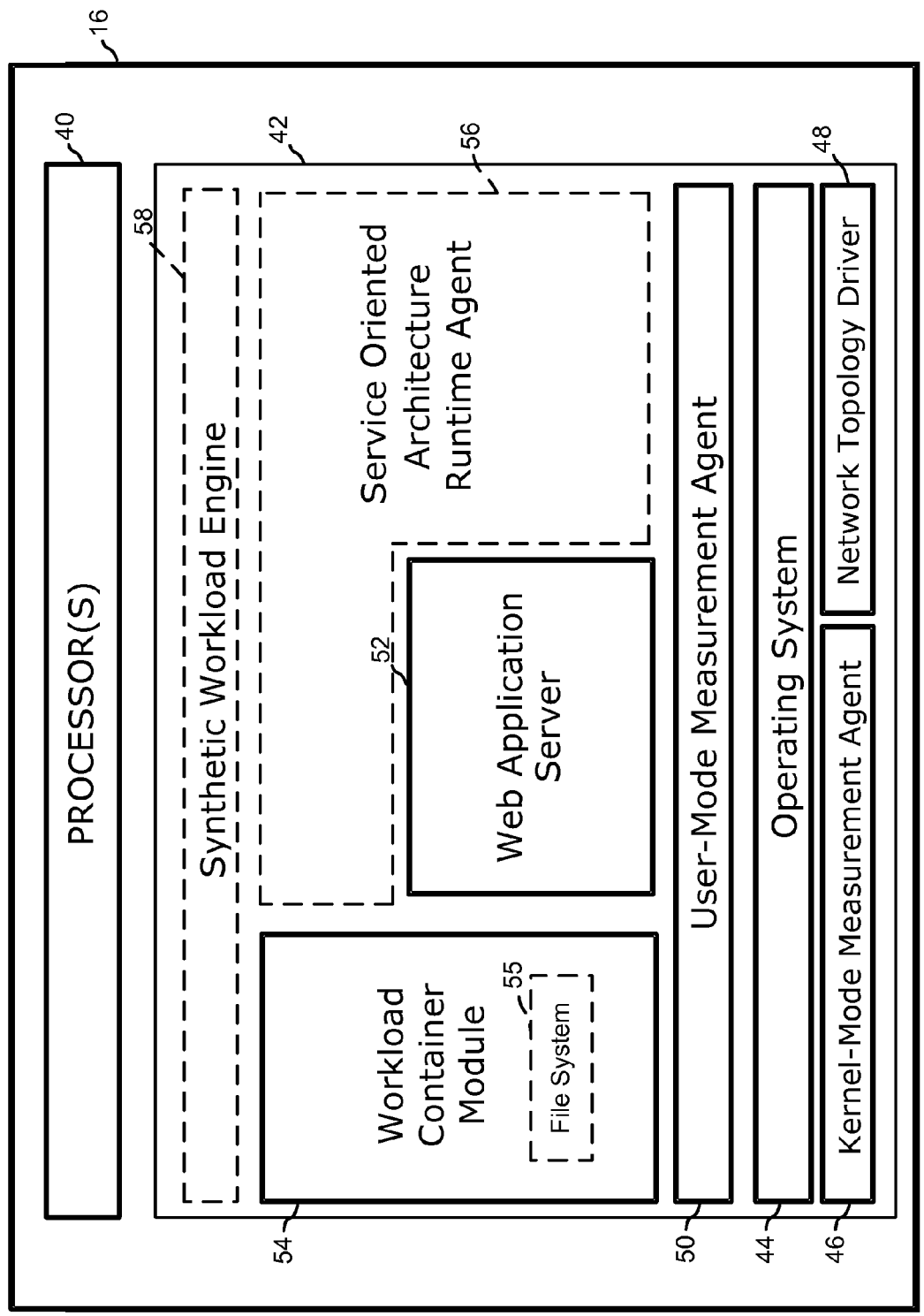
FIG. 2 is a block diagram of an exemplary node of the cluster of nodes of FIG. 1 including at least one processor and a memory.

Referring to FIG. 2, an exemplary node 16 of node cluster 14 of FIG. 1 that is configured by configurator 22 is illustrated according to one embodiment. Node 16 includes at least one processor 40 that is operative to execute software or firmware stored in memory 42. Memory 42 includes one or more physical memory locations and may be internal or external to processor 40.

FIG. 2 illustrates the software (or firmware) code that is loaded onto each node 16, including an operating system 44, a kernel-mode measurement agent 46, a network topology driver 48, a user-mode measurement agent 50, a web application server 52, a workload container module 54, a service oriented architecture runtime agent 56, and a synthetic workload engine 58. In the illustrated embodiment, kernel-mode measurement agent 46 and network topology driver 48 require privilege from operating system 44 to access certain data, such as data from input/output (I/O) devices of node 16, for example. Similarly, user-mode measurement agent 50, web application server 52, workload container module 54, service oriented architecture runtime agent 56, and synthetic workload engine 58 illustratively do not require privilege from operating system 44 to access data or to perform their respective functions.

Operating system 44 manages the overall operation of node 16, including, for example, managing applications, privileges, and hardware resources and allocating processor time and memory usage. Network topology driver 48 is operative to control the network characteristics and parameters of node 16 on communication network 18 (FIG. 1). In one embodiment, network topology driver 48 is operative to change network characteristics associated with node 16 based on a configuration file 28 (FIG. 1) received from configurator 22 (FIG. 1).

A network software stack (not shown) is also stored and executed at each node 16 and includes a network socket for facilitating communication on network 18 of FIG. 1. In the embodiment described herein, the network socket includes a TCP socket that is assigned an address and port number(s) for network communication. In one embodiment, the network software stack utilizes a network driver of the operating system 44.

Kernel-mode measurement agent 46 and user-mode measurement agent 50 are each operative to collect and analyze data for monitoring operations and workload performance at node 16. Kernel-mode measurement agent 46 monitors, for example, the number of processor instructions, processor utilization, the number of bytes sent and received for each I/O operation, as well as other suitable data or combinations thereof. An exemplary kernel-mode measurement agent 46 includes SystemTap software. User-mode measurement agent 50 collects performance data not requiring system privileges from the operating system 44 for access to the data. An example of this performance data includes application-specific logs indicating the start time and completion time of individual sub-tasks, the rate at which such tasks are executed, the amount of virtual memory utilized by the system, the amount of input records processed for a task, etc. In one embodiment, agents 46, 50 and/or other monitoring tools are pre-installed on each node 16 and are configured by configurator 22 at each node 16 based on configuration files 28 (FIG. 1). Alternatively, configurator 22 loads configured agents 46, 50 and/or other monitoring tools onto nodes 16 during workload deployment.

Web application server 52 is an application that controls communication between the node 16 and both control server 12 of FIG. 1 and other nodes 16 of node cluster 14. Web application server 52 effects file transfer between nodes 16 and between control server 12 and nodes 16. An exemplary web application server 52 is Apache Tomcat.

Workload container module 54 is also stored in memory 42 of each node 16. As described herein, control server 12 provides workload container module 54 to node 16 based on a user's selection and configuration of the workload container module 54. An exemplary workload container module 54 includes Apache Hadoop, Memcached, Apache Cassandra, or a custom workload container module provided by a user that is not commercially available. In one embodiment, workload container module 54 includes a file system 55 comprising a code module that when executed by a processor manages data storage in memory 42 and the communication of data between nodes 16. An exemplary file system 55 is the distributed file system (HDFS) of the Apache Hadoop workload container. File system 55 supports data replication by storing multiple copies of the data and files in node memory 42.

Other suitable workload container modules may be provided, such as the optional service-oriented architecture (SOA) runtime agent 56 and the optional synthetic workload engine 58. SOA runtime agent 56 is another type of workload container module that when executed by a processor is operative to coordinate execution of a workload. SOA runtime agent 56 performs, for example, service functions such as caching and serving frequently used files (e.g., images, etc.) to accelerate workload operation. An exemplary SOA runtime agent 56 includes Google Protocol Buffers. Synthetic workload engine 58 includes a workload container module that when executed by a processor is operative to activate and execute a synthetic test workload received via configurator 22 (FIG. 1), as described herein. In the illustrated embodiment, synthetic workload engine 58 is tailored for execution with a synthetic test workload rather than for a actual, non-test workload.

Figure 3:
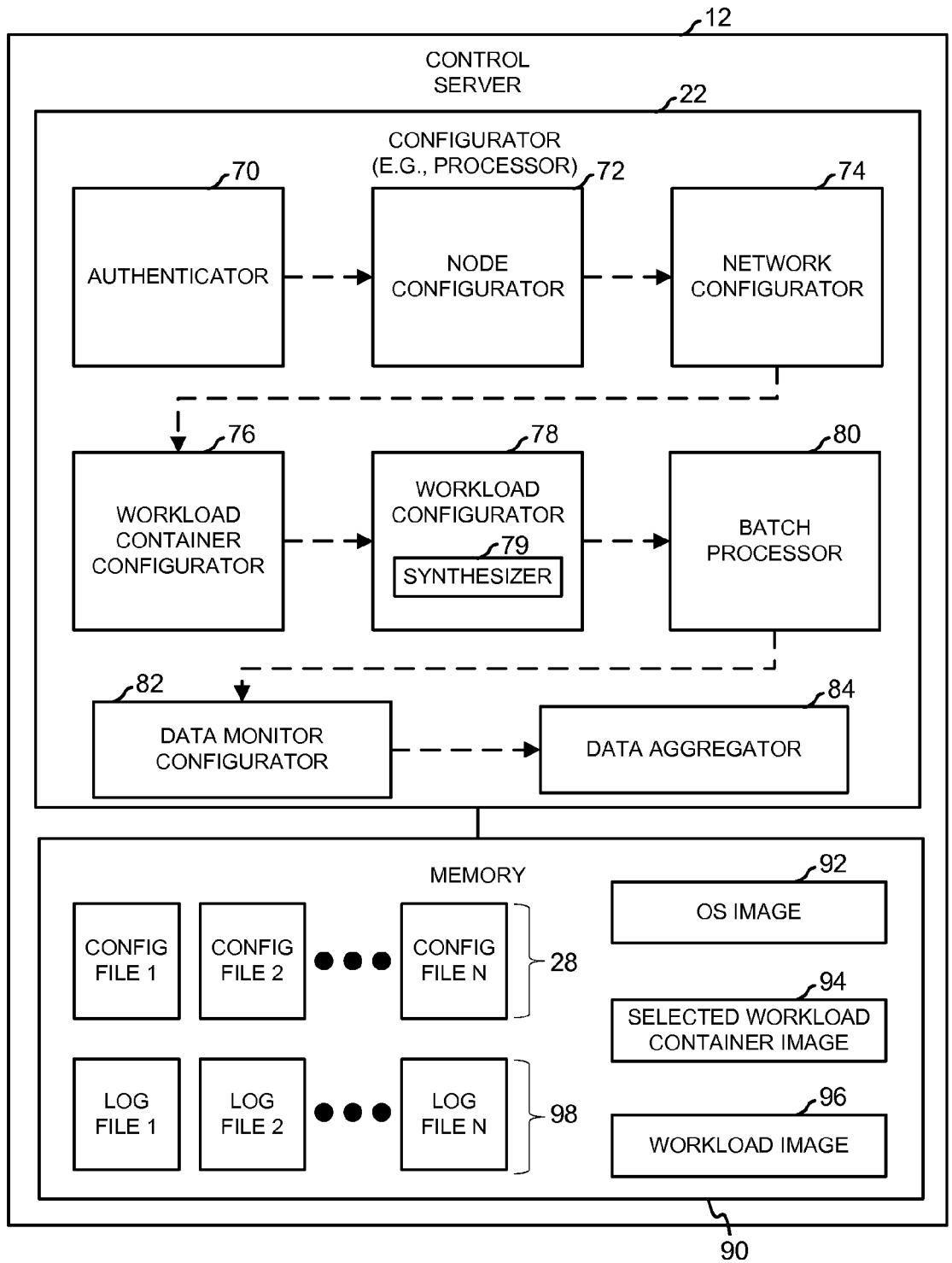
FIG. 3 is a block diagram of an exemplary control server of the cloud computing system of FIG. 1 including a configurator operative to configure the cloud computing system of FIG. 1.

Referring to FIG. 3, configurator 22 of control server 12 is illustrated according to one embodiment. Configurator 22 illustratively includes an authenticator 70, a node configurator 72, a network configurator 74, a workload container configurator 76, a workload configurator 78, a batch processor 80, a data monitor configurator 82, and a data aggregator 84, each comprising the one or more processors 22 of control server 12 executing respective software or firmware code modules stored in memory (e.g., memory 90) accessible by the processor(s) 22 of control server 12 to perform the functions described herein. Authenticator 70 includes processor(s) 22 executing an authentication code module and is operative to authenticate user access to configurator 22, as described herein with respect to FIG. 7. Node configurator 72 includes processor(s) 22 executing a node configuration code module and is operative to select and configure nodes 16 to identify a cluster of nodes 14 having a specified hardware and operational configuration, as described herein with respect to FIGS. 8-10. Network configurator 74 includes processor(s) 22 executing a network configuration code module and is operative to adjust network parameters of communication network 18 of FIG. 1, such as for testing and performance analysis and/or for adjusting system power consumption, as described herein with respect to FIGS. 11-17. Workload container configurator 76 includes processor(s) 22 executing a workload container configuration code module and is operative to select and to configure a workload container module for operation on nodes 16, as described herein with respect to FIGS. 18-21. Workload configurator 78 includes processor(s) 22 executing a workload configuration code module and is operative to select and configure a workload for execution with the selected workload container by nodes 16. Workload configurator 78 illustratively includes a code synthesizer 79 that includes processor(s) 22 executing a synthetic test workload generation code module, and the code synthesizer 79 is operative to generate a synthetic test workload based on user-defined workload parameters, as described herein with respect to FIGS. 23 and 32-35. Batch processor 80 includes processor(s) 22 executing a batch processor code module and is operative to initiate batch processing of multiple workloads wherein multiple workloads are executed in a sequence on node cluster 14, as described herein with respect to FIG. 25. Data monitor configurator 82 includes processor(s) 22 executing a data monitoring configuration code module and is operative to configure monitoring tools that monitor performance data real-time during execution of the workload and collect data, as described herein with respect to FIGS. 26-29. Data aggregator 84 includes processor(s) 22 executing a data aggregation code module and is operative to collect and aggregate the performance data from each node 16 and to generate logs, statistics, graphs, and other representations of the data, as described herein with respect to FIGS. 30 and 31.

Output from configurator 22 is illustratively stored in memory 90 of control server 12. Memory 90, which may be internal or external to the processor(s) of control server 12, includes one or more physical memory locations. Memory 90 illustratively stores the configuration files 28, 30 of FIG. 1 that are generated by configurator 22. Memory 90 also stores log files 98 that are generated by nodes 16 and are communicated to control server 12 following execution of a workload. As illustrated, an image file 92 of the operating system, an image file 94 of the workload container selected with workload container configurator 76, and an image file 96 of the workload selected or generated with workload configurator 78 are stored in memory 90. In one embodiment, multiple operating system image files 92 are stored in memory 90 such that a user may select an operating system via configurator 22 for installation on each node 16. In one embodiment, a user may upload an operating system image file 92 from a remote memory (e.g., memory 34 of computer 20 of FIG. 1) onto control server 12 for installation on nodes 16. The workload container image file 94 is generated with workload container configurator 76 based on a user's selection and configuration of the workload container module from multiple available workload container modules. In the embodiment described herein, workload container configurator 76 configures the corresponding workload container image file 94 based on user input received via user interface 200 of FIGS. 7-30. Similarly, workload configurator 78 generates and configures workload image file 96 based on a user's selection of a workload from one or more available workloads via user interface 200 of control server 12. Workload image file 96 includes a predefined, actual workload selected by workload configurator 78 based on user input or a synthetic test workload generated by workload configurator 78 based on user input.

In one embodiment, memory 90 is accessible by each node 16 of the node cluster 14, and control server 12 sends a pointer or other identifier to each node 16 of node cluster 14 that identifies the location in memory 90 of each image file 92, 94, 96. Nodes 16 retrieve the respective image files 92, 94, 96 from memory 90 based on the pointers. Alternatively, control server 12 loads image files 92, 94, 96 and the appropriate configuration files 28 onto each node 16 or provides the image files 92, 94, 96 and configuration files 28 to nodes 16 by any other suitable mechanism.

As described herein, configurator 22 is operative to automatically perform the following actions based on user selections and input: allocate the desired resources (e.g., nodes 16); pre-configure the nodes 16 (e.g., network topology, memory characteristics); install the workload container software in each node 16; deploy user-provided workload software and data to the nodes 16; initiate monitoring tools (e.g., Ganglia, SystemTap) and performance data to be gathered from each node 16; provide live status updates to the user during workload execution; collect all data requested by the user, including the results of the workload and information gathered by monitoring tools; process, summarize, and display performance data requested by the user; and perform other suitable functions. Further, a user may use configurator 22 to create and deploy sequences of workloads running sequentially or in parallel, as described herein. A user may execute any or all of the workloads repeatedly, while making optional adjustments to the configuration or input parameters during or between the executions. Configurator 22 is also operative to store data on designated database nodes 16 of node cluster 14 based on requests by a user.

Figure 4:
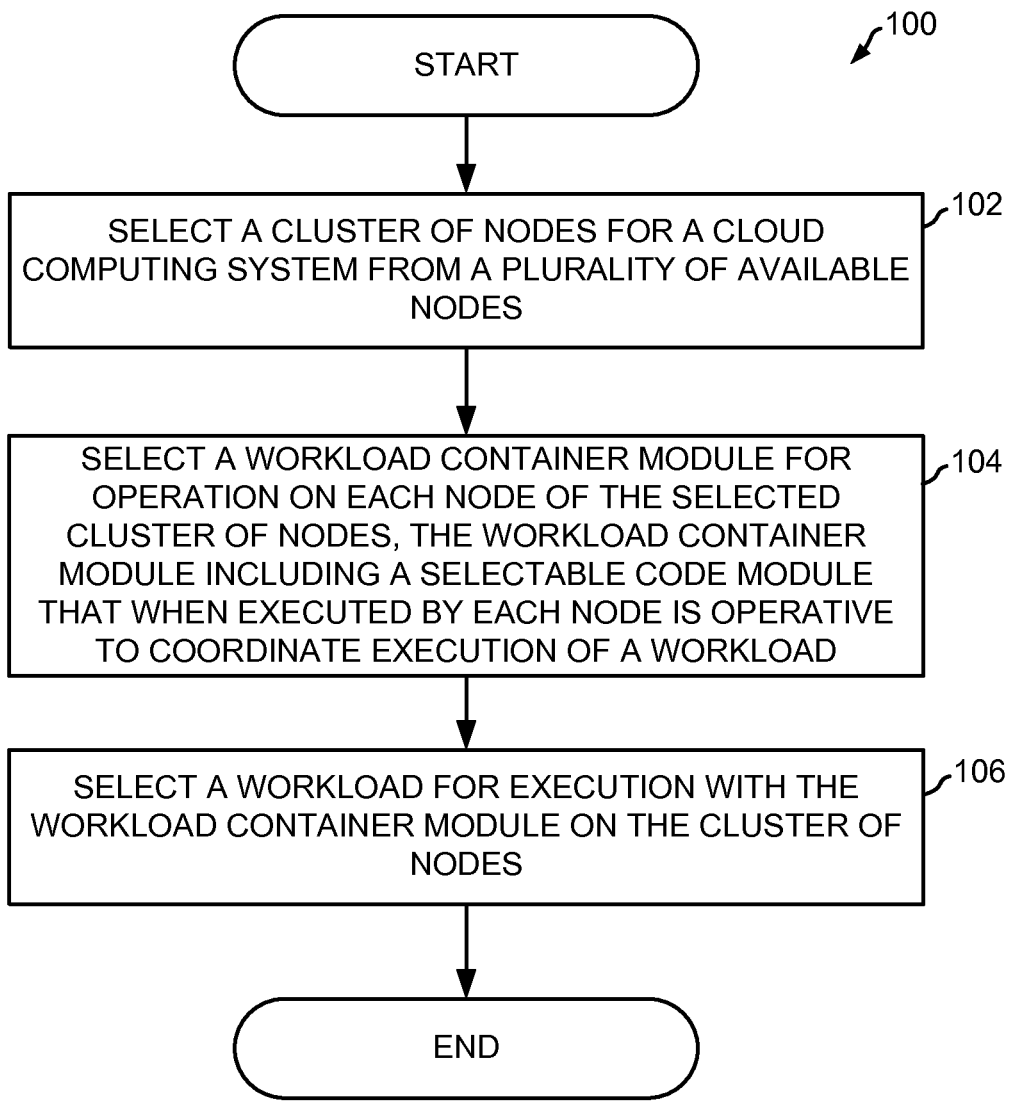
FIG. 4 is a flow chart of an exemplary method of operation of the configurator of FIG. 3 for configuring a cloud computing system.

FIG. 4 illustrates a flow diagram 100 of an exemplary operation performed by configurator 22 of FIGS. 1 and 3 for configuring a cloud computing system. Reference is made to FIGS. 1 and 3 throughout the description of FIG. 4. In the illustrated embodiment, configurator 22 configures node cluster 14 of FIG. 1 according to the flow diagram 100 of FIG. 4 based on a plurality of user selections received via a user interface, such as user interface 200 illustrated in FIGS. 7-30. At block 102, node configurator 72 of configurator 22 selects a cluster of nodes 14 from a plurality of available nodes 16. Each node 16 of the cluster of nodes 14 includes at least one processing device 40 and memory 42 (FIG. 2) and is operative to share processing of a workload with other nodes 16 of the cluster 14, as described herein. In the illustrated embodiment, multiple nodes 16 are available for selection by configurator 22, and configurator 22 selects a subset of the available nodes 16 as the node cluster 14. In one embodiment, configurator 22 selects at least one type of data to be collected from each node 16 of the cluster of nodes 14 based on a user selection received via the user interface, and data aggregator 84 of configurator 22 collects and aggregates the at least one type of data from each node 16 of the cluster of nodes 14, as described herein with respect to FIGS. 26-30.

At block 104, workload container configurator 76 of configurator 22 selects a workload container module for operation on each node 16 of the selected cluster of nodes 14. The workload container module includes a selectable code module that when executed by node 16 is operative to initiate and coordinate execution of a workload. In one embodiment, the workload container module is selected from a plurality of available workload container modules, as described herein with respect to FIG. 18. In one embodiment, configurator 22 modifies at least one operational parameter of the workload container module on each node 16 based on user input received via the user interface. The at least one operational parameter is associated with at least one of a read/write operation, a file system operation, a network socket operation, and a sorting operation, as described herein.

In one embodiment, the selected workload container module is a custom workload container module stored on memory remote from cloud computing system 10 (e.g., memory 34 of FIG. 1), and configurator 22 loads the custom workload container module stored on the remote memory onto each node 16 of the cluster of nodes 14. For example, a custom workload container module includes a workload container module that is provided by a user and is not commercially available. In one embodiment, the custom workload container module includes a configuration file that contains user-defined instructions and parameters for executing the workload. Exemplary instructions include instructions for testing workload parameters that are uncommon in typical workloads and/or are unique to a specific workload. Other exemplary instructions of a custom workload container module include instructions to redirect the output or log files of the execution to a different location for further analysis. Alternatively, the workload container module includes a commercially available, third party workload container module, such as Apache Hadoop, Memcached, Apache Cassandra, etc., that is stored at computing system 10 (e.g., memory 90 of FIG. 3) and is available for selection and deployment by configurator 22.

At block 106, workload configurator 78 of configurator 22 selects a workload for execution with the workload container module on the cluster of nodes 14. The processing of the selected workload is distributed across the cluster of nodes 14, as described herein. In one embodiment, the workload is selected from at least one of an actual workload and a synthetic test workload. One or more actual, pre-compiled workloads are stored in a memory (e.g., memory 34 of FIG. 1) accessible by the processor of control server 12, and configurator 22 loads a selected actual workload onto nodes 16. A synthetic test workload is generated by configurator 22 based on user-defined workload parameters received via user interface 200 and is loaded onto nodes 16, as described herein with respect to FIGS. 23 and 32-35. In one embodiment, configurator 22 adjusts, based on a user input received via user interface 200, at least one communication network parameter to modify or limit the performance of communication network 18 during execution of the selected workload, as described herein with respect to FIGS. 11-17.

Figure 21:
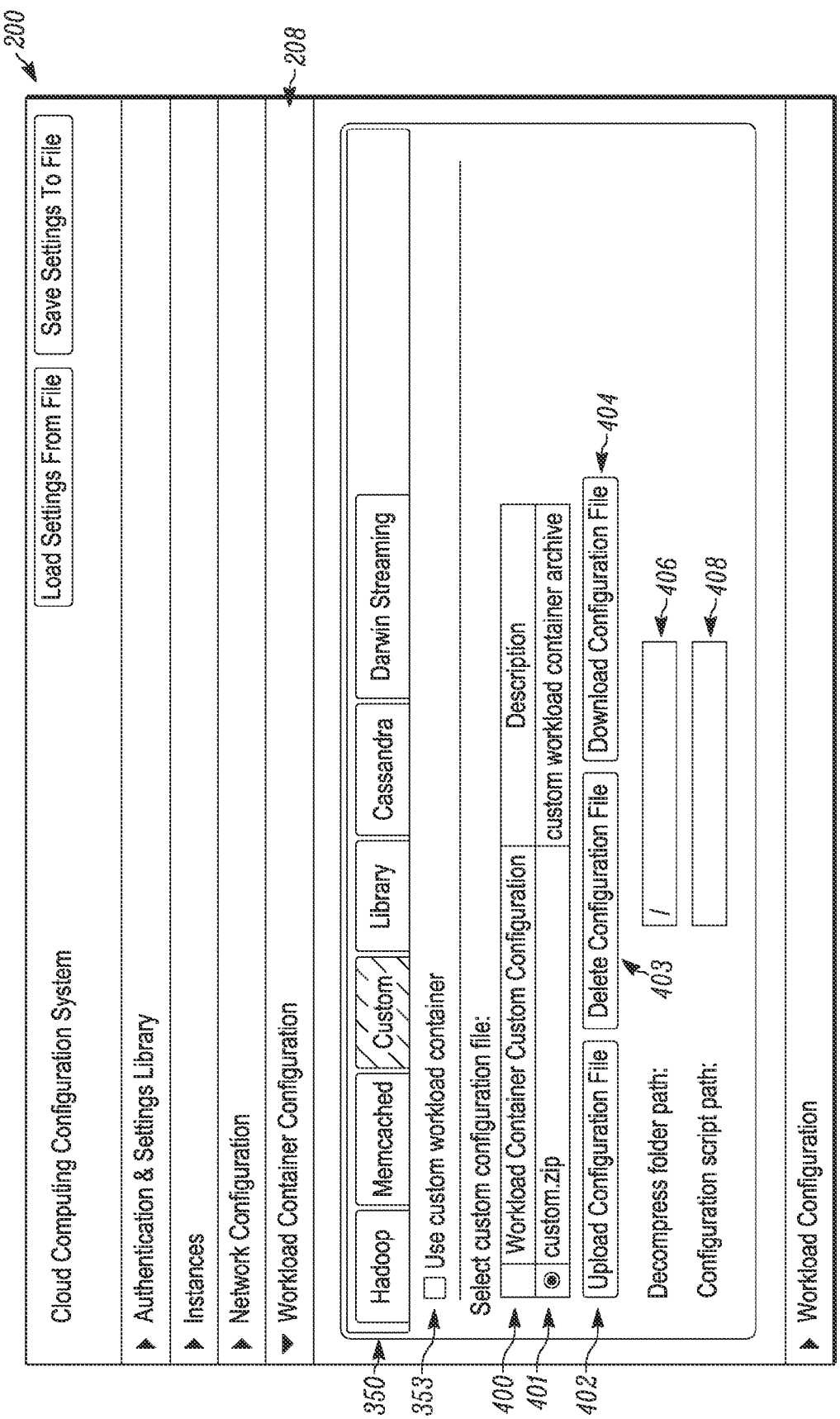
FIG. 21 illustrates a Custom tab of the Workload Container Configuration module of FIG. 18 for facilitating the selection of a custom workload container.
Figure 22:
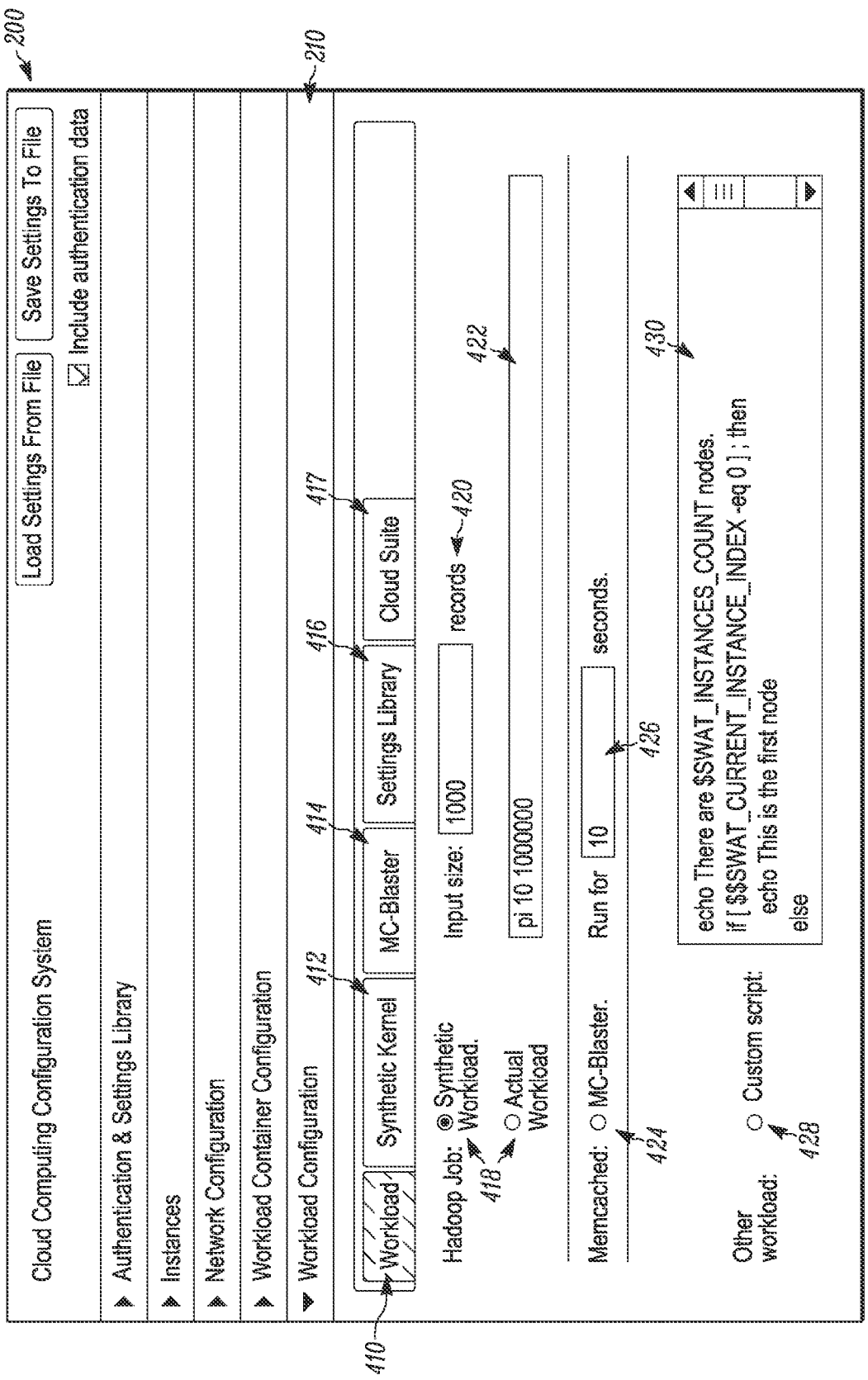
FIG. 22 illustrates a Workload Configuration module of the exemplary user interface of FIG. 7 including a Workload tab for facilitating the selection of a workload for execution on the cluster of nodes of FIG. 1.

In the illustrated embodiment, configurator 22 provides the user interface 200 (FIGS. 7-30) that includes selectable node data (e.g. table 258 of FIG. 8), selectable workload container data (e.g., selectable input 352 of FIG. 18), and selectable workload data (e.g., selectable input 418 of FIG. 22). The cluster of nodes 14 is selected based on a user selection of the selectable node data, the workload container module is selected based on a user selection of the selectable workload container data, and the workload is selected based on a user selection of the selectable workload data.

Figure 5:
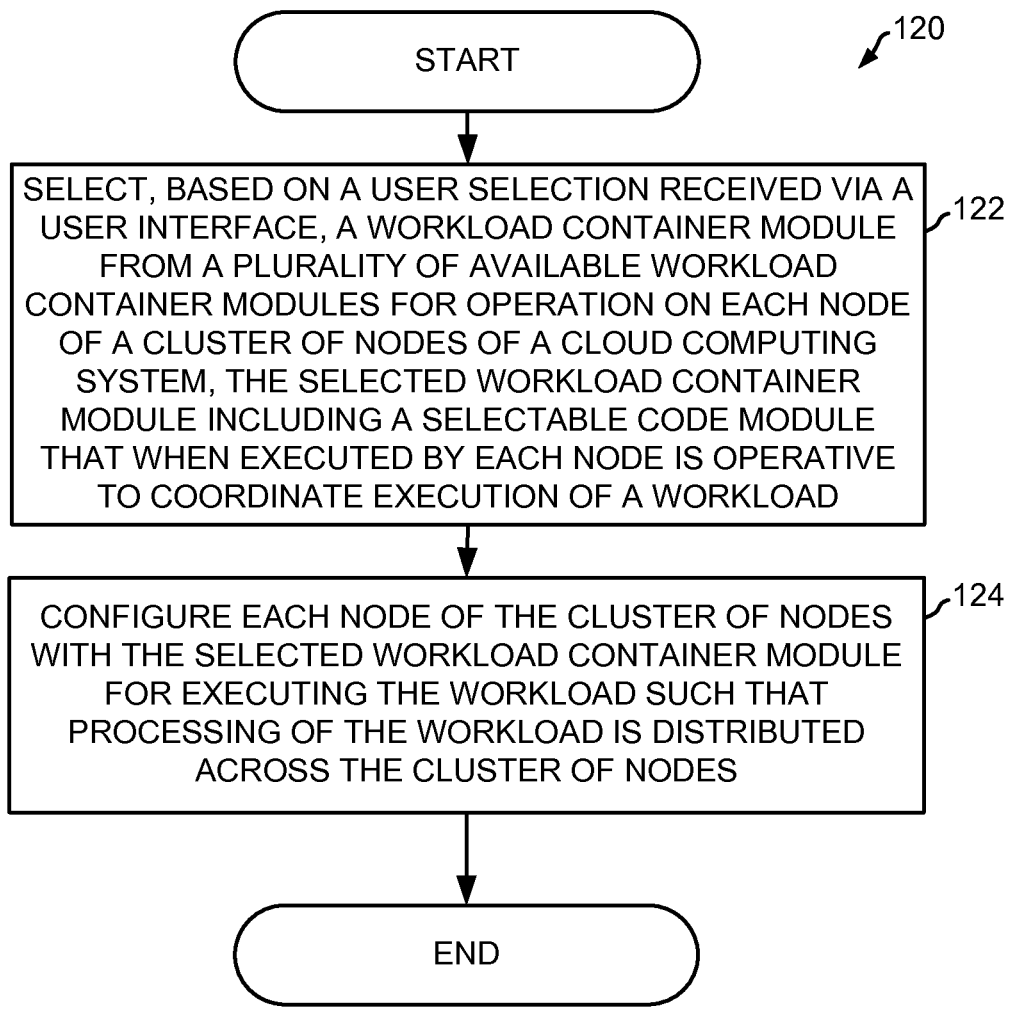
FIG. 5 is a flow chart of another exemplary method of operation of the configurator of FIG. 3 for configuring a cloud computing system.

FIG. 5 illustrates a flow diagram 120 of another exemplary operation performed by configurator 22 of FIGS. 1 and 3 for configuring cloud computing system 10. Reference is made to FIGS. 1 and 3 throughout the description of FIG. 5. At block 122, workload container configurator 76 selects, based on a user selection received via a user interface (e.g., user interface 200), a workload container module from a plurality of available workload container modules for operation on each node 16 of a cluster of nodes 14 of the cloud computing system 10. In the illustrated embodiment, the workload container module is selected based on selectable workload container data, such as inputs 352, 360, 362 of FIG. 18 and inputs 352, 401 of FIG. 21, for example. The selected workload container module includes a selectable code module (e.g., selectable with inputs 360, 362 of FIG. 18 and input 401 of FIG. 21) operative to coordinate execution of a workload. In one embodiment, the plurality of available workload container modules includes a custom workload container module, as described herein. At block 124, node configurator 72 configures each node 16 of the cluster of nodes 14 with the selected workload container module for executing the workload such that processing of the workload is distributed across the cluster of nodes. As described herein, each node 16 includes a processing device 40 and memory 42 and is operative to share processing of the workload with other nodes 16 of the cluster of nodes 14. Configurator 22 installs the selected workload container module on each node 16 of the cluster of nodes 14 and initiates the execution of the workload with the selected workload container module on the cluster of nodes 14.

Figure 6:
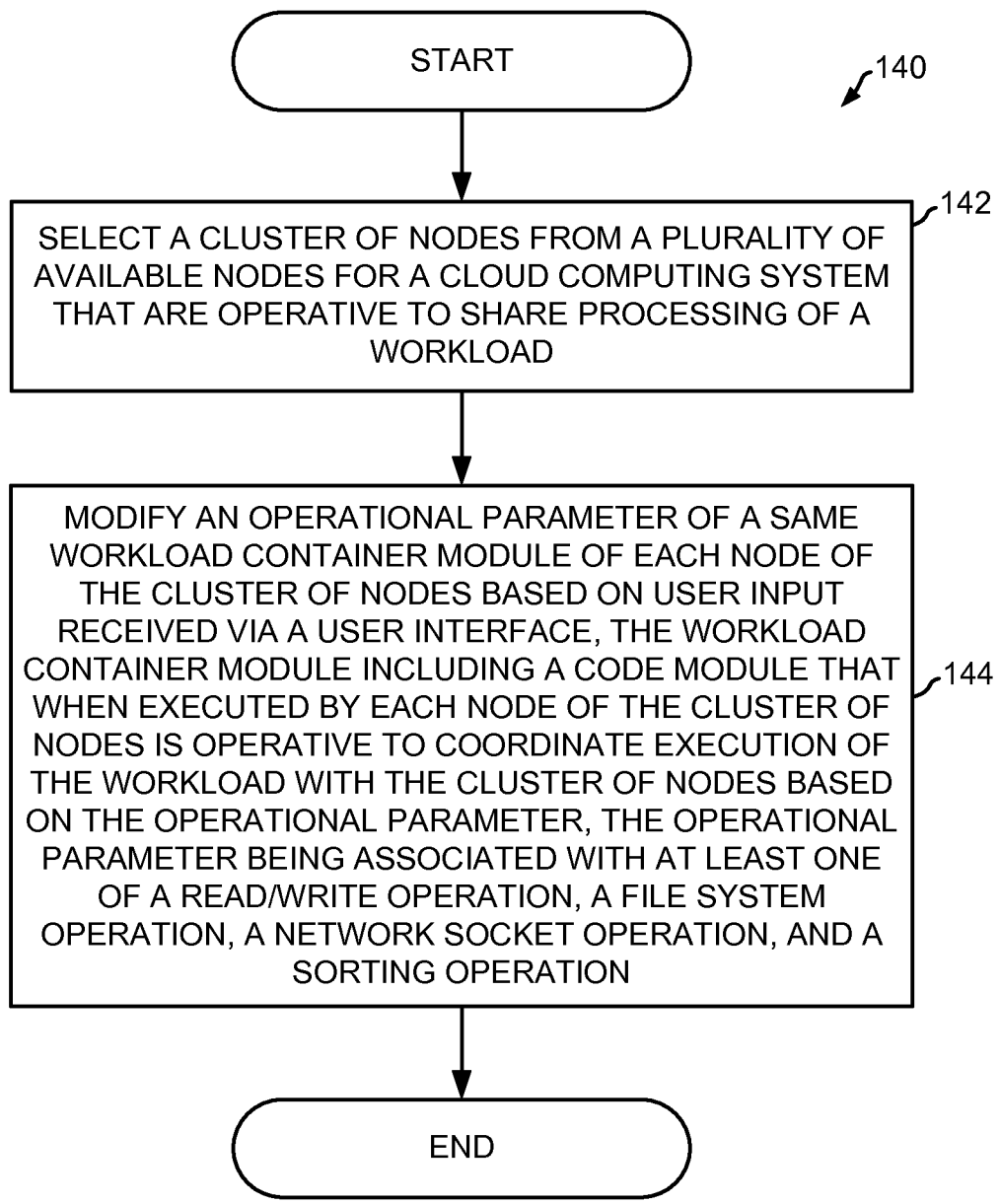
FIG. 6 is a flow chart of another exemplary method of operation of the configurator of FIG. 3 for configuring a cloud computing system.

FIG. 6 illustrates a flow diagram 140 of another exemplary operation performed by configurator 22 of FIGS. 1 and 3 for configuring cloud computing system 10. Reference is made to FIGS. 1 and 3 throughout the description of FIG. 6. At block 142, node configurator 72 of configurator 22 selects a cluster of nodes 14 from a plurality of available nodes 16 for a cloud computing system 10 that are operative to share processing of a workload. In the illustrated embodiment, the cluster of nodes 14 is selected based on selectable node data, as described herein.

Figure 19:
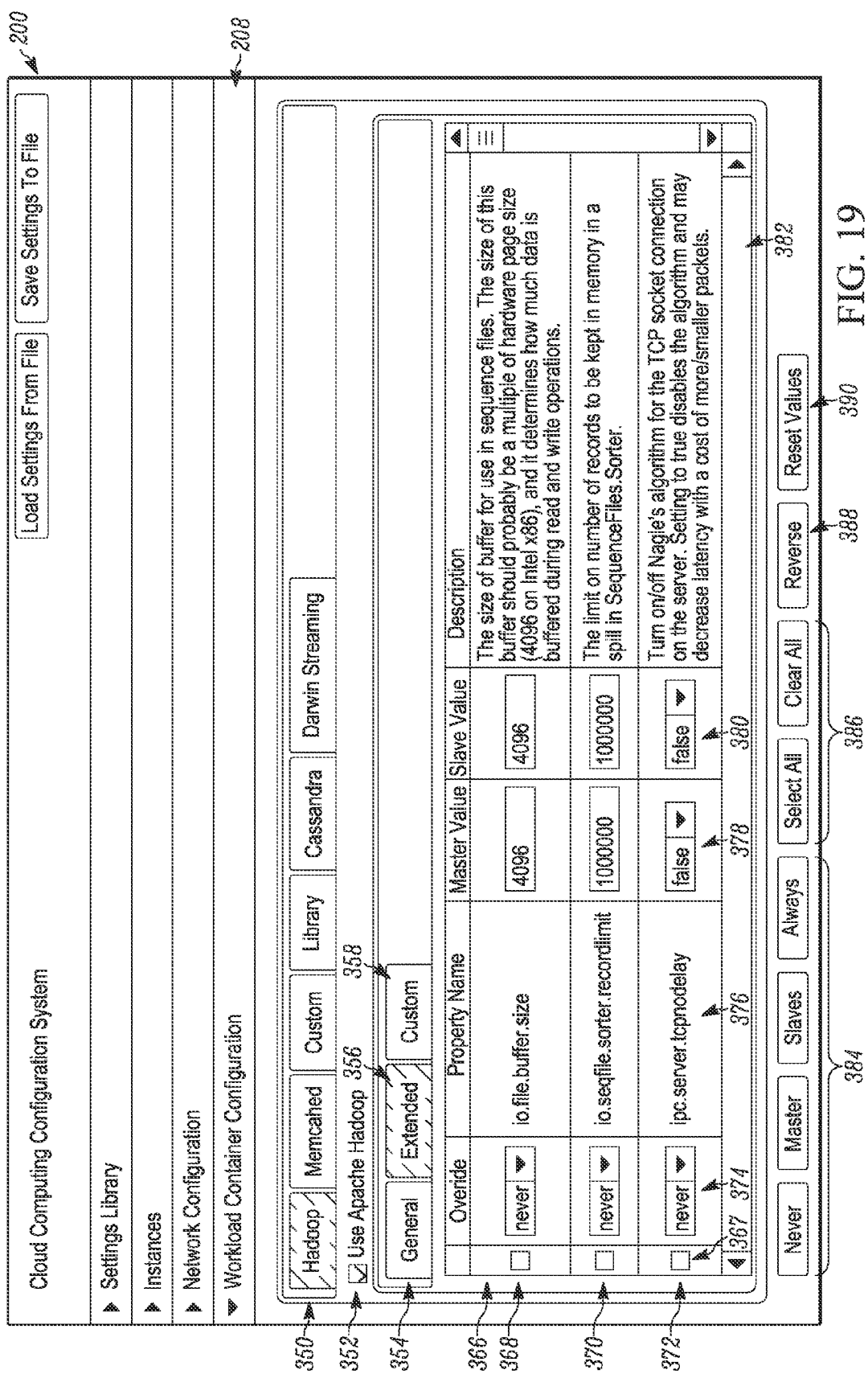
FIG. 19 illustrates the Hadoop tab of the Workload Container Configuration module of FIG. 18 including an Extended tab for facilitating the configuration of operational parameters of the Hadoop workload container.

At block 144, workload container configurator 76 modifies an operational parameter of a same workload container module of each node 16 based on user input received via a user interface (e.g., selectable inputs 367 and fields 374, 378, 380 of user interface 200 of FIG. 19). The same workload container module includes a selectable code module that when executed by the node 16 is operative to coordinate execution of a workload based on the operational parameter. The operational parameter is associated with at least one of a read/write operation, a file system operation, a network socket operation, and a sorting operation, as described herein with respect to FIGS. 19 and 20. Configurator 22 modifies the operating parameter(s) prior to deploying the workload container module onto each node 16, or after deployment of the workload container module to each node 16 when updating configurations. The workload container module when executed by each node 16 is operative to coordinate execution of the workload on the cluster of nodes 14 based on the modified operational parameter. In one embodiment, the operational parameter includes a memory buffer size for a read/write operation, a size of a data block transferred during a read/write operation, a number of data blocks stored in the memory 42 of each node 16, a number of processing threads of each node 16 allocated for processing requests for the file system 55, and/or a number of data streams to merge when sorting data. Other suitable operational parameters may be modified, as described with respect to FIGS. 19 and 20.

An exemplary user interface 200 is illustrated in FIGS. 7-30 that provides user access to control server 12 of FIG. 3. User interface 200 is illustratively a web-based, graphical user interface 200 that includes multiple selectable screens configured for display on a display, such as on display 21 of computer 20 (FIG. 1). Other suitable user interfaces may be provided, such as a native user interface application, a command line driven interface, a programmable API, or another other type or combination of interfaces. User interface 200 includes selectable data, such as selectable inputs, fields, modules, tabs, drop-down menus, boxes, and other suitable selectable data, that are linked to and provide input to the components 70-84 of configurator 22. In one embodiment, the selectable data of user interface 200 is rendered in a manner that allows it to be individually selectable. For example, the selectable data is selected by a user with a mouse pointer, by touching a touchscreen of user interface 200, by pressing keys of a keyboard, or by any other suitable selection mechanism. Selected data may result in the data being highlighted or checked, for example, and a new screen, menu, or pop-up window may appear based on selection of some selectable data (e.g., modules, drop-down menus, etc.).

Figure 7:
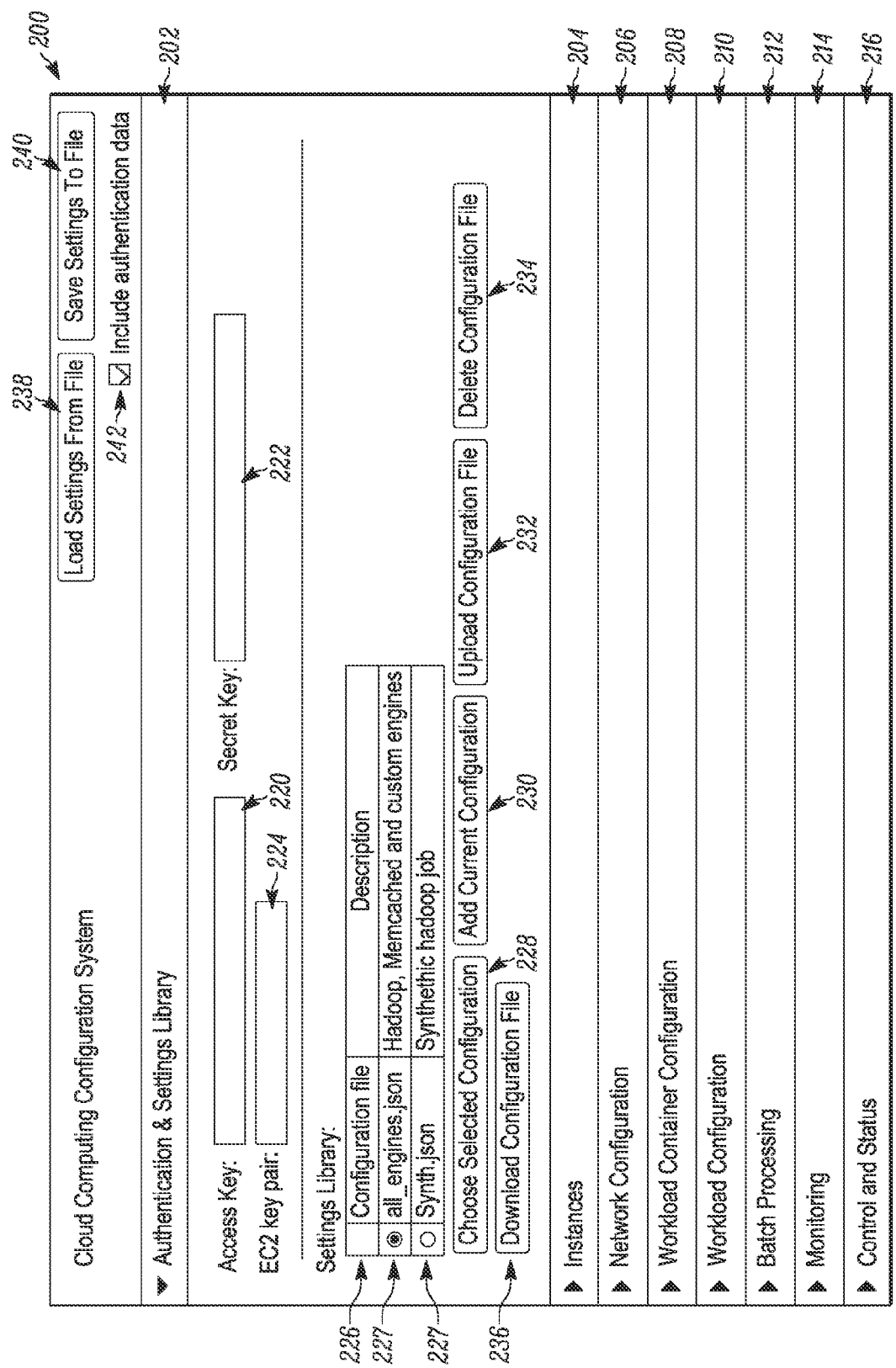
FIG. 7 illustrates an exemplary user interface provided by the configurator of FIG. 3 including an Authentication and Settings Library module for facilitating user access authentication.

Reference is made to FIGS. 1-3 throughout the description of user interface 200. As illustrated in FIG. 7, user interface 200 includes several selectable modules that, when selected, provide access to configurator 22, thereby allowing user selections and other user input to configurator 22. In particular, the Authentication and Settings Library module 202 comprises data representing and linked to authenticator 70 of configurator 22. Instances module 204 comprises data representing and linked to node configurator 72 of configurator 22. Network Configuration module 206 comprises data representing and linked to network configurator 74 of configurator 22. Workload Container Configuration module 208 comprises data representing and linked to workload container configurator 76 of configurator 22. Workload Configuration module 210 comprises data representing and linked to workload configurator 78 of configurator 22. Batch Processing module 212 comprises data representing and linked to batch processor 80 of configurator 22. Monitoring module 214 comprises data representing and linked to data monitor configurator 82 of configurator 22. Control and Status module 216 comprises data representing and linked to data aggregator 84 of configurator 22. Components 70-84 of configurator 22 implement their respective functions based on the user selections, data, and other user input provided via modules 202-216 of user interface 200.

Referring to FIG. 7, the Authentication and Settings Library module 202 is selected. Based on user input to module 202, authenticator 70 authenticates user access to configurator 22 as well as loads previously saved system configurations. Authenticator 70 grants a user access to configurator 22 by confirming credential data entered in the form of an access key, a secret key, and/or an EC2 key pair in respective fields 220, 222, 224. In the illustrated embodiment, the EC2 key pair of field 224 provides root or initial access to newly selected nodes 16 when using module 202 to access the Amazon Web Services cloud platform. Authenticator 70 loads a previously saved system configuration from a system configuration file (e.g., stored on user's computer 20 or control server 12 of FIG. 1) based on user selection of input 238. The system configuration file includes workload and workload container configurations, node 16 and network settings information, data monitoring/collection settings for cloud computing system 10, and all other configuration information associated with a system configuration previously saved with configurator 22. Loading a previously saved system configuration file updates configurator 22 with the configuration information from the system configuration file. The system configuration file illustratively includes a JSON file format, although other suitable formats may be provided. After loading the system configuration file, the loaded system configuration may be modified via the modules of user interface 200. Selection of input 240 causes authenticator 70 to save a current system configuration of configurator 22 to a file. The authentication data may be included in the saved system configuration file based on selection of selection box 242.

While the system configuration file is identified and loaded onto control server 12 via a web-based user interface 200, other suitable remote method invocation (RMI) mechanisms may be used to obtain the system configuration file. For example, an Apache Hypertext Transfer Protocol (HTTP) server, an Apache Tomcat server, a Tomcat servlet using the RMI mechanism to pass the system configuration file, or a custom application (e.g., command line utility) that uses the RMI mechanism to pass the system configuration file directly to control server 12.

A settings library 226 provides a table or list of previously created system configuration files that are available for selection and execution via selectable inputs 227. The selection of input 228 causes authenticator 70 to update the modules 202-216 with configuration information from the system configuration file selected in library 226. A current system configuration (e.g., configured via modules 202-216) is saved to a file and added to library 226 based on selection of input 230, and a system configuration file is deleted from library 226 based on selection of input 234. Selection of inputs 232 and 236 causes authenticator 70 to upload a system configuration file from a local computer (e.g., computer 20 of FIG. 1) to library 226 or to download a system configuration file from a remote computer (e.g., via the Internet) to library 226, respectively. Library 226 allows one or more previously used system configuration to be loaded and executed quickly. The system configuration files of library 226 may be selected and executed separately, in parallel, or in a sequence on cloud computing system 10. For example, multiple system configuration files may be provided in library 226 for execution in a batch sequence, wherein configurator 22 automatically deploys each selected system configuration in sequence to execute the workload(s) with each system configuration. In the illustrated embodiment, the system configuration is deployed to nodes 16 via the Control and Status module 216 of FIG. 30, as described herein. The deployment of the system configuration involves configurator 22 configuring the cloud computing system 10 with the settings, software, and workload information associated with the system configuration file, as described herein with reference to FIG. 30. As described herein, configurator 22 illustratively generates one or more configuration files 28 that are routed to each node 16 for configuring the respective nodes 16. The configuration files 28 deployed to nodes 16 include all configuration information contained in the system configuration file loaded via module 202 plus any additional configuration changes made via modules 202-216 after loading the system configuration file.

Figure 8:
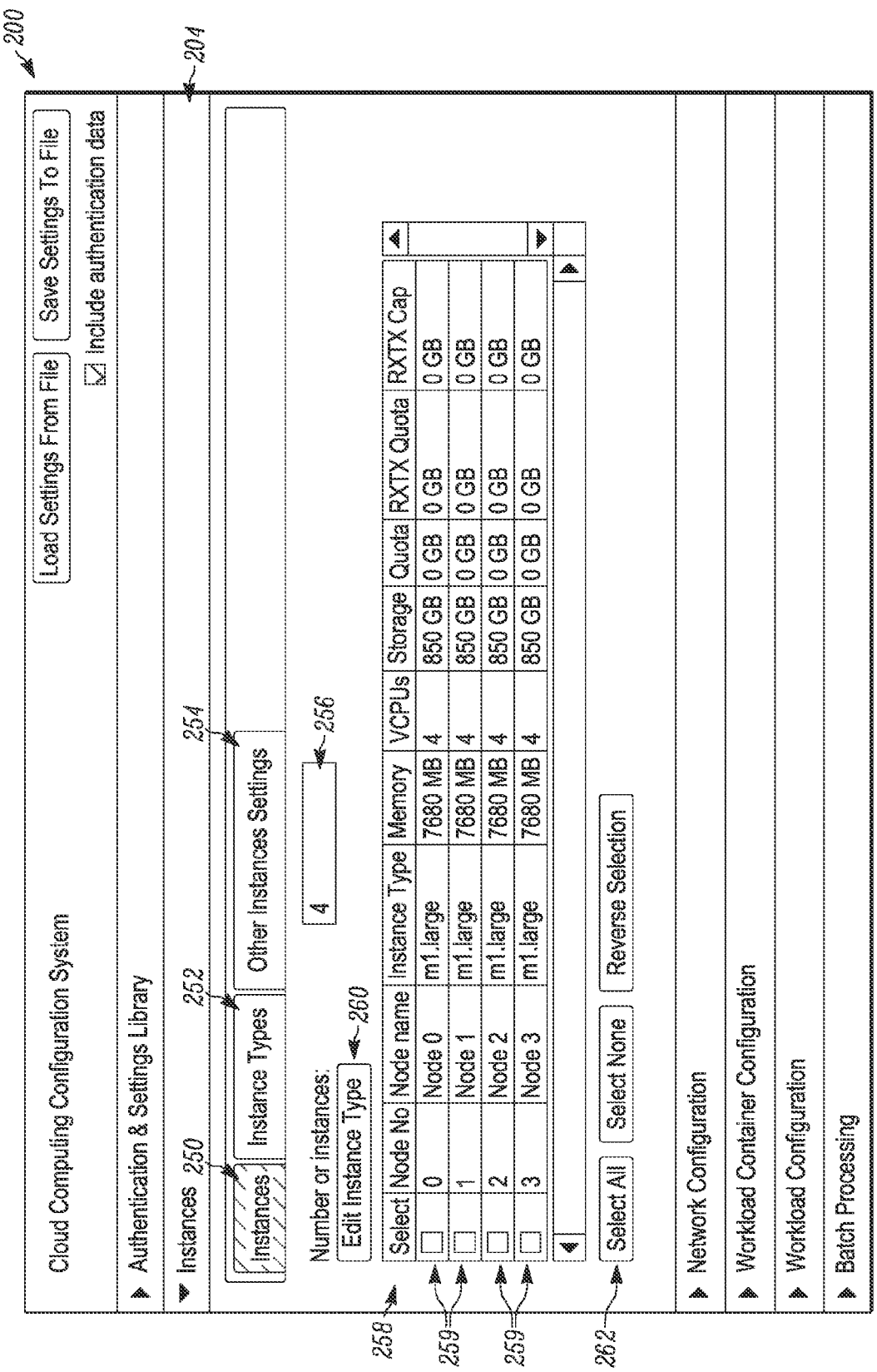
FIG. 8 illustrates an Instances module of the exemplary user interface of FIG. 7 including an Instances tab for facilitating the selection of the cluster of nodes of FIG. 1.

Referring to FIG. 8, the Instances module 204 is selected for configuring the number and characteristics of nodes 16. Based on user input to module 204, node configurator 72 identifies and selects a cluster of nodes 14 having a specified hardware and operational configuration. Instances module 204 includes an Instances tab 250, an Instance Types tab 252, and an Other Instance Settings tab 254. Under the Instances tab 250 selected in FIG. 8, the number of desired nodes 16 for inclusion in node cluster 14 is entered in field 256. Node configurator 72 generates a default list of nodes 16, each having a specific hardware configuration, in table 258 upon user selection of the desired number of nodes 16 with field 256. Table 258 provides a list and a configuration description of the cluster of nodes 14 of FIG. 1. Table 258 includes several descriptive fields for each node 16, including the node number and name, the instance (node) type, the memory capacity, the number of core processors (e.g., CPU's), the storage capacity, the quota, the receive/transmit quota, and the receive/transmit cap. The instance type generally describes the relative size and compute power of the node, illustratively selected from micro, small, medium, large, x-large, 2x-large, 4x-large, etc (see FIG. 9). In the exemplary table 258 of FIG. 8, each node 16 is a large type with a memory capacity of 7680 megabytes (MB), a storage capacity of 850 MB, and four core processors. Node configurator 72 selects nodes 16 based on the user selection of selectable node data, illustratively selection boxes 259 and selectable inputs 262. The type of each node 16 is changeable based on selection of a node 16 of table 258 (e.g., using inputs 262 or by checking the corresponding selection boxes 259) and selecting the edit instance type input 260, which causes Instance Types tab 252 to be displayed for the selected node 16. Referring to FIG. 9, table 264 comprises a list of the types of nodes 16 that are available for selection (i.e., the available server hardware) for use in the node cluster 14. One or more nodes 16 of table 264 are selected with selectable inputs 265 for replacing the node 16 selected in table 258 of FIG. 8. In one embodiment, the fields of table 264 (e.g., Memory, VCPUs, Storage, etc.) are modifiable by a user to further identify desired hardware performance characteristics of the selected nodes 16. Fewer or additional types of nodes 16 may be available for selection in table 264, depending on available server hardware. In the illustrated embodiment, multiple nodes 16 are available for each node type listed in table 264 for adding to node cluster 14.

Figure 10:
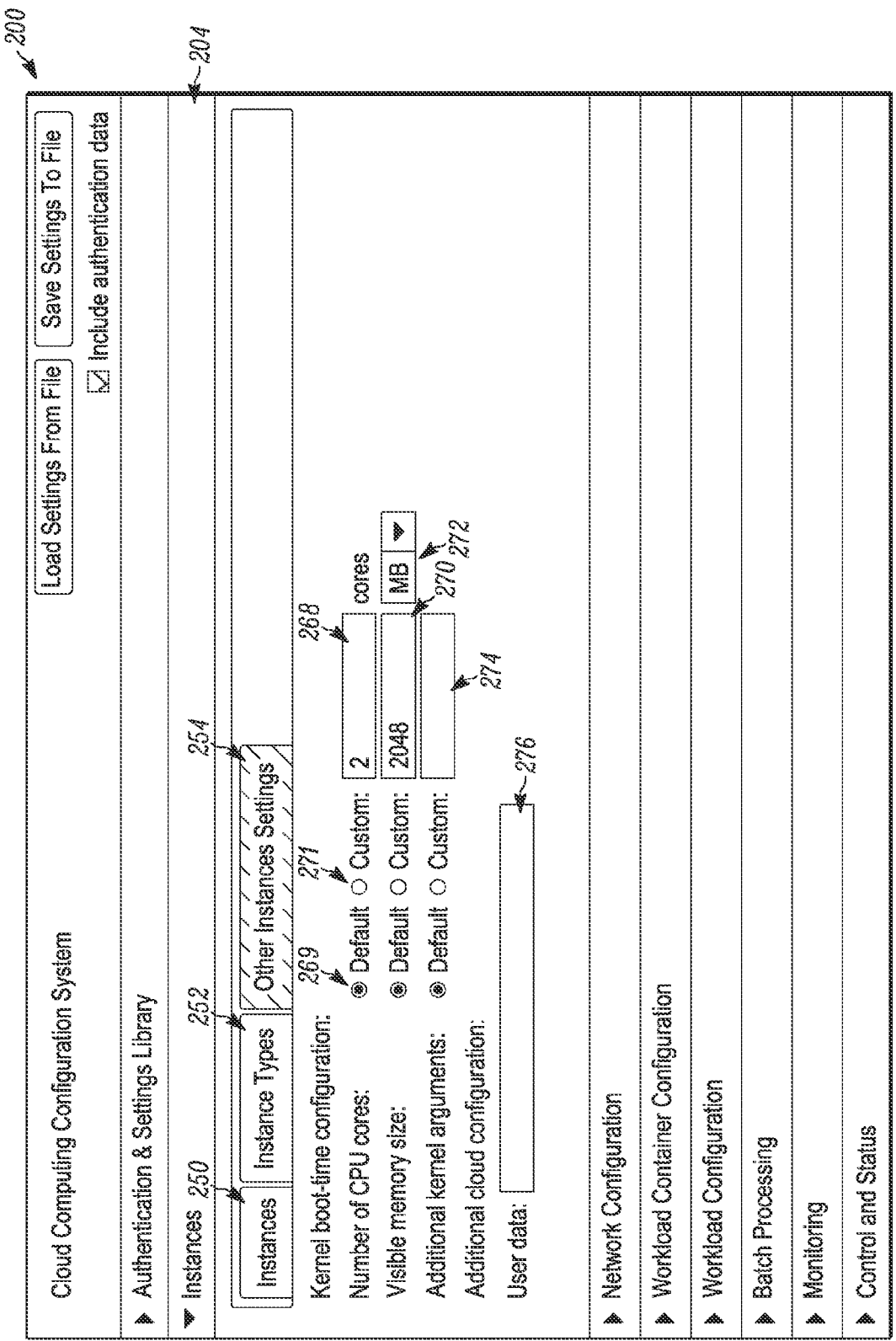
FIG. 10 illustrates an Other Instances Settings tab of the Instances module of FIG. 8 for facilitating the configuration of boot-time parameters of one or more nodes of the cluster of nodes of FIG. 1.

Referring to FIG. 10, node configurator 72 adjusts the boot-time configuration of each node 16 based on user input provided in the Instance Settings tab 254 of user interface 200. The boot-time configuration includes one or more boot-time parameters that are applied to individual nodes 16 or groups of nodes 16, or to the entire node cluster 14. Boot-time parameters such as the computing capacity, system memory capacity, and/or storage capacity of each node 16 are limited or constrained by node configurator 72 based on user inputs to fields 268, 270, 272, 274 such that the respective node 16 operates at less than a maximum capacity. The default boot-time parameters are selected based on user selection of inputs 269, and customized boot-time parameters are selected based on user selection of inputs 271. In the illustrated embodiment, the maximum setting of each adjustable parameter is the default, but a user may adjust each parameter upon selecting the "Custom" option with input 271 and entering a configuration setting into the respective field 268, 270, 272, 274.

In the illustrated embodiment, the number of processing cores of a node 16 is adjustable with field 268. For example, if the node 16 selected in table 258 of Instances tab 250 (FIG. 8) has four processing cores, the number of processing cores that are enabled during workload execution may be reduced to zero, one, two, or three cores via field 268, thereby "hiding" one or more processing cores of the selected node 16 from the operating system 44 (FIG. 2) during workload execution. The visible system memory size is adjustable based on inputs to fields 270, 272, i.e., the system memory that is accessible by operating system 44 (FIG. 2). For example, if the node 16 selected in table 258 of Instances tab 250 (FIG. 8) has a memory capacity of 2048 MB, the "visible" memory 9 (e.g., random access memory) enabled during workload execution may be reduced to less than 2048 MB, thereby "hiding" a portion of the memory from the operating system 44 (FIG. 2) during workload execution. Additional workload arguments or instructions are applied with field 274 to adjust additional boot-time parameters. The number of arguments of the workload may be increased or decreased based on a number entered into field 274. For example, a subset of the instructions of the workload are selectable for execution with field 274, thereby hiding the remaining instructions from operating system 44 (FIG. 2). Further, a node 16 having a 64-bit architecture is configurable based on input to field 274 such that it operates in a 32-bit mode wherein only 32 bits are visible to operating system 44. Additional boot-time parameters may be entered in field 276. In one embodiment, instructions or code are manually entered in field 276 by a user to provide additional cloud configuration settings. For example, the master node 16 for a map-reduce workload may be specified via field 276 such that a specific node 16 operates as master upon booting. In one embodiment, limiting the operation of one or more nodes 16 with node configurator 72 is used to test performance of cloud computing system 10, as described herein. In the illustrated embodiment, the boot-time configuration settings specified in FIG. 10 are provided in a boot-time configuration file 28 (FIG. 3) that is provided by node configurator 72 to each node 16 for adjusting the boot-time configuration of the respective nodes 16, as described herein with respect to FIGS. 36-38.

Figure 11:
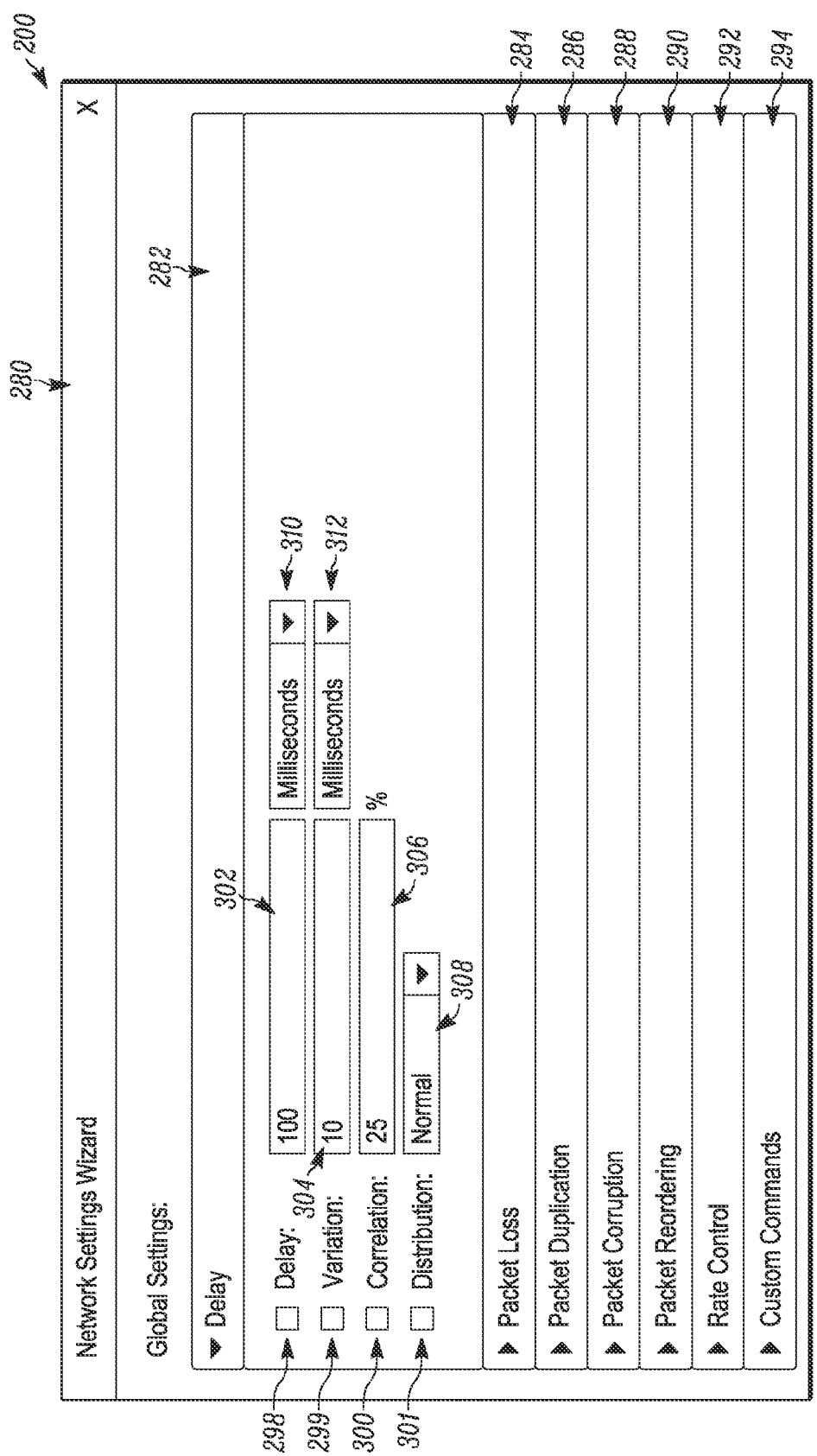
FIG. 11 illustrates a Network Settings Wizard of a Network Configuration module of the exemplary user interface of FIG. 7 including a Delay tab for facilitating the implementation of a network delay on the communication network of FIG. 1.

Configurator 22 generates the exemplary Network Settings Wizard window 280 illustrated in FIGS. 11-17 based on the user selection of the Network Configuration module 206 of FIG. 7. Referring to FIG. 11, Network Settings Wizard 280 provides multiple global network settings tabs each including selectable data for adjusting network parameters of one or more nodes 16. The adjustable network parameters include network delay via tab 282, packet loss via tab 284, packet duplication via tab 286, packet corruption via tab 288, packet reordering via tab 290, packet rate control via tab 292, and other custom commands via tab 294. Based on user selections and input via Network Settings Wizard 280 of user interface 200, network configurator 74 of FIG. 3 is operative to adjust network parameters of nodes 16 of communication network 18 of FIG. 1, as described herein. In one embodiment, the modification of network parameters is used for network testing and performance analysis and/or for adjusting system power consumption. In the illustrated embodiment, network configurator 74 artificially shapes network traffic and behavior based on user input to Network Settings Wizard 280, thereby modeling various types of network topologies. For example, different communication networks have different latencies, bandwidth, performance, etc., depending on network configuration. As such, network configurator 74 allows networks with different configurations to be implemented with the workload execution to test and analyze performance of the different networks with the selected workload. In one embodiment, the testing and analysis is done in conjunction with batch processor 80 initiating workload executions with differing network configurations. For example, an optimal network topology may be determined for execution of a particular workload with the selected hardware (node 16) configuration. In one embodiment, network configurator 74 is operative to apply network settings to certain groups or subsets of nodes 16 of node cluster 14.

Referring still to FIG. 11, selectable data associated with implementing a communication network delay is illustrated in tab 282. Network configurator 74 selects and modifies a network delay based on the user selection of inputs (illustratively boxes) 298-301 and fields 302, 304, 306, 308, 310, 312. A communication delay for each packet communication (i.e., packets carrying data or information between nodes 16 or between a node 16 and control server 12) over communication network 18 (FIG. 1) is implemented based on the selection of input 298 and the delay value entered via fields 302. A variation of the specified communication delay is implemented based on selection of input 299 and variation value entered via field 304 (e.g., illustratively a variation of plus or minus 10 milliseconds). Fields 310, 312 include drop-down menus for selecting a unit of time (e.g., milliseconds, microseconds, etc.) associated with the respective value of fields 302, 304. A correlation between specified communication delays is implemented based on selection of input 300 and a correlation value entered via field 306, illustratively a percentage correlation value. A distribution of the specified communication delay is implemented based on selection of drop-down menu 301. The distribution includes a normal distribution or other suitable distribution type.

Figure 12:
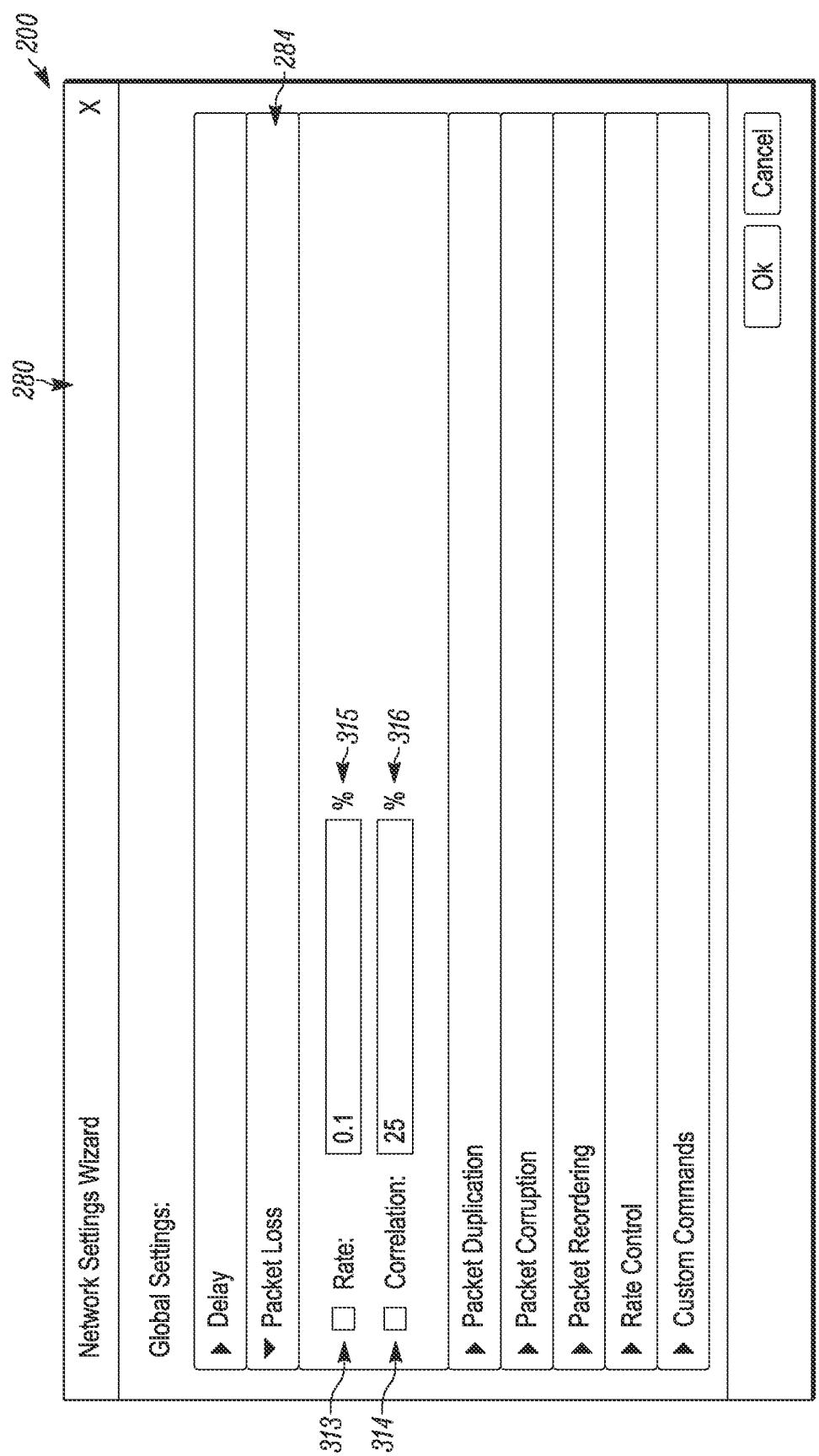
FIG. 12 illustrates a Packet Loss tab of the Network Configuration module of FIG. 11 for facilitating the adjustment of a packet loss rate on the communication network of FIG. 1.

Referring to FIG. 12, selectable data associated with implementing a network packet loss rate is illustrated in tab 284. Network configurator 74 selects and modifies a packet loss rate (i.e., the rate at which packets are artificially lost) based on the user selection of inputs (illustratively boxes) 313, 314 and fields 315, 316. A packet loss rate is implemented for packet communication over network 18 based on selection of input 313 and a rate value entered via field 315. The packet loss rate is illustratively entered as a percentage, e.g., 0.1% results in one packet lost every 1000 packets sent by the node 16. A correlation for the packet loss rate is implemented based on selection of input 314 and a correlation value entered via field 316 (illustratively a percentage value).

Figure 13:
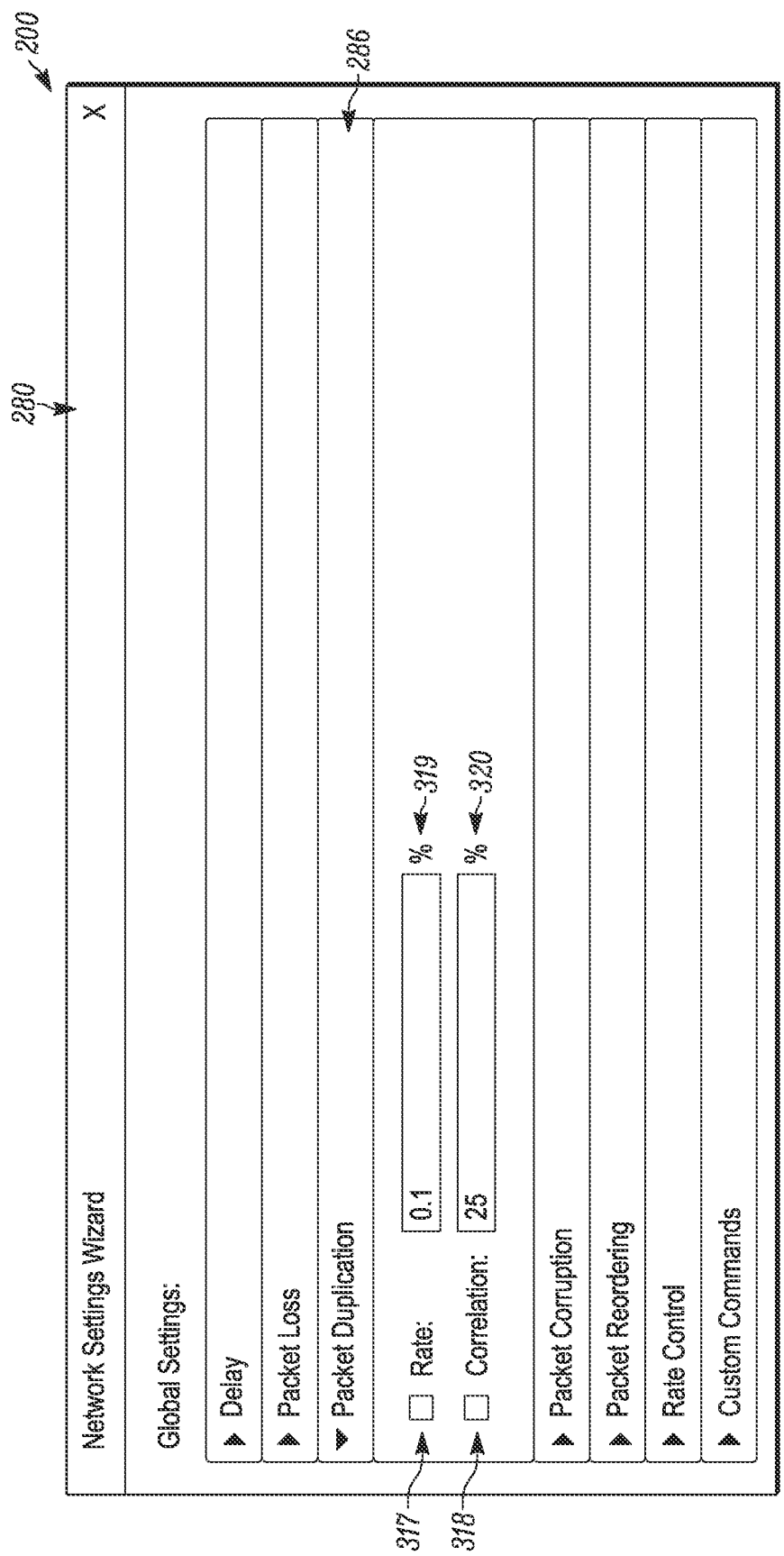
FIG. 13 illustrates a Packet Duplication tab of the Network Configuration module of FIG. 11 for facilitating the adjustment of a packet duplication rate on the communication network of FIG. 1.

Referring to FIG. 13, selectable data associated with implementing a network packet duplication rate is illustrated in tab 286. Network configurator 74 selects and modifies a packet duplication rate (i.e., the rate at which packets are artificially duplicated) based on the user selection of inputs (illustratively boxes) 317, 318 and fields 319, 320. A packet duplication rate is implemented for packet communication over network 18 based on selection of input 317 and a rate value entered via field 319. The packet duplication rate is illustratively entered as a percentage, e.g., 0.1% results in one packet duplicated for every 1000 packets sent by the node 16. A correlation for the packet duplication rate is implemented based on selection of input 318 and a correlation value entered via field 320 (illustratively a percentage value).

Figure 14:
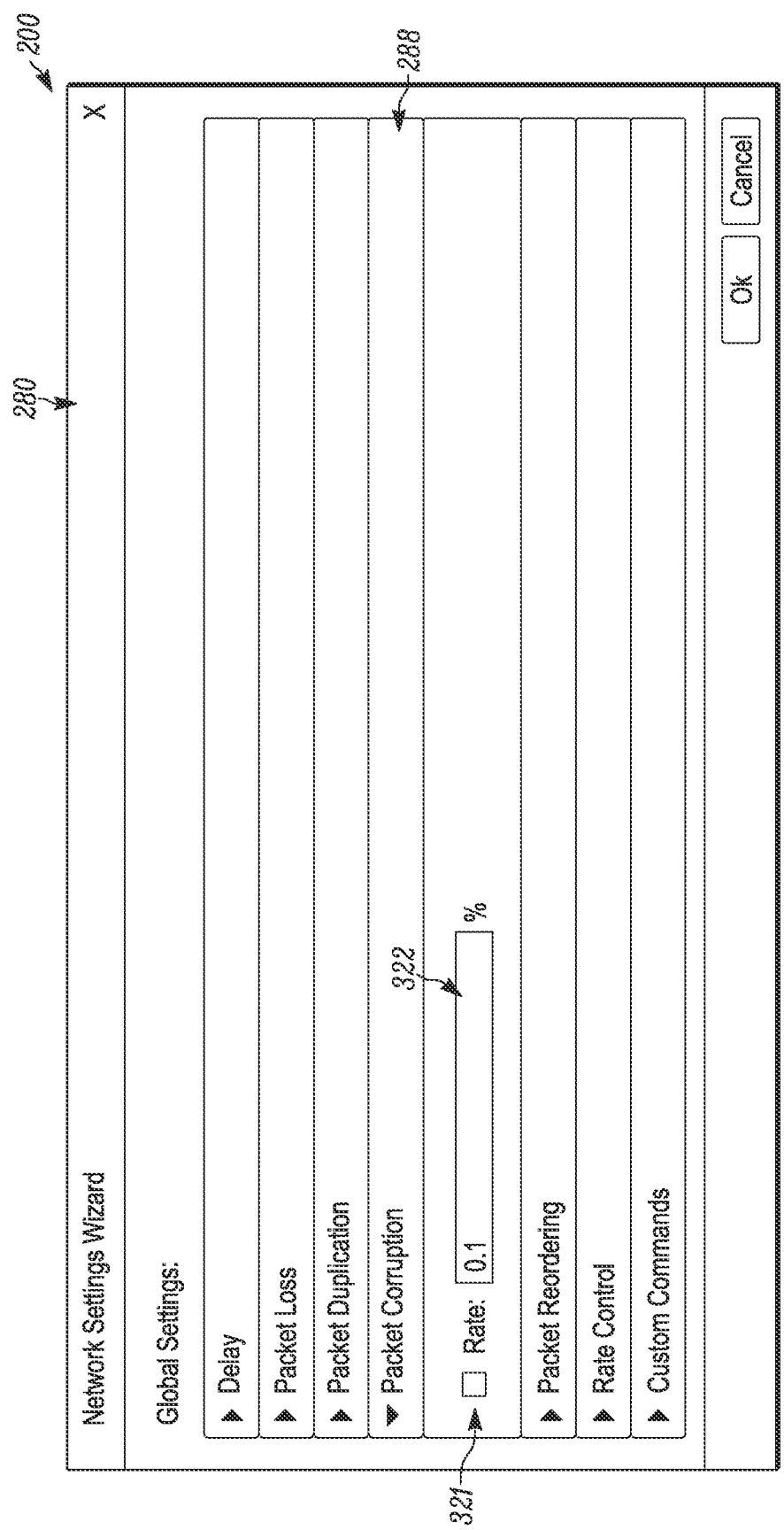
FIG. 14 illustrates a Packet Corruption tab of the Network Configuration module of FIG. 11 for facilitating the adjustment of a packet corruption rate on the communication network of FIG. 1.

Referring to FIG. 14, selectable data associated with implementing a network packet corruption rate is illustrated in tab 288. Network configurator 74 selects and modifies a packet corruption rate (i.e., the rate at which packets are artificially corrupted) based on the user selection of input (illustratively box) 321 and field 322. A packet corruption rate is implemented for packet communication over network 18 based on selection of input 321 and a rate value entered via field 322. The packet corruption rate is illustratively entered as a percentage, e.g., 0.1% results in one packet corrupted for every 1000 packets sent by the node 16. In one embodiment, a correlation for the packet corruption rate may also be selected and implemented.

Figure 15:
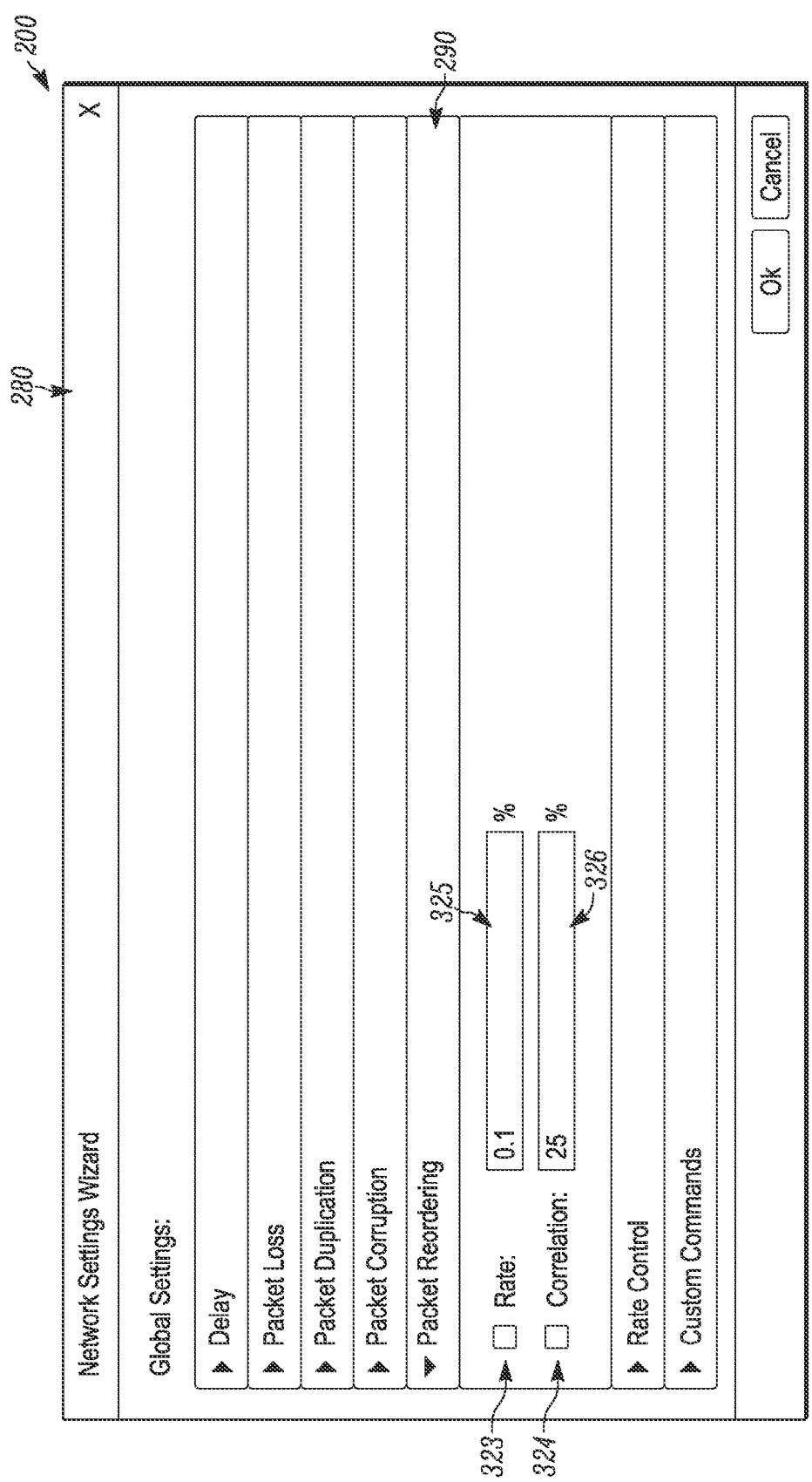
FIG. 15 illustrates a Packet Reordering tab of the Network Configuration module of FIG. 11 for facilitating the adjustment of a packet reordering rate on the communication network of FIG. 1.

Referring to FIG. 15, selectable data associated with implementing a network packet reordering rate is illustrated in tab 290. Network configurator 74 selects and modifies a packet reordering rate (i.e., the rate at which packets are placed out of order during packet communication) based on the user selection of inputs (illustratively boxes) 323, 324 and fields 325, 326. A packet reordering rate is implemented for packet communication over network 18 based on selection of input 323 and a rate value entered via field 325. The packet reordering rate is illustratively entered as a percentage, e.g., 0.1% results in one packet reordered for every 1000 packets sent by the node 16. A correlation for the packet reordering rate is implemented based on selection of input 324 and a correlation value entered via field 326 (illustratively a percentage value).

Figure 16:
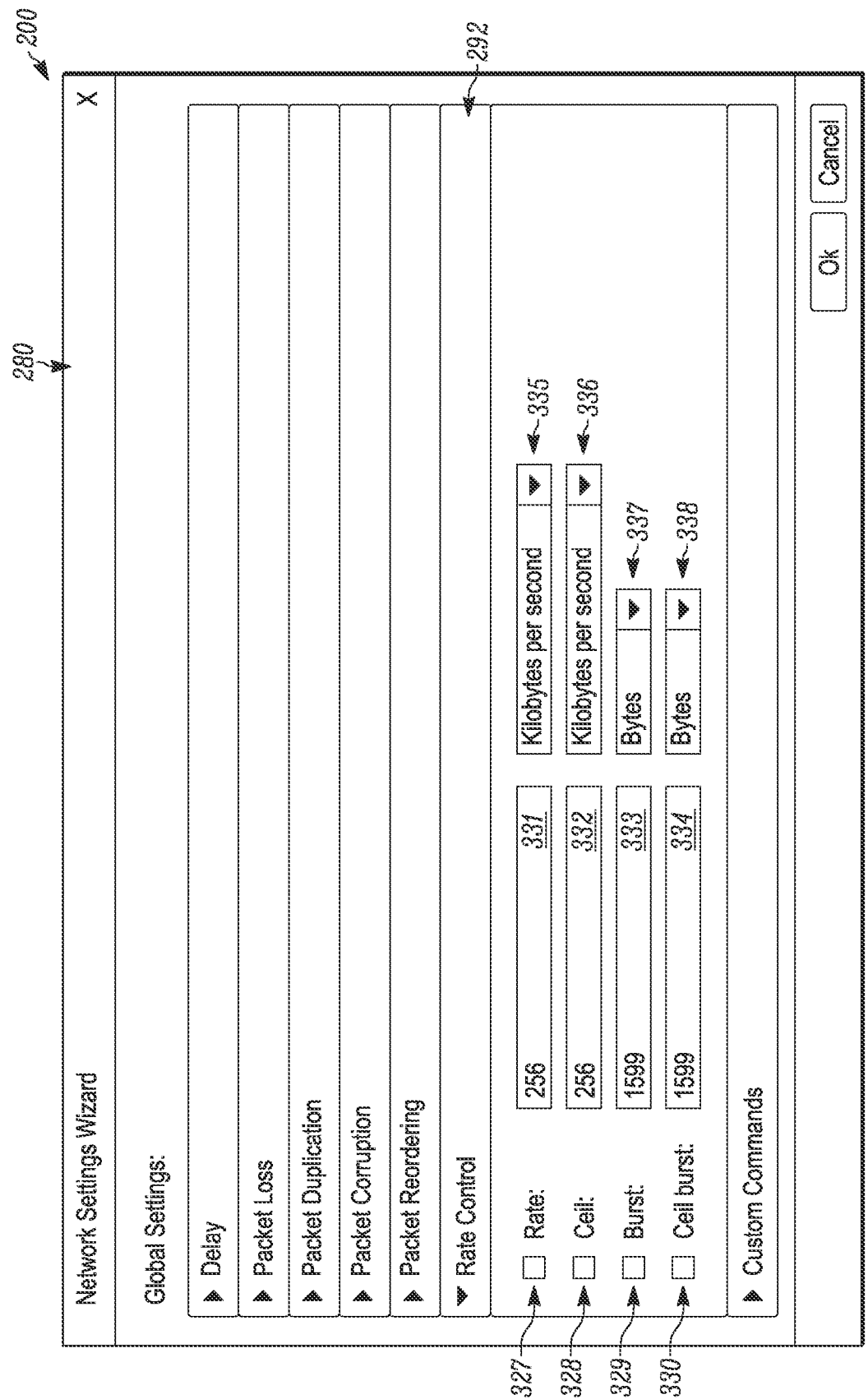
FIG. 16 illustrates a Rate Control tab of the Network Configuration module of FIG. 11 for facilitating the adjustment of a communication rate on the communication network of FIG. 1.

Referring to FIG. 16, selectable data associated with implementing a network communication rate is illustrated in tab 292. Network configurator 74 selects and modifies a packet communication rate (i.e., the rate at which packets are communicated between nodes 16) based on the user selection of inputs (illustratively boxes) 327-330 and fields 331-338. A packet communication rate is implemented for communication network 18 based on selection of input 327 and a rate value entered via field 331, and a ceiling (maximum) for the packet communication rate is implemented based on selection of input 328 and a ceiling value entered via field 332. A packet burst is implemented based on selection of input 329 and a packet burst value entered via field 333, and a ceiling (maximum) for the packet burst is implemented based on selection of input 330 and a ceiling value entered via field 334. Fields 335 and 336 provide drop-down menus for selecting rate units (illustratively kilobytes per second), and fields 337 and 338 provide drop-down menus for selecting burst units (illustratively in bytes).

Figure 17:
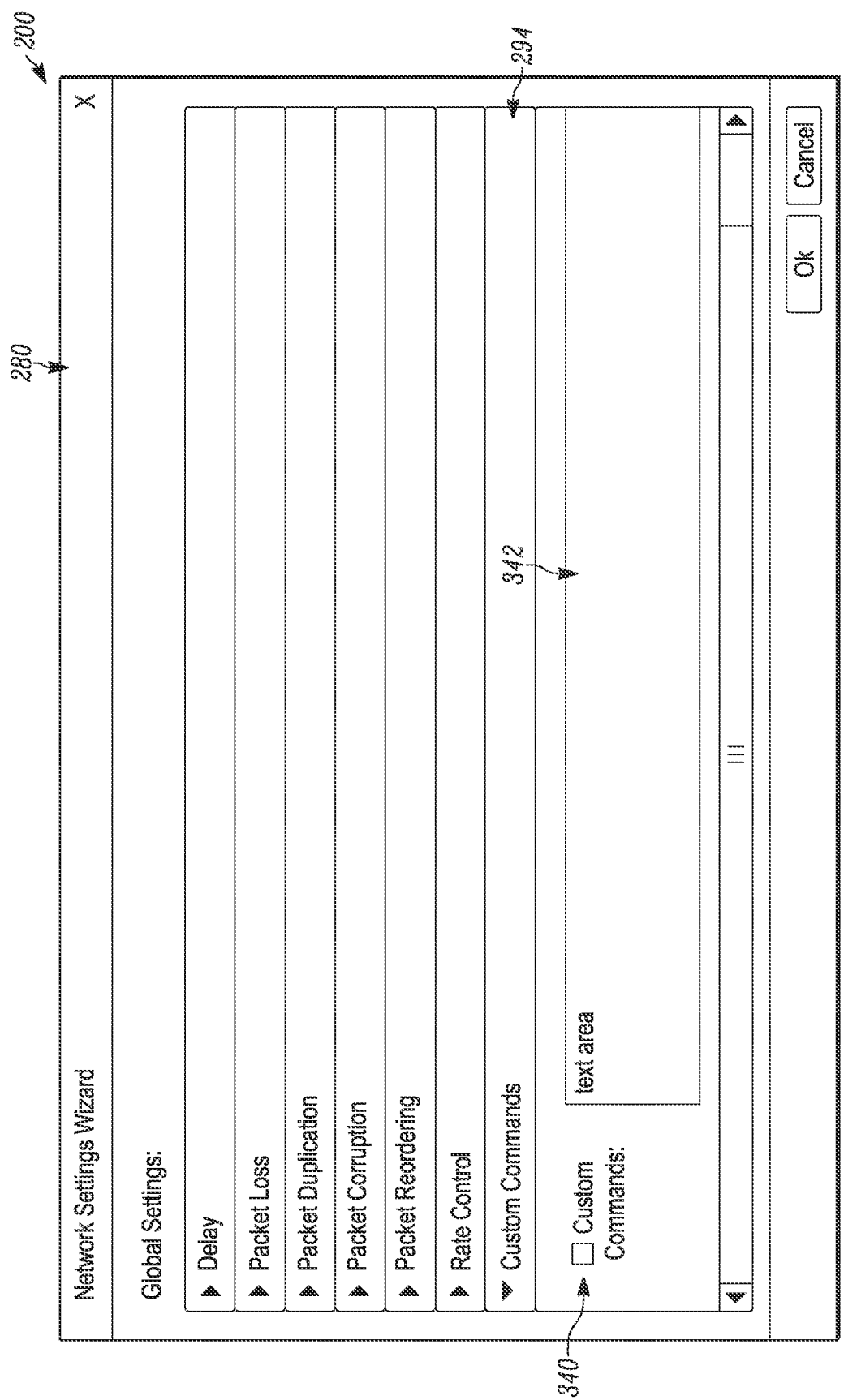
FIG. 17 illustrates a Custom Commands tab of the Network Configuration module of FIG. 11 for facilitating the adjustment of network parameters on the communication network of FIG. 1 based on custom command strings.

Referring to FIG. 17, selectable data associated with implementing a network communication rate is illustrated in tab 292. Network configurator 74 provides custom commands for modifying network parameters associated with one or more nodes 16 on communication network 18 based on the user selection of input (illustratively box) 340 and custom commands entered via field 342.

Figure 18:
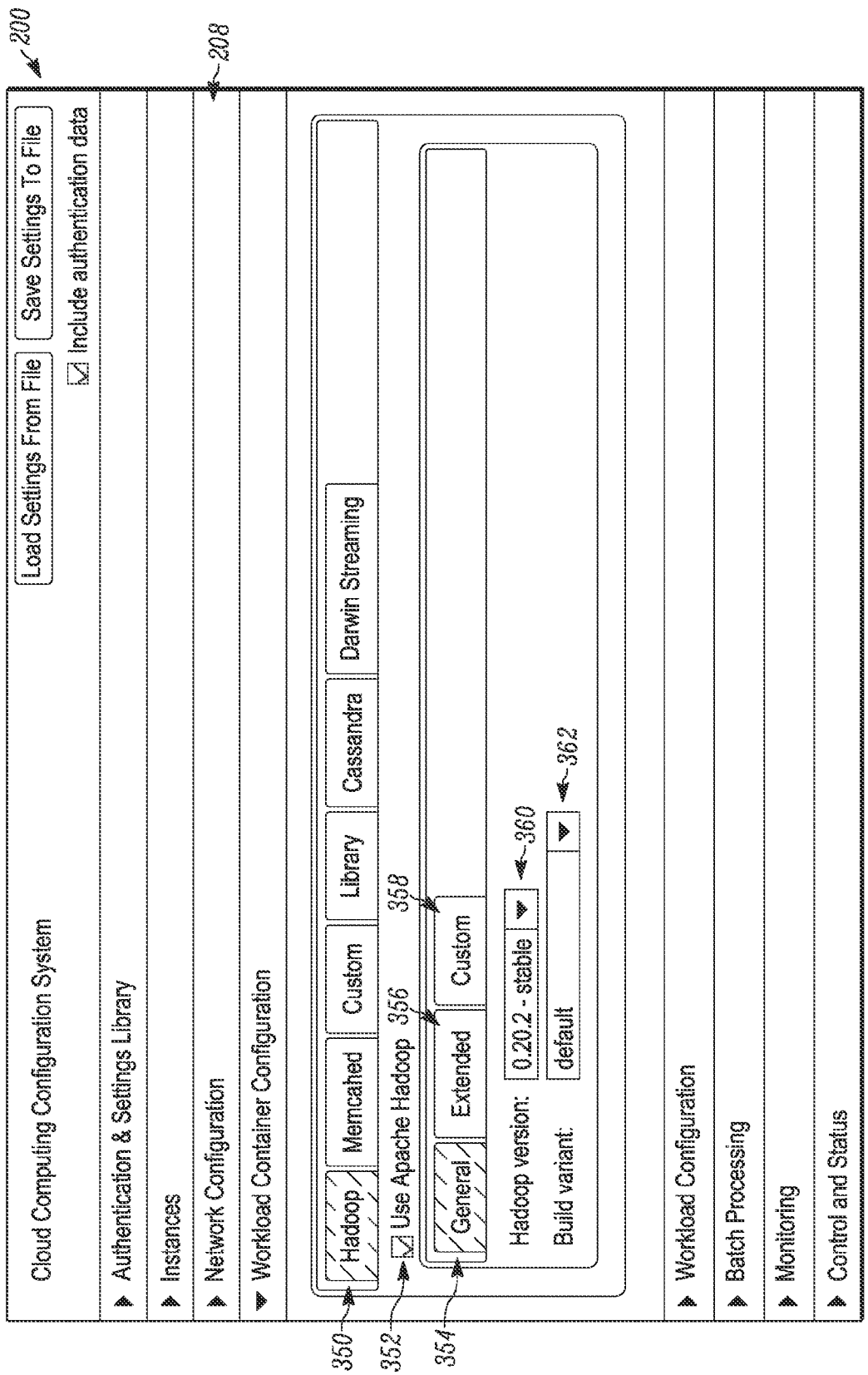
FIG. 18 illustrates a Workload Container Configuration module of the exemplary user interface of FIG. 7 including a Hadoop tab for facilitating the selection of a Hadoop workload container.

Referring to FIG. 18, the Workload Container Configuration module 208 is selected. Based on user input to module 208 (e.g., the user selection of selectable workload container data, such as inputs 352, 360, 362), workload container configurator 76 is operative to select and to configure a workload container module for operation on the node cluster 14. Module 208 includes multiple selectable tabs 350 corresponding to various available workload container modules. Each available workload container module includes a selectable code module that when executed is operative to initiate and control execution of the workload on node cluster 14. The workload container modules available via module 208 in the illustrative embodiment include several third party, commercially available workload container modules such as Apache Hadoop, Memcached, Cassandra, and Darwin Streaming. Cassandra is an open-source distributed database management system that provides a key-value store for providing basic database operations. Darwin Streaming is an open-source implementation of a media streaming application, such as QuickTime provided by Apple, Inc., that is utilized to stream a variety of movie media types. While open-source workload container software is illustratively provided via module 208, closed-source workload container software may also be provided for selection. For example, license information associated with the closed-source workload container software may be input or purchased via user interface 200. One or more custom workload container modules may also be loaded and selected via the "Custom" tab of module 208. Other workload container modules may be provided. A "Library" tab is also provided that provides access to a library of additional workload container modules available for selection, such as previously-used custom workload container modules, for example.

Under the "Hadoop" tab of FIG. 18, workload container configurator 76 selects the Apache Hadoop workload container module based on user selection of input 352. The version and build variant of Apache Hadoop is selectable via drop-down menus 360, 362, respectively, under the General tab 354. Operational parameters of the selected workload container module are adjustable by workload container configurator 76 based on user input provided via the Extended tab 356 and the Custom tab 358. The operational parameters available for adjustment illustratively depend on the selected workload container module. For example, with Apache Hadoop selected as the workload container module, Extended tab 356 illustrated in FIG. 19 displays a table 366 of exemplary selectable operational parameters of the Apache Hadoop workload container module that are configurable by workload container configurator 76. Workload container configurator 76 selects the operational parameters for configuration based on user selection of corresponding selection boxes 367. Table 366 provides several fields for workload container configurator 76 to receive configuration data, including an override field 374, a master value field 378, and a slave value field 380. Based on user selections in the override field 374, the nodes 16 are selected whose workload containers are to be adjusted with the corresponding operational parameter. Nodes 16 are selected in the override field 374 based on user selections in the corresponding dropdown menus or based on user selections of inputs 384. Illustratively, the selection of "never" results in the default configuration of the corresponding operational parameter being implemented at all nodes 16, the selection of "master" or "slaves" results in the implementation of the parameter adjustment at the master node 16 or at the slave nodes 16, respectively, and the selection of "always" results in the implementation of the parameter adjustment at all nodes 16 of the node cluster 14. Alternatively, individual nodes 16 of node cluster 14 may be selected for implementation of the adjusted operational parameter.

In the master value field 378 and slave value field 380, a constraint, data value, or other user selection provides the adjustment value for the corresponding operational parameter of the workload container in the respective master node 16 or slave nodes 16. A property name field 376 illustratively lists the name of the associated operational parameter as referenced in the code module of the selected workload container module. A description field 382 illustratively displays a general description to the user of the associated operational parameter. Inputs 386 allow a user to select or to deselect all operational parameters listed in table 366. Input 388 allows a user to reverse or "undo" a previous selection or parameter change, and input 390 allows a user to reset the values provided in fields 374, 378, and 380 to the default settings.

Exemplary operational parameters adjustable with workload container configurator 76 based on user selections in table 366 include operational parameters associated with read/write (I/O) operations of the node 16, sorting operations, the configuration of the network socket operation (e.g., TCP socket connection) of the node 16, and the file system 55 (e.g., HDFS for Apache Hadoop) of the workload container. Operational parameters associated with read/write operations include, for example, a memory buffer size of the node 16 and a size of a data block transferred during the read/write operation. The memory buffer size, illustratively shown in row 368 of table 366, corresponds to how much data is buffered (temporarily stored in cache) during read/write (I/O) operations of the node 16. In the illustrated embodiment, the memory buffer size is a multiple of a memory page or data block size of the node hardware. A memory page or data block, as described herein, refers to a fixed-length block of virtual memory of a node 16 that is the smallest unit of data used for memory allocation and memory transfer. In row 368 of FIG. 19, the master and slave node values are illustratively set to 4096 bits, but these values may be adjusted to 8192 bits or another suitable multiple of the data block size of the node processor 40 (FIG. 2). Similarly, the size of the data block transferred during read/write operations is also adjustable based on user input to table 366.

Operational parameters associated with sorting operations include, for example, the number of data streams to merge simultaneously when sorting data. Operational parameters associated with the file system (e.g., file system 55 of FIG. 2) of the workload container include the number of file system records or files stored in memory 42 of each node 16 (see row 370, for example) and the number of processing threads of each node 16 allocated for processing requests for the file system 55. In the exemplary row 370 of table 366, the number of records stored in memory 42 for file system 55 of FIG. 2 is 100000 records for both the master and slave nodes 16, although other suitable record limits may be entered. In one embodiment, limiting the number of file system records serve to limit the replication of files by file system 55.

Operational parameters associated with the configuration and operation of the network socket, such as TCP network socket described herein, involve the interaction of the workload container with the network socket. For example, the communication delay or latency of the network socket and the number of packets sent over network 18 (FIG. 1) may be adjusted. For example, row 372 of table 366 allows for the activation/deactivation via fields 378, 380 of an algorithm, illustratively "Nagle's algorithm" known in the art, to adjust the latency and number of data packets sent via the TCP socket connection of the node 16. Other suitable operational parameters associated with the operation of network socket may be adjusted.

Another exemplary operational parameter adjustable by workload container configurator 76 includes the number of software tasks executed concurrently by processor 40 of node 16. For example, a user may specify a number of tasks (e.g., Java tasks) to run concurrently during workload execution via input to table 366, and workload container configurator 76 adjusts the number of tasks accordingly. Other suitable operational parameters associated with the workload container may be adjustable.

Figure 20:
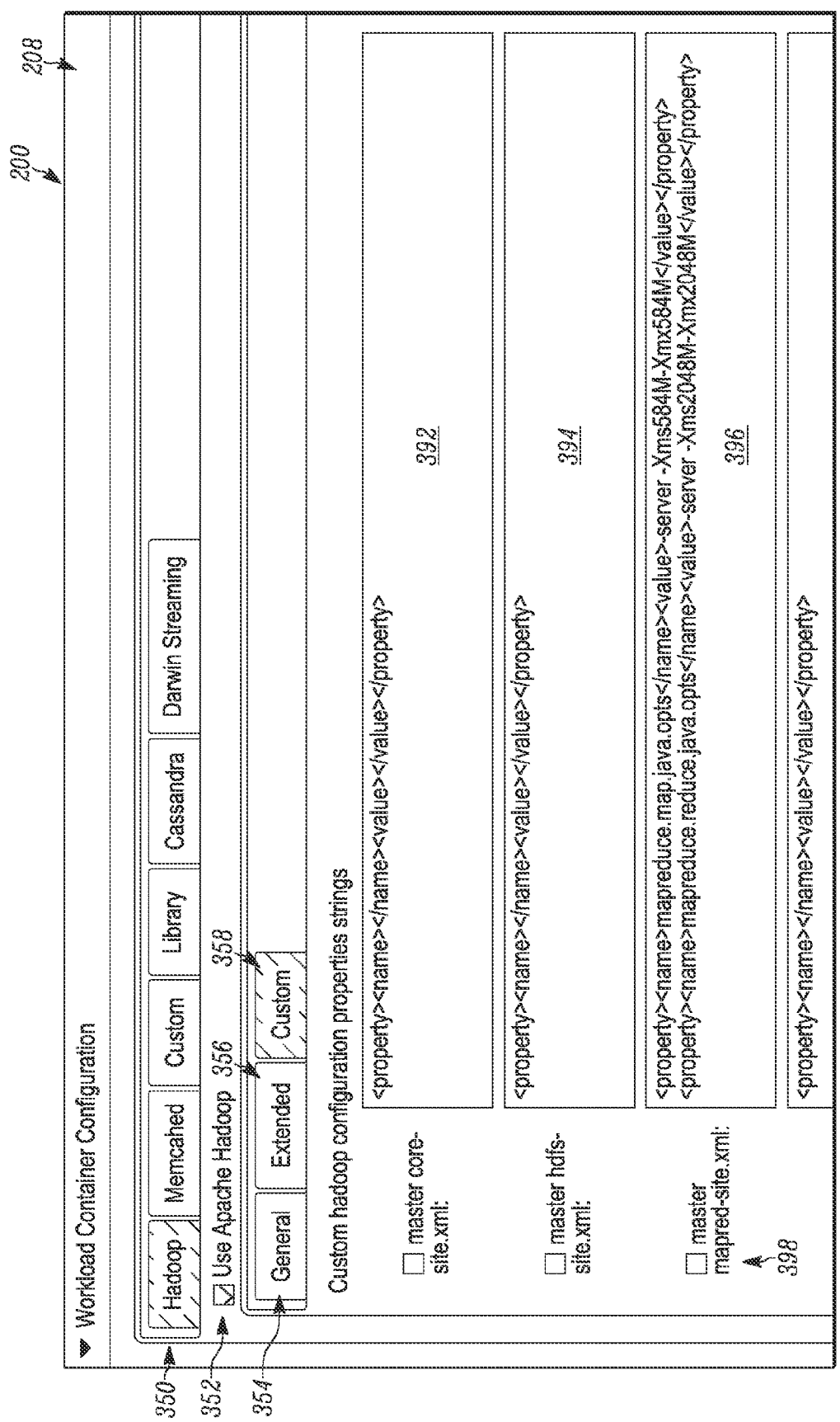
FIG. 20 illustrates the Hadoop tab of the Workload Container Configuration module of FIG. 18 including a Custom tab for facilitating the configuration of operational parameters of the Hadoop workload container based on custom command strings.

Referring to Custom tab 358 of FIG. 20, additional configuration adjustments may be implemented for the selected workload container module, illustratively the Hadoop workload container module, to allow for further customization of the selected workload container module. Workload container configurator 76 further adjusts the configuration of the selected workload container module based on command strings input into fields 392, 394, and 396 and user selection of corresponding selectable boxes 398. In the illustrated embodiment, each of these fields 392, 394, 396 specify configurations that apply, respectively, to the Hadoop master node, the Hadoop file system, and the parameters related to map-reduce execution, such as number of tasks in a task tracker, the local directory of where to place temporary data, and other suitable parameters.

Operational parameters associated with the other available workload container modules (e.g., Memcached, Cassandra, Darwin Streaming, etc.) are adjusted similarly as described with the Hadoop workload container module. Based on the workload container module selected based on input 352 and the configuration information provided via tabs 354, 356, 358 of module 208, workload container configurator 76 generates a workload container image file 94 (FIG. 3) for loading onto nodes 16 of node cluster 14. In one embodiment, a workload container image file 94 is saved in memory 90 of control server 12 or in memory 42 of nodes 16, and workload container configurator 76 updates the image file 94 with the configuration information. In one embodiment, multiple configurations of the workload container module may be saved and then run in a sequence, such as for exploring the impact of the workload container configuration changes on workload and system performance, for example.

Referring to FIG. 21, workload container configurator 76 selects a user-defined custom workload container module for execution on nodes 16 based on user selection of inputs 353, 401 of the "Custom" tab of module 208. In the illustrated embodiment, a custom workload container module includes a workload container module that is provided by a user and that may not be commercially available, as described herein. Workload container configurator 76 illustratively loads a compressed zip file that includes a workload container code module. In particular, the zip file includes a configuration file or script that contains user-defined parameters for coordinating the execution of a workload on node cluster 14. As illustrated in FIG. 21, table 400 provides a list of loaded custom workload container modules that are stored at control server 12 (or at computer 20) and are available for user selection via selectable input(s) 401. Additional custom workload container modules are uploaded or downloaded and displayed in table 400 based on user selection of inputs 402, 404, respectively, and a custom workload container module is deleted from table 400 based on user selection of input 403. A user may enter the zip folder path and/or configuration script path via respective fields 406, 408. In one embodiment, the custom workload container module is stored remote from cloud computing system 10, such as on memory 34 of computer 20 (FIG. 1), and is uploaded onto memory 90 (FIG. 3) of control server 12 based on user selection of input 402.

Referring to FIG. 22, the Workload Configuration module 210 is selected. Based on user input to module 210, workload configurator 78 (FIG. 3) is operative to select and configure a workload for execution with the selected workload container module by node cluster 14. Workload configurator 78 is also operative to generate a synthetic test workload based on user-defined workload parameters that is executed on nodes 16 with the selected workload container module. Module 210 includes several selectable tabs including a workload tab 410, a synthetic kernel tab 412, an MC-Blaster tab 414, a settings library tab 416, and a CloudSuite tab 417. Under the workload tab 410 of FIG. 22, the workload to be executed is selected by workload configurator 78 based on user selection of selectable workload data, illustratively including selectable inputs 418, 424, and 428. The available workloads illustratively include a workload adapted for execution on a Hadoop workload container (inputs 418), a workload adapted for execution on a Memcached workload container (input 424), or any another suitable workload configured for a selected workload container, such as a custom workload (input 428), for example.

Referring to FIG. 22, a Hadoop workload is selected from an actual workload and a synthetic test workload based on user selection of one of corresponding inputs 418. The actual workload, which includes a pre-defined code module adapted for the map-reduce functionality of the Hadoop workload container, is loaded onto control server 12 based on an identification of the storage location of the actual workload in field 422. In one embodiment, the actual workload is stored on a memory remote from cloud computing system 10, such as memory 34 of FIG. 1, and is uploaded to memory 90 of control server 12 via field 422. In another embodiment, the actual workload is a sample Hadoop workload that is provided with the Hadoop workload container module or is another workload pre-loaded onto control server 12. A synthetic test workload is also selectable based on user selection of corresponding input 418 for execution on a Hadoop workload container. The number of input records or instructions to be generated with the synthetic test workload and to be processed in the "map" phase of the synthetic test workload may be entered via field 420 and provided as input to synthesizer 79 of workload configurator 78 (FIG. 3), as described herein. Other input parameters for the generation of the synthetic test workload by synthesizer 79 are configured via the synthetic kernel tab 412, as described herein. While the synthetic test workload is illustratively adapted for execution with a Hadoop workload container, synthetic test workloads may also be selected and generated for other available workload containers.

A custom script is loaded as a pre-defined, actual workload for execution with a selected workload container module via field 430 and upon user selection of input 428. The custom script comprises user-provided code that includes one or more execution commands that are executed with the selected workload container module by node cluster 14. In the illustrated embodiment, the custom script is used as the workload executed during system testing with batch processor 80, wherein various network, workload container, and/or other system configuration changes are made during sequential workload executions to monitor the effects on system performance, as described herein.

Figure 24:
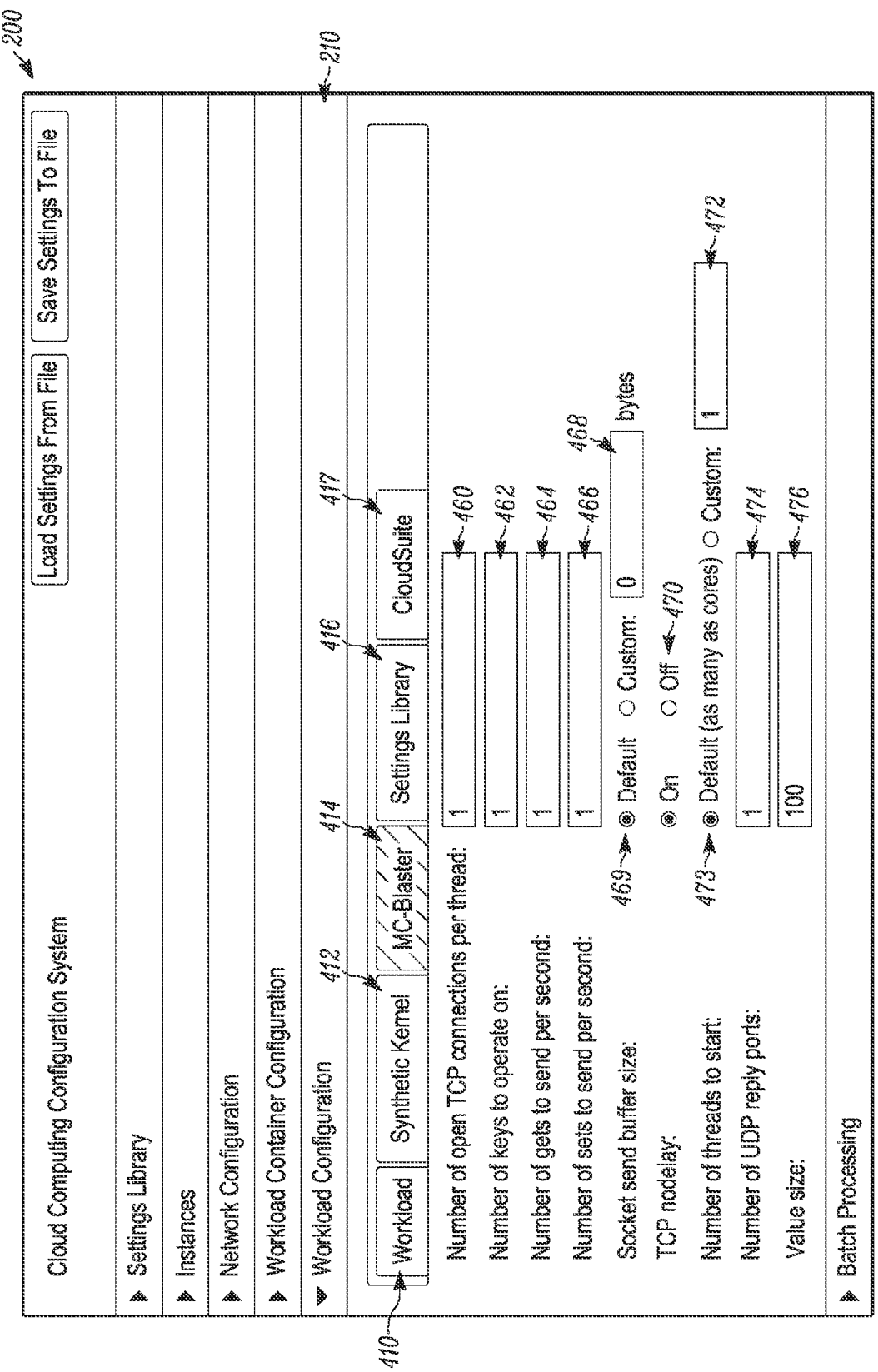
FIG. 24 illustrates a MC-Blaster tab of the Workload Configuration module of FIG. 22 for facilitating the configuration of a Memcached workload.

A pre-defined workload may also be loaded for execution with a Memcached workload container based on user selection of input 424. In one embodiment, the Memcached workload includes an in-memory acceleration structure that stores key-value pairs via "set" commands and retrieves key-value pairs via "get" commands. A key-value pair is a set of two linked data items including a key, which is an identifier for an item of data, and a value, which is either the data identified with the key or a pointer to the location of that data. The Memcached workload illustratively operates with a selectable MC-Blaster tool whose run time is selected based on an input value to field 426. MC-Blaster is a tool to stimulate the system under test by generating requests to read/write records from Memcached on a number of network (e.g., TCP) socket connections. Each request specifies a key and a value. The MC-Blaster tool is configured via MC-Blaster tab 414 of FIG. 24. Referring to FIG. 24, input to field 460 specifies the number of TCP connections to utilize per processing thread, input to field 462 specifies the number of keys to operate on, and input to fields 464 and 466 specify the number of 'get' and 'set' commands requested to be sent per second, respectively. A user-specified (custom) buffer size may be implemented by workload configurator 78 based on selection of corresponding input 469 and a value entered into field 468, and a TCP request may be delayed based on selection of "on" input 470. A number of processing threads to start may be customized by workload configurator 78 based on user selection of corresponding input 473 and a value entered in field 472. The default number of processing threads is equal to the number of active processing cores of the node 16. The number of UDP replay ports is selected based on input to field 474, and the size (in bytes) of the value stored (or returned) resulting from workload execution is selected based on input to field 476.

Figure 23:
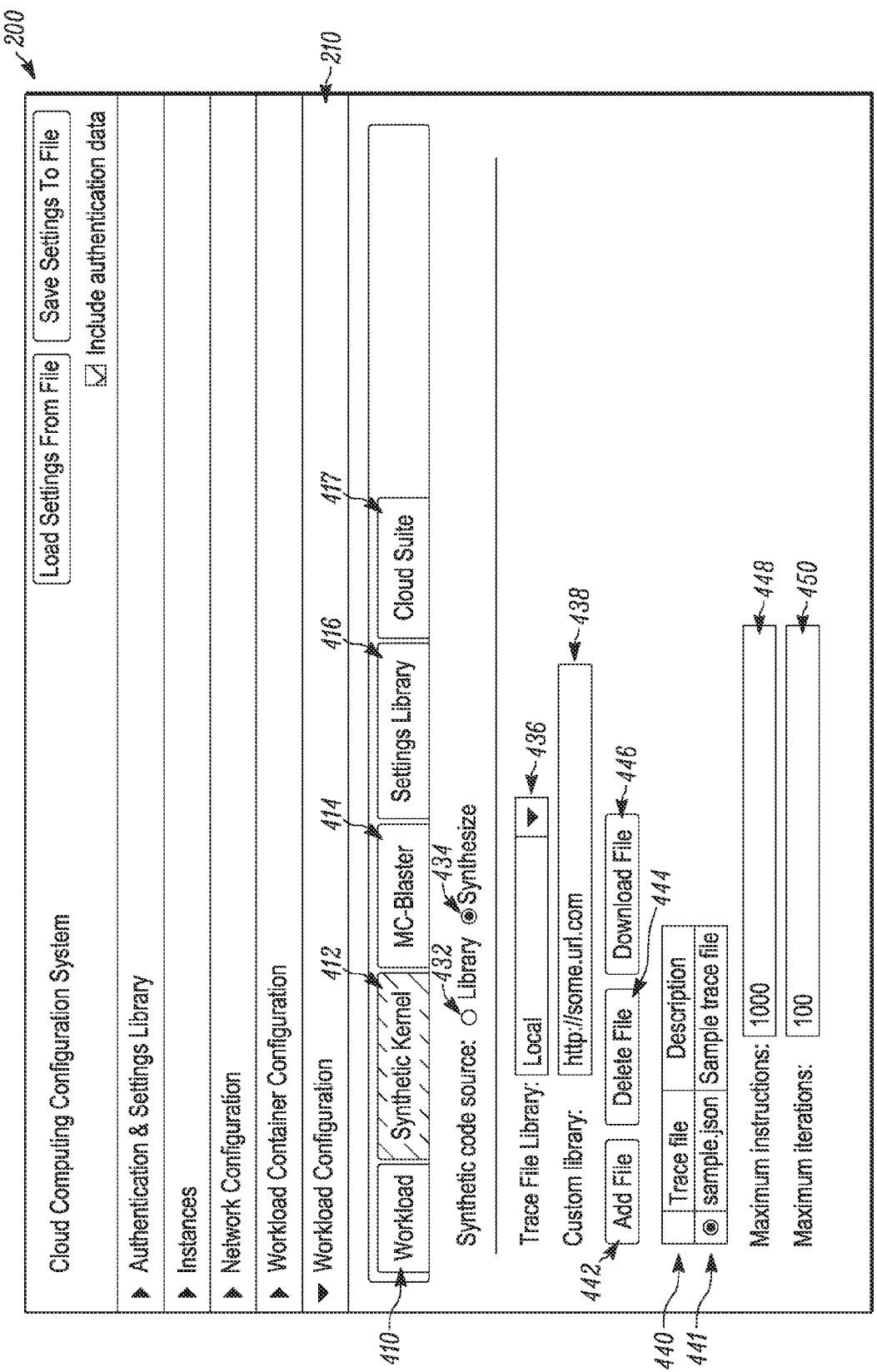
FIG. 23 illustrates a Synthetic Kernel tab of the Workload Configuration module of FIG. 22 for facilitating the configuration of a synthetic test workload.

Referring to FIG. 23, a synthetic test workload is generated by synthesizer 79 based on user input provided via synthetic kernel tab 412. In particular, synthesizer 79 of workload configurator 78 (FIG. 3) generates a synthetic test workload based on user-defined parameters provided in a code module, illustratively a trace file (e.g., configuration file), that is loaded onto memory 90 of control server 12. The trace file includes data that describe desired computational characteristics of the synthetic test workload, as described herein. Upon user selection of the "synthesize" input 434 of FIG. 23, the location of the stored trace file may be identified based on user input to field 436 or field 438. Field 436 illustratively identifies a hard disk location (e.g., memory 34 of computer 20 of FIG. 1) containing the trace file, and field 438 illustratively identifies the web address or URL for retrieving the trace file. Table 440 displays the trace files and previously generated synthetic test workloads that are loaded and available for selection. A trace file is loaded and displayed in table 440 with user selection of input 442, deleted from table 440 with user selection of input 444, and downloaded (i.e., from the URL identified in field 438) based on user selection of input 446. The trace file is illustratively a JSON file format, although other suitable file types may be provided. A maximum number of instructions to be generated in the synthetic test workload is identified in field 448, and a maximum number of iterations of the generated synthetic test workload is identified in field 450. Alternatively, a previously generated synthetic test workload is loaded by workload configurator 78 based on user selection of Library input 432, the identification of the stored location (local hard drive, website, etc.) of the synthetic test workload with field 436 or 438, and the user selection of the input 441 corresponding to the desired pre-generated synthetic test workload displayed in table 440. The maximum number of instructions and iterations of the previously generated synthetic test workload is adjustable with fields 448, 450.

The trace file includes a modifiable data structure, illustratively a table having modifiable fields, that identifies the workload characteristics and user-defined parameters used as input by synthesizer 79 for generating the synthetic test workload. The table is displayed on a user interface, such as with user interface 200 or a user interface of user computer 20, such that the fields of the table may be modified based on user input and selections to the table. See, for example, table 150 of FIG. 32 described herein. The trace file further identifies at least a portion of a target instruction set architecture (ISA) used as input by synthesizer 79. The trace file further identifies other characteristics associated with instructions of the synthetic workload, including: inter-instruction dependencies (e.g., a first instruction depends on the completion of a second instruction before executing the first instruction), memory register allocation constraints (e.g., constrain an instruction to take a value from a particular register), and architectural execution constraints (e.g., a limited number of logic units being available for executing a particular type of instruction). As such, configurator 22 is operative to predict how long workload instructions should take to execute based on the execution characteristics specified in the trace file.

Exemplary user-defined workload parameters set forth in the trace file include the following: the total number of instructions to be generated; the types of instructions to be generated including, for example, a floating point instruction, an integer instruction, and a branch instruction; the behavior (e.g., execution flow) of instruction execution, such as, for example, the probabilities of the execution flow branching off (i.e., whether branches are likely to be taken during instruction execution or whether execution will continue along the execution flow path and not jump to a branch); the distribution of data dependencies among instructions; the average size of basic blocks that are executed and/or transferred; and the latencies associated with instruction execution (i.e., length of time required to execute an instruction or instruction type, such as how many cycles a particular instruction or instruction type requires for execution). In one embodiment, the user-defined workload parameters specify which specific instructions to use as integer instructions or floating point instructions. In one embodiment, the user-defined workload parameters specify the average number and statistical distribution of each instruction type (e.g., integer, floating point, branch). In one embodiment, each instruction includes one or more input and output arguments.

Figure 32:
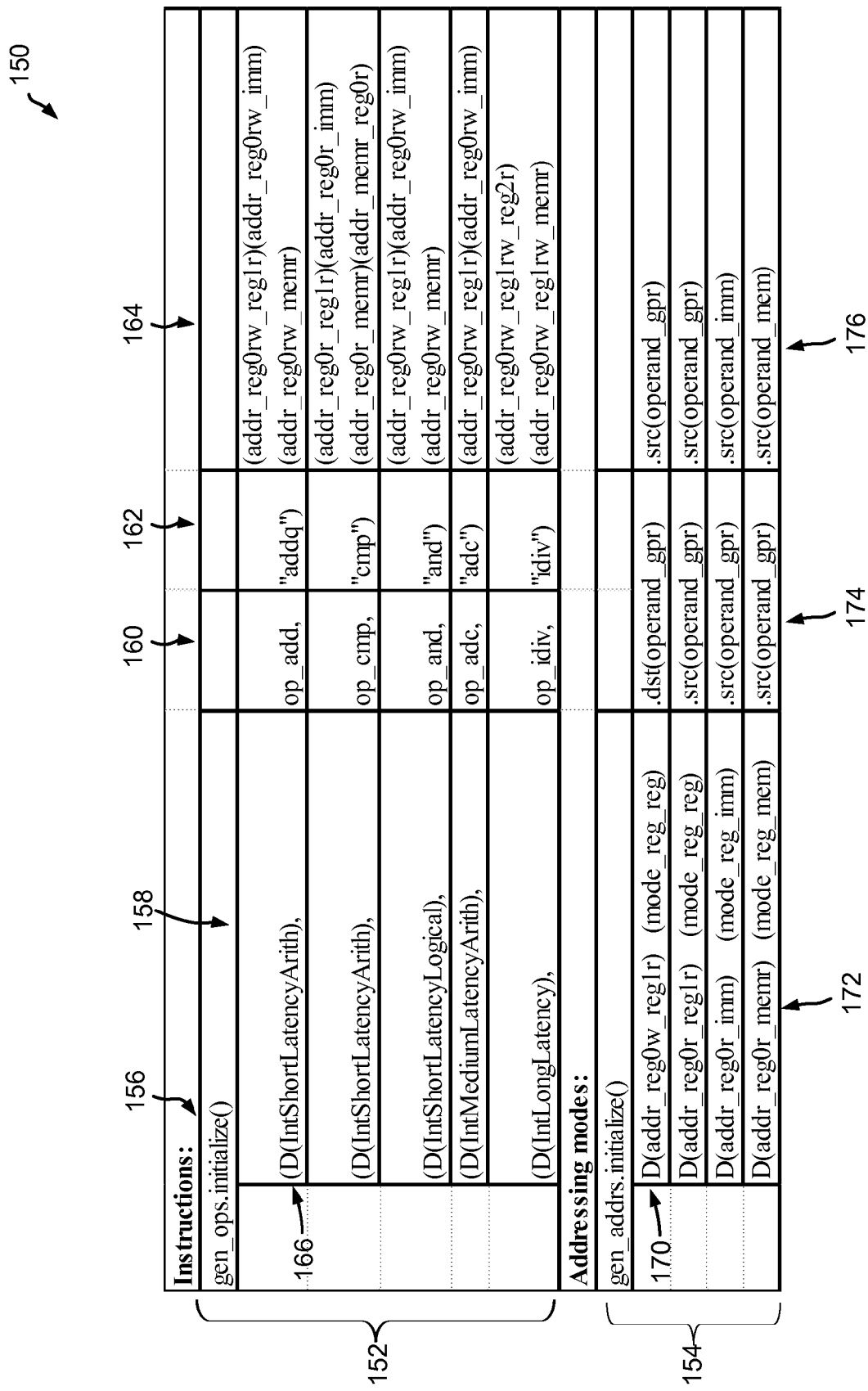
FIG. 32 illustrates an exemplary table illustrating a plurality of user-defined workload parameters for generating a synthetic test workload.

In the illustrated embodiment, the workload parameters and instruction set architecture data set forth in the trace file are provided in a table-driven, retargetable manner. Based on changes to the contents of the table, configurator 22 is operative to target different microarchitectures and systems as well as different instruction set architectures of nodes 16. An exemplary table 150 is illustrated in FIG. 32 that includes data representing a set of user-defined workload parameters to be input to code synthesizer 79. Referring to FIG. 32, table 150 includes an instruction portion 152 that describes a collection of instructions for the generated synthetic test workload and an addressing mode portion 154 that describes addressing modes to be used with the synthetic test workload. Instructions and addressing modes in addition to those illustrated may be provided in the table 150. Instruction portion 152 of table 150 includes several modifiable fields 158, 160, 162, 164. Field 158 includes data identifying the instruction to be generated, field 160 includes data identifying the computation type associated with the instruction, and field 162 includes data identifying a mnemonic assigned to assist code generation by the synthesizer 79. Field 164 includes data identifying the different addressing modes (i.e., the way in which the instructions' arguments are obtained from memory).

In the illustrated embodiment, the input command 156 ("gen_ops.initialize( )") indicates that instruction portion 152 of the table 150 is starting that sets forth the instructions to be generated. Line 166 illustrates one example of user-defined workload parameters for generating one or more instructions. Referring to line 166, "D(IntShortLatencyArith)" entered into field 158 specifies an integer arithmetic instruction with short latency, and "op_add" and "addq" entered into fields 160, 162 indicate the instruction is an addition or "add" instruction. In one embodiment, short latency indicates that the processor (e.g., node processor 40) takes one cycle or a few cycles to execute the instruction. The "addr_reg0rw_reg1r" of field 164 indicates that a first, register 0 argument is "rw" (read and write) and the second, register 1 argument is "r" (read). Similarly, the "addr_reg0rw_imm" of field 164 describes another variant of the instruction in which the first argument (register 0 argument) is "rw" (read and write), and the second argument is an "imm" ("immediate") value (e.g., a numeral like 123).

Referring to the addressing mode portion 154 of table 150, exemplary line 170 includes "addr_reg0w_reg1r" of field 172 that identifies a class of instructions that operate only on registers. The first register argument (i.e., register 0) is a destination "w" (write) and the second register argument (i.e., register 1) is an input "r" (read). The entries in fields 174 and 176 identify the arguments and indicate "src" for a read argument, "dst" for a write argument, or "rmw" for a readmodify-write argument. In x86 architecture, for example, the first register argument may be "rmw" (the argument is read, operated upon, and then written with the result) or another suitable argument. Additional or different user-defined workload parameters may be specified via table 150.

In one embodiment, the table 150 (e.g., trace file) is generated offline, such as with user computer 20, for example, and loaded onto configurator 22. In one embodiment, the table 150 is stored on or loaded onto control server 12 and is displayed with user interface 200 to allow a user to modify the user-defined workload parameters via selectable and modifiable data displayed by the user interface 200.

Figure 33:
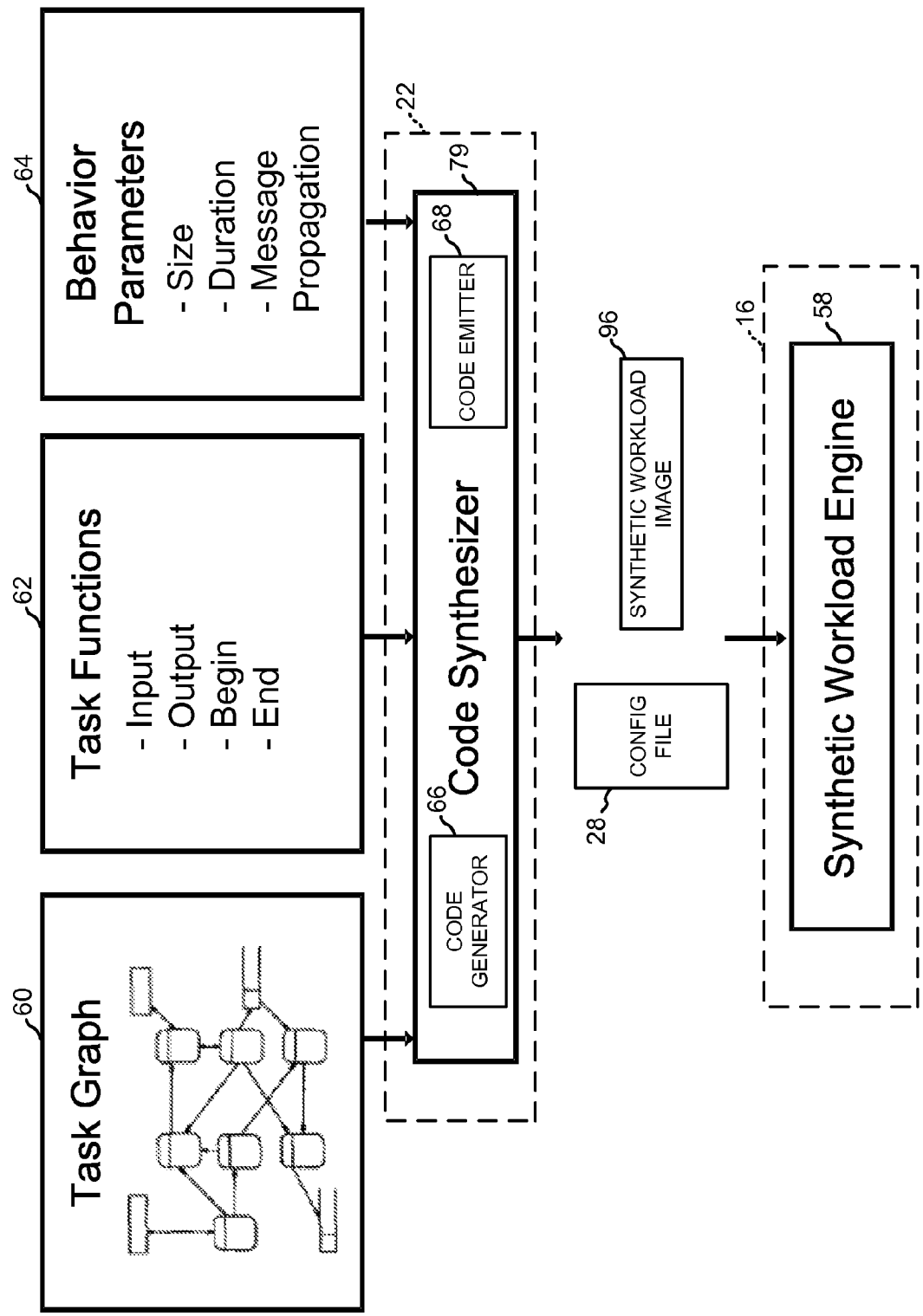
FIG. 33 is a block diagram of an exemplary synthetic test workload system including a synthesizer operative to generate the synthetic test workload and a synthetic workload engine of a node operative to activate and execute at least a portion of the synthetic test workload.

Referring to FIG. 33, an exemplary process flow for generating and executing a synthetic workload is illustrated. Code synthesizer 79 is illustrated that generates the synthetic test workload and outputs a configuration file 28 and a synthetic workload image 96 to each node 16, and synthetic workload engine 58 of each node 16 executes the synthetic test workloads, as described herein. Blocks 60, 62, 64 of FIG. 32 provide an abstract representation of the contents provided in the trace file that is input into synthesizer 79. Block 60 is a general task graph that represents the execution flow of an instruction set. Block 62 represents the task functions that are executed including input, output, begin, and end instructions. Block 64 represents workload behavior parameters including the data block size, execution duration and latencies, message propagation, and other user-defined parameters described herein.

Synthesizer 79 illustratively includes a code generator 66 and a code emitter 68, each comprising the one or more processors 22 of control server 12 executing software or firmware code stored on memory (e.g., memory 90) accessible by processor(s) 22 to perform the functions described herein. Code generator 66 operates on the data structure (e.g., table) of the trace file describing the user-defined workload parameters and target instruction set architecture and generates an abstracted synthetic code that has the specified execution properties. Code emitter 68 creates an executable synthetic code (i.e., the synthetic test workload) from the abstracted synthetic code in a format suitable for the execution environment (e.g., assembly code to be linked in an execution harness, binary code, or position-independent code to be linked with the simulation infrastructure, etc.). In one embodiment, the desired format of the executable code is hard-coded in synthesizer 79. In another embodiment, the desired format of the executable code is selectable via selectable data of user interface 200. In one embodiment, the executable code is compact in size such that the code may be executed via cycle-accurate simulators that are not adapted to execute full-size workloads. Other suitable configurations of synthesizer 79 may be provided. In one embodiment, synthesizer 79 has access to the computer architecture data of the nodes 16 of node cluster 14. As such, synthesizer 79 generates a synthetic test workload targeting specific microarchitecture and instruction set architecture based on the known computer architecture data of the node cluster 14. As such, the synthetic test workload may be targeted to exercise a desired set of architectural characteristics, for example.

The synthetic test workload generated by synthesizer 79 includes a code module executable with the selected workload container module on nodes 16. When a synthetic test workload is generated and selected for execution, the synthetic test workload is stored as workload image file 96 of FIG. 3 in memory 90 of control server 12. Configurator 22 then loads the workload image file 96 onto each node 16 for execution, or nodes 16 retrieve the workload image file 96. In one embodiment, with the Hadoop workload container module selected, the synthetic test workload is run as the "map" phase of the map-reduce.

In the illustrated embodiment, the synthetic test workload is executed to exercise the hardware of computing system 10 for testing and performance analysis, as described herein. Synthesizer 79 receives desired workload behavior as input via the trace file and produces a synthetic test workload that behaves according to the input. In particular, statistical properties of the desired workload behavior are the input to synthesizer 79, such as the number of instructions to be executed and a statistical distribution of the type of instructions, as described herein. For example, a loaded trace file may include user-defined parameters that request a program loop that contains 1000 instructions, and the trace file may specify that 30% of the instructions are integer instructions, 10% are branch instructions having a particular branch structure, 40% are floating-point instructions, etc. The trace file (or field 450 of FIG. 23) may specify that the loop is to be executed 100 times. Synthesizer 79 then produces the program loop containing the requested parameters as the synthetic test workload.

In one embodiment, the generated synthetic test workload serves to emulate the behavior of an actual workload, such as a specific proprietary code or complex code of a known application or program. For example, some proprietary code contains instructions that are not accessible or available to a user. Similarly, some complex code contains instructions that are complicated and numerous. In some instances, creating a workload based on such proprietary or complex code may be undesirable or difficult. As such, rather than creating a workload code module that contains all the instructions of the proprietary or complex code, monitoring tools (offline from configurator 22, for example) are used to monitor how the proprietary or complex code exercises server hardware (nodes 16 or other server hardware) during execution of the proprietary or complex code. The statistical data gathered by the monitoring tools during the execution of the proprietary code are used to identify parameters that represent the desired execution characteristics of the proprietary or complex code. The collection of parameters is provided in the trace file. The trace file is then loaded as the input to synthesizer 79, and synthesizer 79 generates synthetic code that behaves similar to the proprietary code based on the statistical input and other desired parameters. As such, the complex or proprietary instructions of a particular code are not required to model behavior of that code on cloud computing system 10.

In one embodiment, synthesizer 79 operates in conjunction with batch processor 80 to execute multiple synthetic test workloads generated by synthesizer 79 from varying trace files. In one embodiment, synthetic test workloads are generated based on modified user-defined workload parameters of a table (e.g., table 150 of FIG. 32) that test different target processors, both CPU and GPU's, of the nodes 16.

FIG. 34 illustrates a flow diagram 600 of an exemplary operation performed by configurator 22 of control server 12 of FIGS. 1 and 3 for configuring cloud computing system 10 with a selected workload. Reference is made to FIGS. 1 and 3 throughout the description of FIG. 34. In the illustrated embodiment, configurator 22 configures node cluster 14 of FIG. 1 according to the flow diagram 600 of FIG. 34 based on a plurality of user selections received via user interface 200. At block 602, workload configurator 78 selects, based on a user selection (e.g., selections of inputs 418) received via user interface 200, a workload for execution on cluster of nodes 14 of the cloud computing system 10. The workload is selected at block 602 from a plurality of available workloads including an actual workload and a synthetic test workload. The actual workload comprises a code module stored in a memory (e.g., memory 90 or memory 34) accessible by the control server 12, as described herein. At block 604, configurator 22 configures cluster of nodes 14 of cloud computing system 10 to execute the selected workload such that processing of the selected workload is distributed across cluster of nodes 14, as described herein.

In one embodiment, configurator 22 provides the user interface 200 comprising selectable actual workload data and selectable synthetic test workload data, and the selection of the workload is based on the user selection of at least one of the selectable actual workload data and the selectable synthetic test workload data. Exemplary selectable actual workload data includes selectable input 418 of FIG. 22 corresponding to the "actual workload" and selectable inputs 424, 428 of FIG. 22, and exemplary selectable synthetic test workload data includes selectable input 418 of FIG. 22 corresponding to the "synthetic workload" and selectable inputs 434, 436, 441 of FIG. 23. In one embodiment, workload configurator 78 selects at least one of a pre-generated synthetic test workload and a set of user-defined workload parameters based on the user selection of the selectable synthetic test workload data. The pre-generated synthetic test workload comprises a code module (e.g., loaded via library input 432) stored in a memory (e.g., memory 90 or memory 34) accessible by the control server 12. The synthesizer 79 is operative to generate a synthetic test workload based on the selection of the set of user-defined workload parameters, illustratively provided via the trace file described herein. The user-defined workload parameters of the trace file identify execution characteristics of the synthetic test workload, as described herein.

As described herein, exemplary user-defined workload parameters include at least one of: a number of instructions of the synthetic test workload, a type of instruction of the synthetic test workload, a latency associated with an execution of at least one instruction of the synthetic test workload, and a maximum number of execution iterations of the synthetic test workload, and the type of instruction includes at least one of an integer instruction, a floating point instruction, and a branch instruction. In one embodiment, an execution of the synthetic test workload by the cluster of nodes 14 is operative to simulate execution characteristics associated with an execution of an actual workload by the cluster of nodes 14, such as a complex workload or proprietary workload, as described herein.

FIG. 35 illustrates a flow diagram 610 of an exemplary operation performed by configurator 22 of control server 12 of FIGS. 1 and 3 for configuring cloud computing system 10 with a synthetic test workload. Reference is made to FIGS. 1 and 3 throughout the description of FIG. 35. In the illustrated embodiment, configurator 22 configures node cluster 14 of FIG. 1 according to the flow diagram 610 of FIG. 35 based on a plurality of user selections received via user interface 200. At block 612, code synthesizer 79 of workload configurator 78 generates a synthetic test workload for execution on cluster of nodes 14 based on a set of user-defined workload parameters provided via user interface 200. The set of user-defined workload parameters (e.g., provided with the trace file) identify execution characteristics of the synthetic test workload, as described herein. At block 614, configurator 22 configures cluster of nodes 14 with the synthetic test workload to execute the synthetic test workload such that processing of the synthetic test workload is distributed across the cluster of nodes, as described herein.

In one embodiment, the generation of the synthetic test workload is further based on computer architecture data that identifies at least one of an instruction set architecture and a microarchitecture associated with cluster of nodes 14. As described herein, in one embodiment configurator 22 stores the computer architecture data in memory (e.g., memory 90) such that configurator 22 can identify the instruction set architecture and microarchitecture of each node 16 of cluster of nodes 14. As such, configurator 22 generates the synthetic test workload such that it is configured for execution with specific computer architecture of the nodes 16 of node cluster 14 based on the computer architecture data stored in memory. In one embodiment, code synthesizer 79 generates a plurality of synthetic test workloads each based on a different computer architecture associated with nodes 16 of cluster of nodes 14, and each computer architecture includes at least one of an instruction set architecture and a microarchitecture. In one embodiment, configurator 22 provides the user interface 200 comprising selectable synthetic test workload data, and workload configurator 78 selects the set of user-defined workload parameters for generation of the synthetic test workload based on user selection of the selectable synthetic test workload data. Exemplary selectable synthetic test workload data includes selectable input 418 of FIG. 22 corresponding to the "synthetic workload" and selectable inputs 434, 436, 441 of FIG. 23. In one embodiment, the set of user-defined workload parameters are identified in a data structure (e.g., table 150 of FIG. 32) displayed on a user interface (e.g., user interface 200 or a user interface displayed on display 21 of computer 20), and the data structure includes a plurality of modifiable input fields each identifying at least one user-defined workload parameter, as described herein with respect to table 150 of FIG. 32. In one embodiment, configurator 22 selects a modified hardware configuration of at least one node 16 of node cluster 14 based on a user selection received via user interface 200 (e.g., selection of boot-time parameters with inputs 269-276). In this embodiment, configurator 22 configures cluster of nodes 14 with the synthetic test workload to execute the synthetic test workload on the cluster of nodes 14 having the modified hardware configuration, and the modified hardware configuration results in at least one of a reduced computing capacity and a reduced memory capacity of the at least one node 16, as described herein.

Referring again to FIG. 23, a previously saved workload may be loaded from a local memory (e.g., memory 90 of FIG. 3) via Settings Library tab 416. The workload loaded via the Settings Library tab 416 may include an actual workload, a synthetic test workload, a custom script, or any other workload suitable for execution with a selected workload container module. The loaded workload configuration may be modified based on user inputs to module 210 of user interface 200. A current workload configuration may also be saved to memory 90 via the Settings Library tab 416.

In the illustrated embodiment, a Cloud Suite workload collection may also be loaded and configured via tab 417. CloudSuite is a collection of workloads that comprise typical cloud workloads that are utilized to characterize cloud systems.

Figure 25:
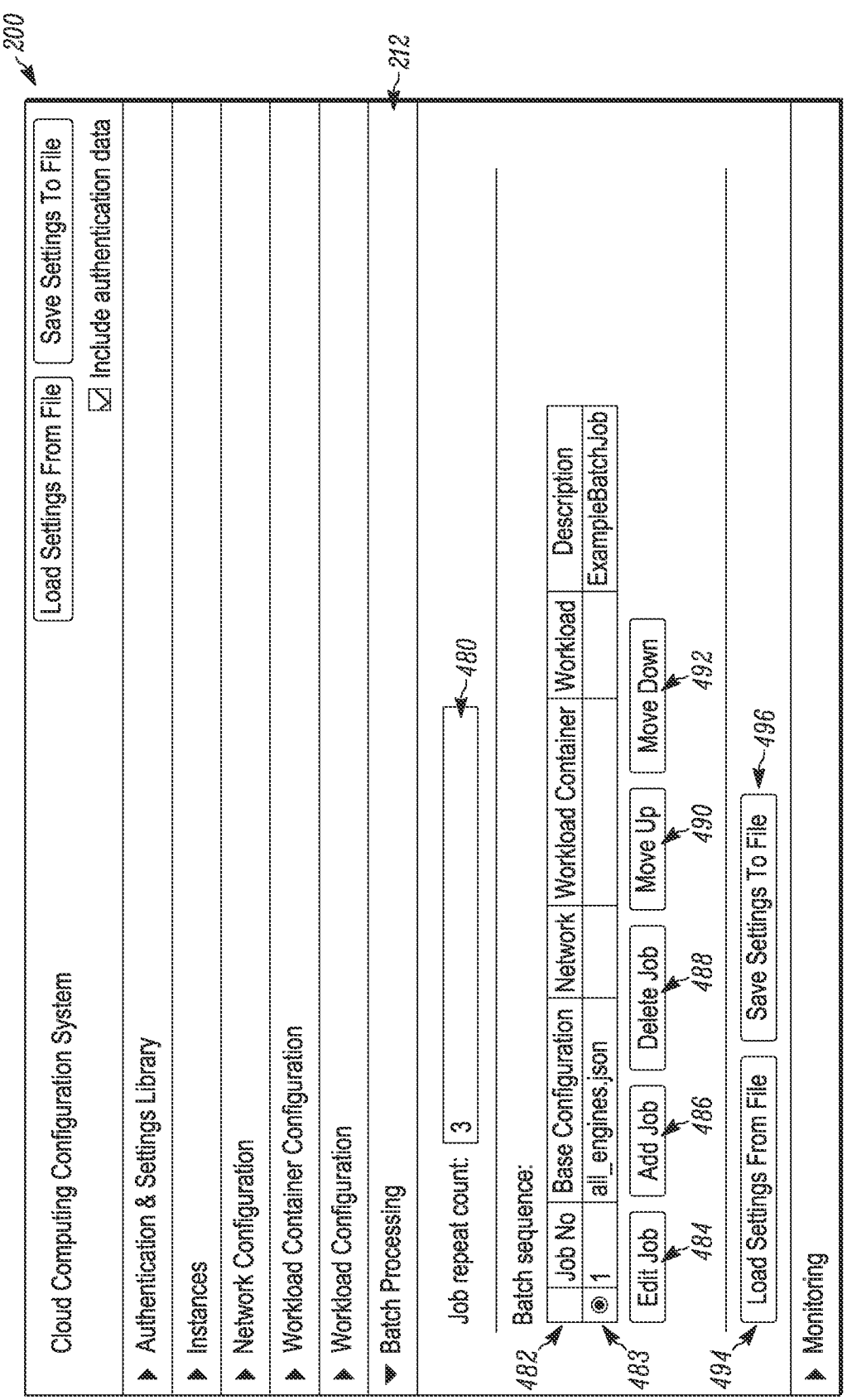
FIG. 25 illustrates a Batch Processing module of the exemplary user interface of FIG. 7 for facilitating the selection and configuration of a batch sequence for execution on the cluster of nodes of FIG. 1.

Referring to FIG. 25, the Batch Processing module 212 is selected. Based on user input to module 212, batch processor 80 (FIG. 3) is operative to initiate batch processing of multiple workloads. Batch processor 80 is also operative to initiate execution of one or more workloads having a plurality of different configurations, such as different network configurations, different workload container configurations, different synthetic workload configurations, and/or different node configurations (e.g., boot-time configurations, etc.) described herein. Based on user input, batch processor 80 initiates the execution of each workload and/or configuration in a sequence on node cluster 14 such that manual intervention is not required for all workloads to be run to completion. Further, batch processor 80 may configure one or more workloads may to run multiple times based on user settings received via module 212 of user interface 200. Batch processor 80 is operative to execute actual workloads and/or synthetic test workloads as a batch. In the illustrated embodiment, performance data is monitored and aggregated from the batch processing of workloads to enable automatic system tuning, as described herein with respect to FIGS. 47 and 48, for example.

The number of executions for a batch of workloads and/or configurations is specified via repeat count field 480. Based on user input to field 480, batch processor 80 executes one or more workloads the specified number of iterations. A batch sequence table 482 comprises display data listing the batch jobs to be executed by the node cluster 14. A batch job includes one or more workloads that are adapted for execution a specified number of times (e.g., as specified based on input to field 480). In one embodiment, a batch job includes one or more cloud system configurations that are adapted for execution with one or more workloads a specified number of times. While only one batch job is listed in table 482, multiple batch jobs may be added to the table 482. Batch processor 80 selects the listed batch job(s) for execution based on user selection of input(s) 483 corresponding to the listed batch job(s). In one embodiment, the selected batch jobs are executed in a sequence in the order they are listed in table 482. The batch job is illustratively in a JSON file format, although other suitable formats may be used. The batch jobs listed in table 482 are edited, added, and deleted based on user selection of inputs 484, 486, 488, respectively. The order of the batch sequence is adjustable based on user selection of inputs 490, 492 to move a selected batch job to a different position in the sequence displayed in table 482. A batch sequence and other settings associated with the execution of the batch job may be loaded from memory (e.g., memory 34 or memory 90) via selectable input 494, and a currently configured batch sequence is saved to memory (e.g., memory 34 or memory 90) via selectable input 496. Inputs 484-496 are illustratively selectable buttons.

Figure 26:
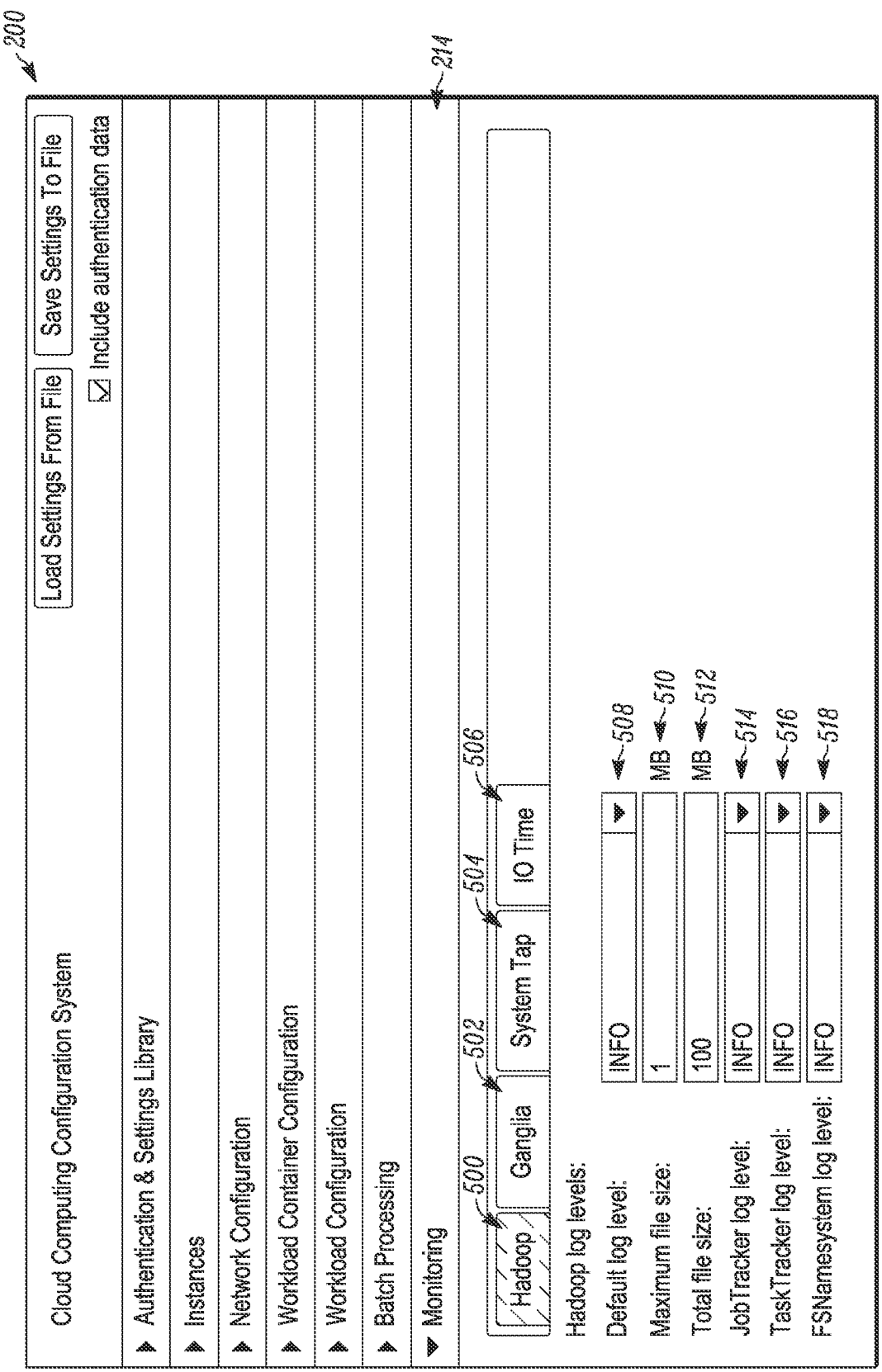
FIG. 26 illustrates a Monitoring module of the exemplary user interface of FIG. 7 including a Hadoop tab for facilitating the configuration of a Hadoop data monitoring tool.

Referring to FIG. 26, the Monitoring module 214 is selected. Based on user input to module 214, data monitor configurator 82 (FIG. 3) is operative to configure one or more data monitoring tools used for monitoring and collecting performance data during execution of a workload on the node cluster 14. Data monitor configurator 82 is operative to configure monitoring tools that monitor data related to the performance of node 16, the workload, the workload container, and/or network 18. In one embodiment, the monitoring tools configured by data monitor configurator 82 include both commercially available monitoring tools and custom monitoring tools provided by a user. The monitoring tools collect data from multiple sources within cloud computing system 10 and other available nodes 16. For example, the monitoring tools include kernel-mode measurement agent 46 and user-mode measurement agent 50 that collect data at each node 16 (FIG. 2). Control server 12 also includes one or more monitoring tools operative monitor network and computing performance on node cluster 14. In one embodiment, based on user input (e.g., input to fields 530, 532 of FIG. 27), data monitor configurator 82 specifies a sampling rate at which the monitoring tool(s) monitors data from nodes 16. Data monitor configurator 82 is operative to configure and initiate the operation of multiple data monitoring tools, including an Apache Hadoop monitoring tool provided on each node 16 (tab 500), a Ganglia tool provided on control server 12 (tab 502), a SystemTap tool provided on each node 16 (tab 504), and virtual memory statistics and I/O statistics monitoring tools provided on one or more nodes 16 (tab 506).

The Hadoop monitoring tool monitors the performance of nodes 16 at the workload container level when the Hadoop workload container module is selected for execution on nodes 16. The Hadoop monitoring tool is loaded by configurator 22 onto each node 16 with the Hadoop workload container module to monitor data associated with the performance of the Hadoop workload container module based on the monitoring configuration identified in FIG. 26. As illustrated in FIG. 26, various monitoring parameters associated with the Hadoop monitoring tool are configured by data monitor configurator 82 based on user input to several modifiable fields and drop-down menus. The modifiable monitoring parameters include a default log level (selected based on input to drop-down menu 508), a maximum file size of collected data (selected based on input to field 510), a total size of all files of collected data (selected based on input to field 512), a log level of the JobTracker tool of the Hadoop workload container (selected based on input to drop-down menu 514), a log level of the TaskTracker tool of the Hadoop workload container (selected based on input to drop-down menu 516), and a log level of the FSNamesystem tool of the Hadoop workload container (selected based on input to drop-down menu 518). A log level identifies the type of data to collect via the Hadoop monitoring tool, such as information ("INFO"), warnings, errors, etc. The JobTracker, Tasktracker, and FSNamesystem tools of the Hadoop workload container include various processes and data tracked by data monitor configurator 82, including the initiation and completion of a workload at the master node 16, metadata associated with file system 55 (FIG. 2), and the initiation of the map and reduce tasks at worker nodes 16, for example. Other suitable data may be collected with the Hadoop monitoring tool.

Figure 27:
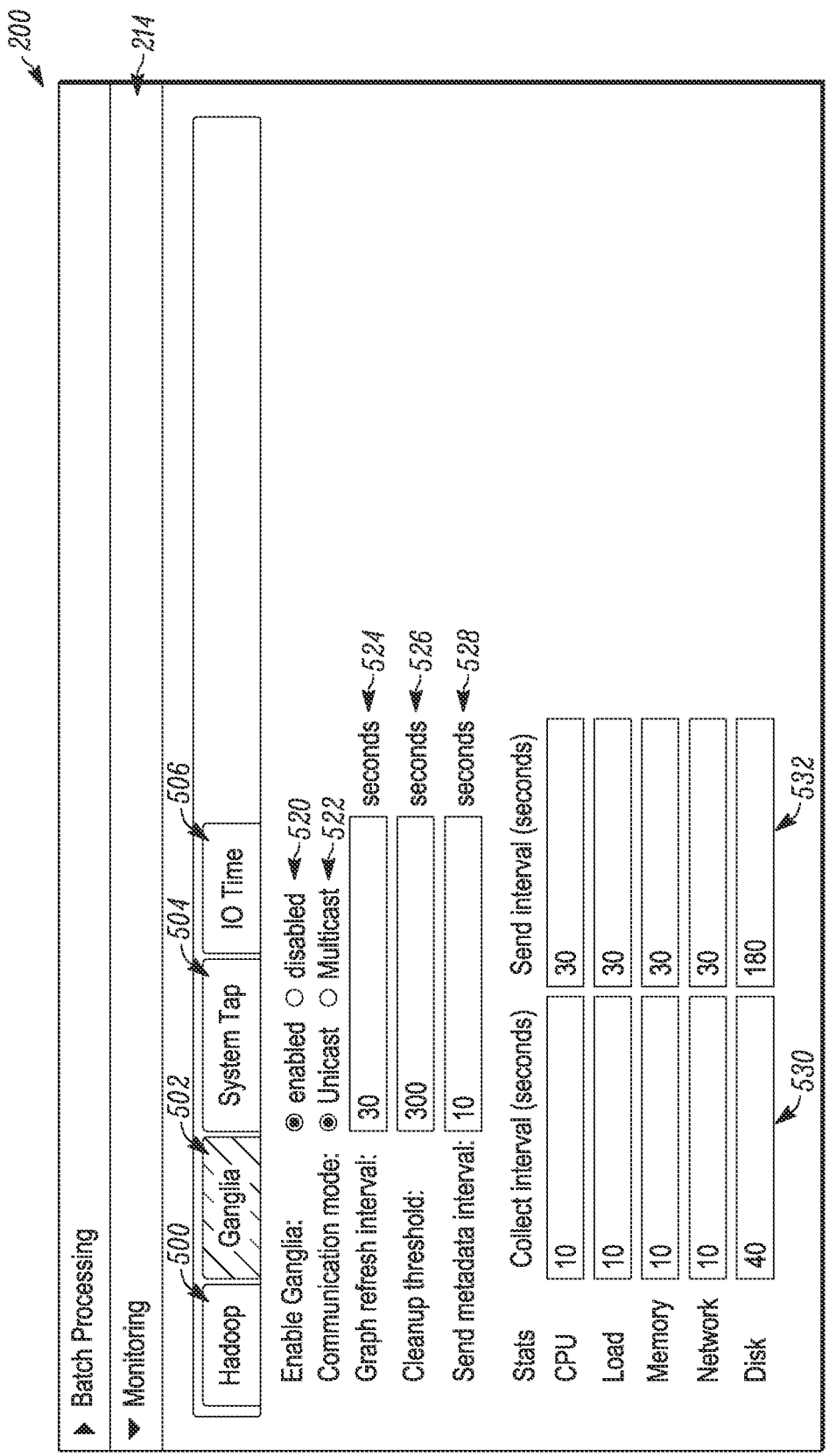
FIG. 27 illustrates a Ganglia tab of the Monitoring module of FIG. 26 for facilitating the configuration of a Ganglia data monitoring tool.

Referring to FIG. 27, the Ganglia monitoring tool is also operative to monitor and collect performance data of cloud computing system 10 based on the monitoring configuration implemented by data monitor configurator 82. Ganglia is a known system monitoring tool that provides remote live viewing (e.g., via control server 12) of system performance as well as graphs and charts showing historical statistics. In the illustrated embodiment, the Ganglia monitoring tool is executed on control server 12 based on the configuration data provided with data monitor configurator 82. Exemplary data monitored with Ganglia includes processing load averages of node processor 40 (CPU's) during workload execution, the utilization (e.g., stall or inactive time, percentage of time spent processing, percentage of time spent waiting, etc.) of node processors 40 and network 18 during workload execution, and other suitable data. The Ganglia monitoring tool is enabled and disabled by data monitor configurator 82 based on user selection of selectable inputs 520, and a unicast or a multicast communication mode is selected by data monitor configurator 82 based on user selection of selectable inputs 522. Other configurable monitoring parameters associated with Ganglia include a data refresh interval of a generated graph of collected data (selected based on input to field 524), a cleanup threshold (selected based on input to field 526), and an interval for sending metadata (selected based on input to field 528). The data input into fields 524, 526, and 528 are illustratively in seconds. Data monitor configurator 82 is operative to adjust the collection (i.e., sampling) interval and sending intervals based on values (illustratively in seconds)

entered into respective fields 530, 532 for collecting data during workload execution associated with the node processor 40 (CPU), the processing load on nodes 16 (e.g., associated with the workload being executed), the usage of node memory 42, the network performance of the nodes 16 on the communication network 18, and the hard disk usage of each node 16.

Figure 28:
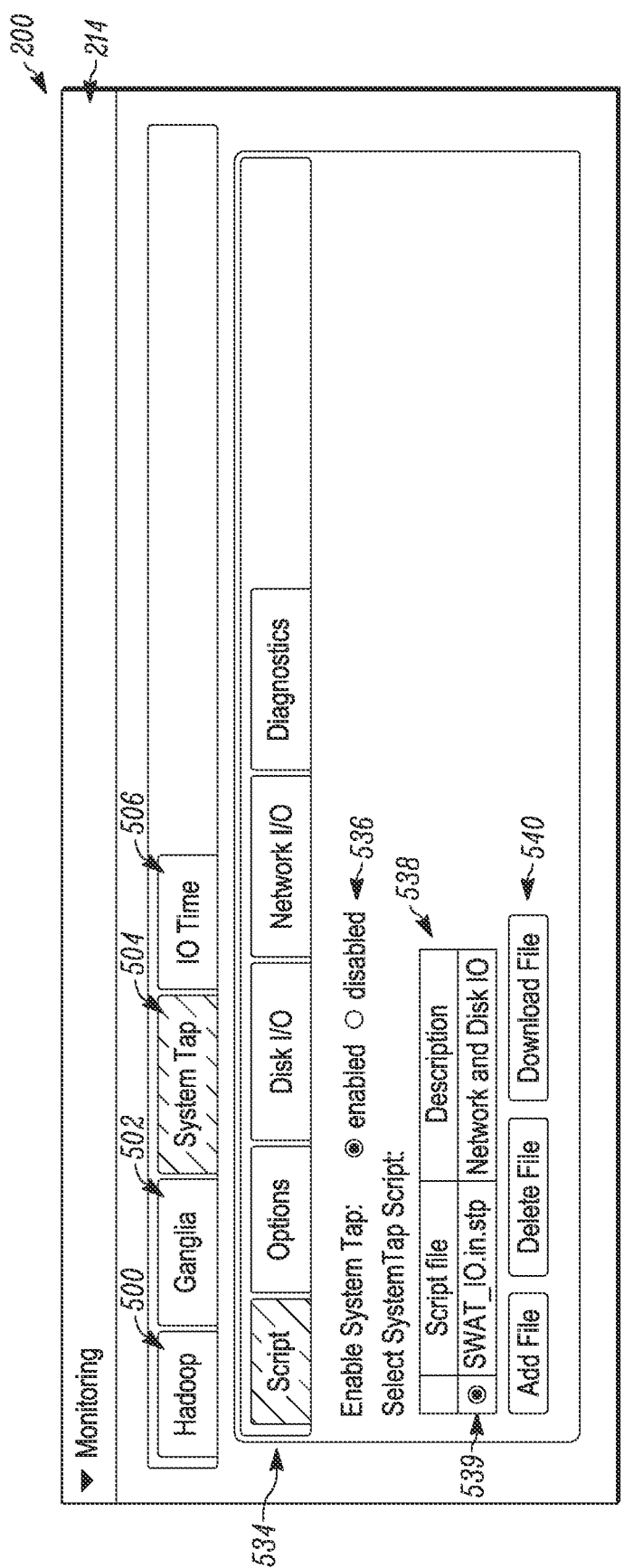
FIG. 28 illustrates a SystemTap tab of the Monitoring module of FIG. 26 for facilitating the configuration of a SystemTap data monitoring tool.

The SystemTap tool is a kernel-mode measurement agent 46 (FIG. 2) that includes SystemTap monitoring software operative extract, filter, and summarize data associated with nodes 16 of cloud computing system 10. In one embodiment, the SystemTap tool is executed on each node 16. SystemTap is implemented with Linux based operating systems. SystemTap allows a customized monitoring script to be loaded onto each node 16 with customized monitoring configurations, including, for example, the sampling rate and the generation and display of histograms. As illustrated in FIG. 28, with the "Script" tab selected, SystemTap is enabled or disabled by data monitor configurator 82 based on user selection of inputs 536. A SystemTap script file is downloaded to control server 12, added for display in table 538, or removed/deleted from display in table 538 by data monitor configurator 82 based on user selection of respective inputs (buttons) 540. Table 538 comprises display data representing the script files that are available for selection based on user selection of corresponding input(s) 539. Data monitor configurator 82 loads the selected script file of table 538 onto each node 16 upon deployment of the cloud configuration by configurator 22. Other suitable configuration options are available based on user input and selections via tabs 534 for the SystemTap monitoring tool, including configuration of disk I/O, network I/O, and diagnostics, for example.

Figure 29:
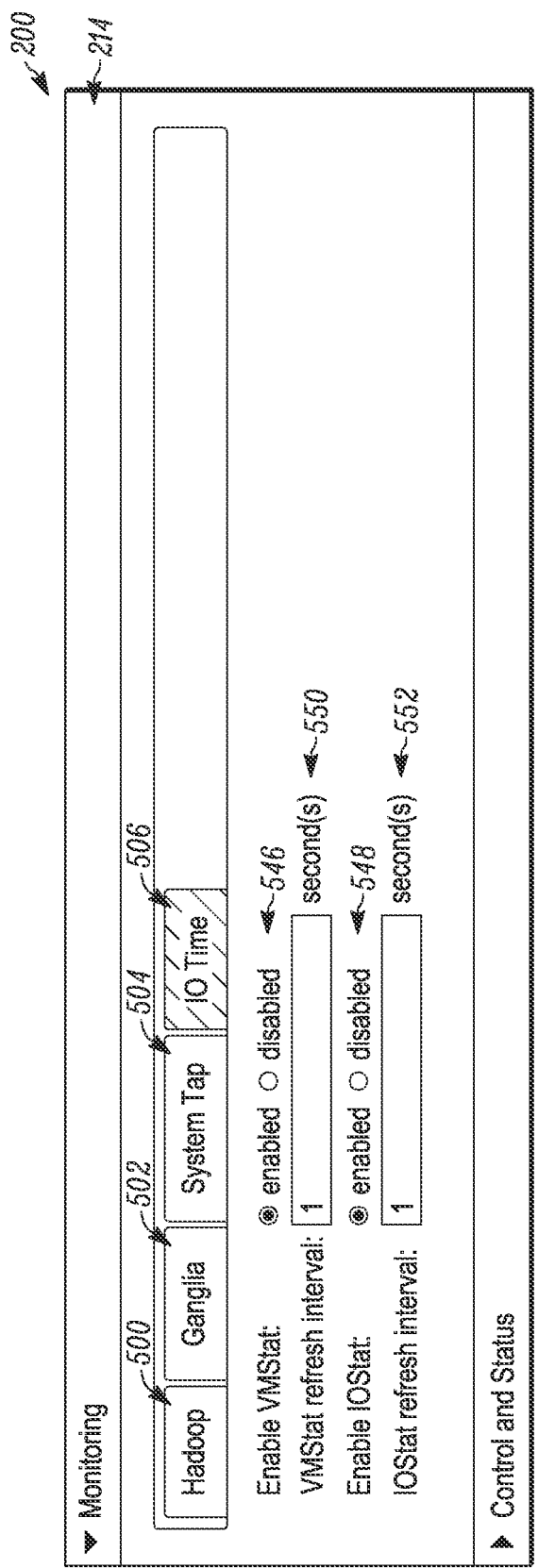
FIG. 29 illustrates an I/O Time tab of the Monitoring module of FIG. 26 for facilitating the configuration of virtual memory statistics (VMStat) and input/output statistics (IOStat) data monitoring tools.

Referring to FIG. 29, the I/O Time tab 506 provides user access to configure additional monitoring tools, including virtual memory statistics (VMStat) and input/output statistics (IOStat) that are loaded on one or more nodes 16. VMStat collects data associated with availability and utilization of system memory and block I/O controlled with the operating system, the performance of processes, interrupts, paging, etc., for example. For example, VMStat collects data associated with a utilization of system memory such as the amount or percent of time that system memory and/or the memory controller is busy performing read/write operations or is waiting. IOStat collects data associated with statistics (e.g., utilization, availability, etc.) of storage I/O controlled with the operating system, for example. For example, IOStat collects data associated with the percentage of time that processing cores of the processor 40 of the corresponding node 16 is busy executing instructions or waiting to execute instructions. VMStat and IOStat are enabled/disabled by data monitor configurator 82 based on corresponding user selection of respective inputs 546, 548, and the sampling rate (i.e., refresh interval) are selected by data monitor configurator 82 based on values (illustratively in seconds) entered into fields 550, 552. Based on user selection of corresponding "enabled" inputs 546, 548 and values input into fields 550, 552 of tab 506, data monitor configurator 82 configures the VMStat and IOStat monitoring tools, and configurator 22 loads the tools onto each node 16 upon user selection of the corresponding "enabled" inputs 546, 548.

The monitoring tools configured with data monitor configurator 82 cooperate to provide dynamic instrumentation for cloud computing system 10 for monitoring system performance. Based on the data collected via the configured monitored tools, configurator 22 is operative to diagnose system bottlenecks and to determine optimal system configurations (e.g., hardware and network configurations), for example, as described herein. Further, data monitor configurator 82 provides a common user interface by displaying Monitoring module 214 on user interface 200 for receiving user input used to configure each monitoring tool and for displaying monitored data from each tool.

Figure 30:
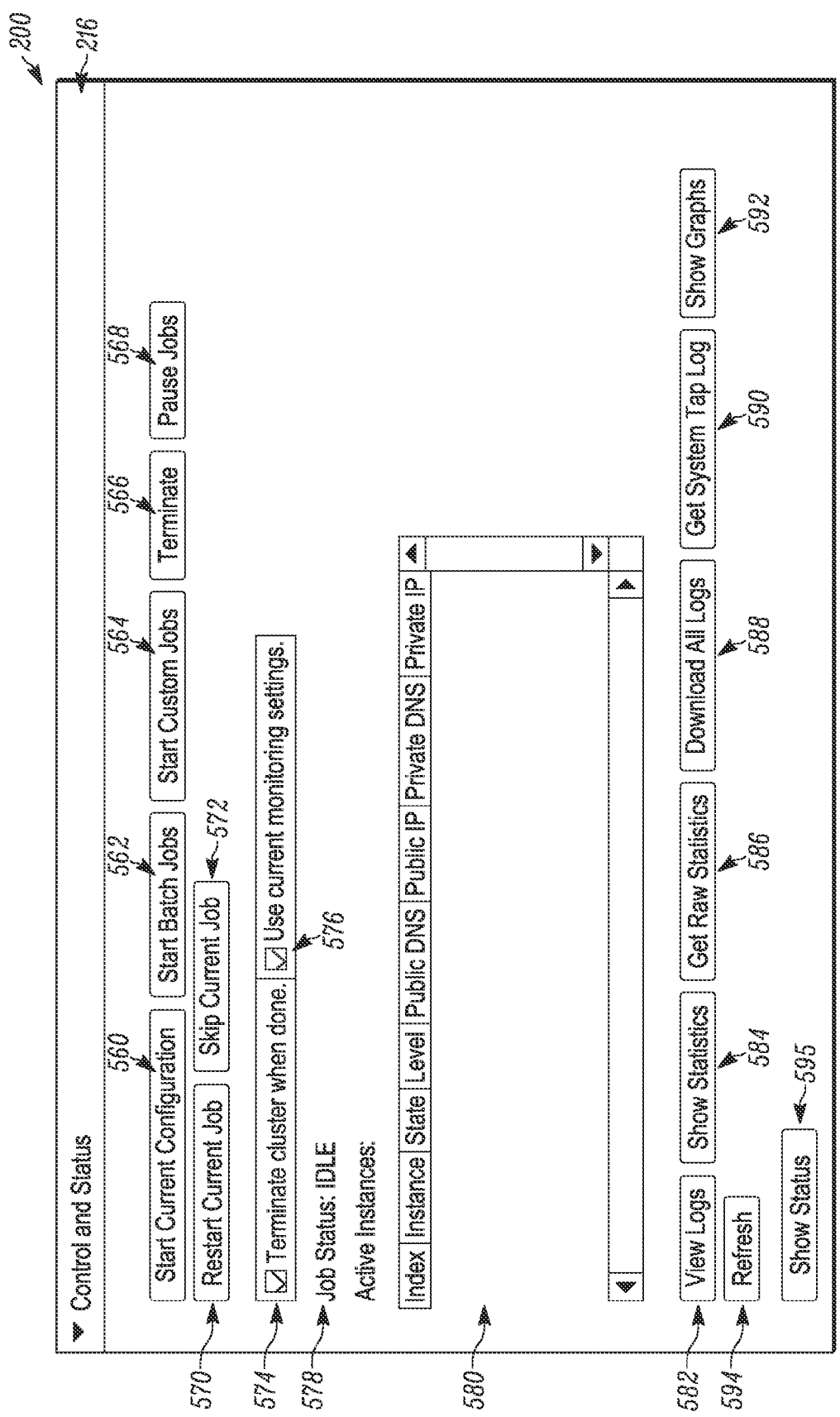
FIG. 30 illustrates a Control and Status module of the exemplary user interface of FIG. 7 for facilitating the deployment of the system configuration to the cluster of nodes of FIG. 1 and for facilitating the aggregation of data monitored by the monitoring tools of FIGS. 26-29.

Referring to FIG. 30, the Control and Status module 216 is selected that comprises selectable data. Based on user input to module 216, configurator 22 is operative to launch (i.e., deploy) the system configuration to node cluster 14 by generating multiple configuration files 28 that are loaded onto each node 16. Configurator 22 initiates deployment of the current system configuration (i.e., the system configuration currently identified with modules 202-216) based on user selection of selectable input 560. Batch processor 80 of configurator 22 initiates the batch processing of one or more workloads and/or configurations, i.e., the batch sequence identified in table 482 of FIG. 25, based on user selection of selectable input 562. Workload configurator 78 of configurator 22 initiates the execution of custom workloads, such as custom workloads identified in field 430 of FIG. 22, based on user selection of selectable input 564. Upon deployment of the system configuration based on user selection of input 560, 562, or 564, configurator 22 automatically configures each selected node 16 with the selected node and network settings, workload, workload container module, data monitoring tools, etc., and instructs node cluster 14 to start executing the selected workload and/or batch jobs based on the system configuration information. Configurator 22 terminates or pauses a workload execution before completion based on user selection of respective selectable inputs 566, 568. Configurator 22 restarts a workload currently executing on node cluster 14 based on user selection of selectable input 570. Configurator 22 skips a workload currently executing on node cluster 14 based on user selection of selectable input 572 such that, for example, nodes 16 proceed to execute a next workload of a batch. Based on selection of selectable input 576, data monitor configurator 82 of configurator 22 implements the data monitoring tools, settings, and configuration identified via module 214. In one embodiment, implementing data monitoring settings on nodes 16 comprises generating a corresponding configuration file 28 (FIG. 3) that is provided to each node 16. Based on user selection of input 574, configurator 22 terminates or shuts down the node cluster 14 following completion of the workload execution(s), i.e., following the receipt of a result of the workload execution from node cluster 14 and the collection of all requested data. Inputs 560-572 as well as inputs 582-595 are illustratively selectable buttons.

System status is provided during workload execution via displays 578, 580. Displays 578, 580 shows the progress of the workload execution as well as status information associated with each active node 16 of node cluster 14. The display of the system status is enabled or disabled based on user selection of button 595.

In the illustrated embodiment, node configurator 72, network configurator 74, workload container configurator 76, workload configurator 78, batch processor 80, and data monitor configurator 82 (FIG. 3) each automatically generate at least one corresponding configuration file 28 following deployment initiation via input 560, 562, or 564 to implement their respective configuration functions. The configuration files 28 contain the corresponding configuration data and instructions for configuring each node 16 of the node cluster 14, as described herein. In one embodiment, configurator 22 automatically loads each configuration file 28 onto each node 16 of node cluster 14 following the generation of the files 28. Alternatively, a single configuration file 28 is generated that contains the configuration data and instructions from each component 70-84 of configurator 22, and configurator 22 automatically loads the single configuration file 28 onto each node 16 of node cluster 14 following generation of the configuration file 28. Each image file 92, 94, 96 corresponding to the respective operating system, workload container module, and workload are also loaded onto each node upon launching the configuration deployment with input 560, 562, or 564. Alternatively, nodes 16 may retrieve or request the configuration file(s) 28 and/or image files 92, 94, 96 following the generation of files 28 and image files 92, 94, 96 by configurator 22.

The configuration files 28 deployed to nodes 16, as well as system configuration files saved via input 240 of FIG. 7, include all configuration data and information selected and loaded based on user input to and default settings of modules 202-216. For example, the configuration file 28 generated by node configurator 72 includes the number of nodes 16 to allocate and/or use for node cluster 14 and the hardware requirements and boot time configuration of each node 16, as described herein. The hardware requirements include RAM size, number of CPU cores, and available disk space, for example. The configuration file 28 generated by network configurator 74 includes, for example, global default settings that apply to all nodes 16; group settings including which nodes 16 belong to a given group of node cluster 14, settings for network traffic within the node group, and settings for network traffic to other node groups of node cluster 14; node-specific settings including custom settings for network traffic between arbitrary nodes 16; network parameters including latency, bandwidth, corrupted and dropped packets rates, corrupted and dropped packets correlation and distribution, and rate of reordered packets, as described herein with respect to FIGS. 11-17; and other suitable network parameters and network topology configuration data. The configuration file 28 generated by workload container configurator 76 includes, for example, configuration settings for the primary workload container software used to run the workload. The configuration file 28 generated by workload configurator 78 includes, for example, configuration settings for the selected pre-defined or synthetic workload to be run on nodes 16. The configuration settings may include synthetic test workload configuration data including a synthetic test workload image file, a maximum instructions count, a maximum iterations count, and a ratio of I/O operations, for example.

Upon initiation of deployment via input 560 (or inputs 562, 564), configurator 22 automatically performs several operations. According to one illustrative embodiment, configurator 22 allocates and starts the desired nodes 16 to select the cluster of nodes 14. Configurator 22 then passes the address (e.g., IP address) of the control server 12 to each node 16 and assigns and passes an identifier and/or address to each node 16. In one embodiment, each node 16 is configured to automatically contact control server 12 and to request the one or more configuration files 28 that describe the job and other configuration information following receipt of the control server 12 address. Each node 16 communicates with control server 12 using any suitable mechanism, including, for example, a specified RMI mechanism (e.g., web-based interface) to communicate directly with control server 12, HTTP requests to interact with control server 12 via Apache HTTP or Tomcat servers, or a remote shell mechanism.

In one embodiment, configurator 22 waits until a request is received from each node 16 of node cluster 14. In one embodiment, if a node 16 fails to start, i.e., based on a lack of request or acknowledgement from the node 16, configurator 22 attempts to restart that node 16. If the node 16 continues to fail to start, configurator 22 identifies and requests another available node 16 not originally included in node cluster 14 to take the place of the failed node 16. The replacement node 16 includes hardware specifications and processing capabilities that are the same or similar to the failed node 16. In one embodiment, configurator 22 continues to monitor nodes 16 throughout workload execution, and restarts nodes 16 (and the workload) that stop responding. Configurator 22 may detect nodes 16 not responding during workload execution based on failed data monitoring or other failed communications.

Upon configurator 22 receiving a request from each node 16 of the node cluster 14, configurator 22 determines that each node 16 is ready to proceed. In one embodiment, configurator 22 then provides each node 16 with the required data, including configuration file(s) 28, the addresses and ID's of other nodes 16 in node cluster 14, and image files 92, 94, 96. Upon receipt of the required data from control server 12, the role of each node 16 in node cluster 14 is determined. In one embodiment, the role determination is made by control server 12 (e.g., automatically or based on user input) and communicated to nodes 16. Alternatively, the role determination is made by node cluster 14 using a distributed arbitration mechanism. In one embodiment, the role determination is dependent on the workload. For example, for a node cluster 14 operating with the Hadoop workload container, a first node 16 may be designated as the master node 16 ("namenode") and the remaining nodes 16 may designated as the slave/worker nodes 16 ("datanodes"). In one embodiment, the role determination of a node 16 further depends on the hardware properties of the node 16. For example, a group of nodes 16 with slower node processors 40 may be designated as database servers for storing data, and another group of nodes 16 with faster node processors 40 may be designated as compute nodes for processing the workload. In one embodiment, the role determination is based on user input provided via configuration file 28. For example, a user may assign a first node(s) 16 to perform a first task, a second node(s) 16 to perform a second task, a third node(s) 16 to perform a third task, and so on.

Each node 16 proceeds to configure its virtual network settings based on the network configuration data received via configuration file(s) 28. This may include, for example, using a network delay and/or a packet loss emulator, as described herein. Each node 16 further proceeds to install and/or configure the user-requested software applications, including the workload container code module received via workload container image file 94. In one embodiment, multiple workload container modules (e.g., multiple versions/builds) are pre-installed at each node 16, and a soft link to the location of the selected workload container module is created based on configuration file 28. If a synthetic test workload is generated and selected at control server 12, each node 16 proceeds to activate the synthetic test workload based on workload image file 96. Each node 16 further proceeds to run the diagnostic and monitoring tools (e.g., Ganglia, SystemTap, VMStat, IOStat, etc.) based on the configuration information. Finally, each node 16 proceeds to start execution of the selected workload.

In the illustrated embodiment, each step performed by configurator 22 and nodes 16 following deployment launch are synchronized across nodes 16 of node cluster 14. In one embodiment, configurator 22 of control server 12 coordinates nodes 16, although one or more nodes 16 of node cluster 14 may alternatively manage synchronization. In one embodiment, the synchronization mechanism used for coordinating node operation causes each node 16 to provide status feedback to control server 12 on a regular basis. As such, nodes 16 failing to report within a specified time are assumed to have crashed and are restarted by configurator 22. Configurator 22 may also provide a status to the user to indicate progress of the job, such as via displays 578, 580 of FIG. 30.

Figure 31:
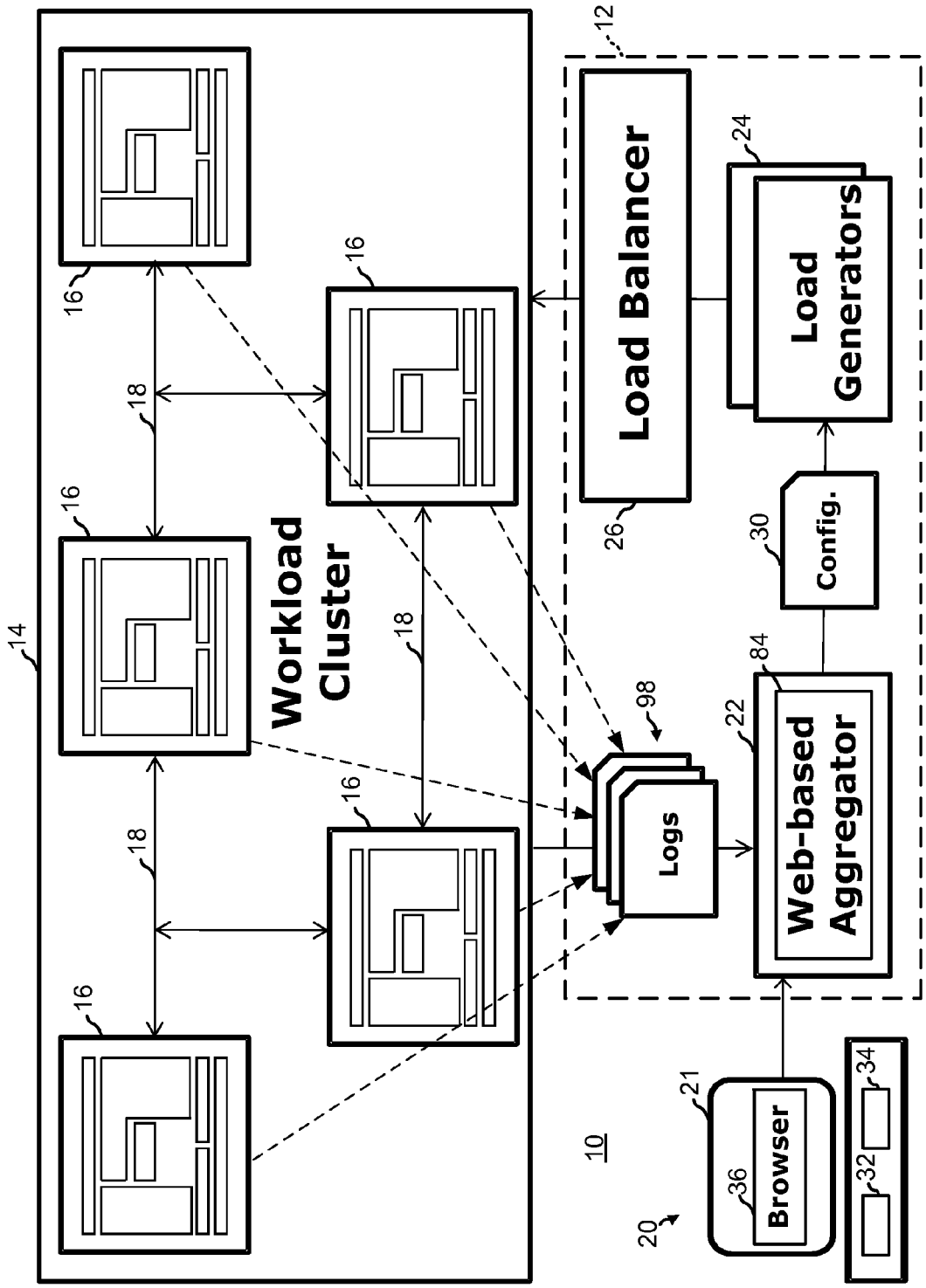
FIG. 31 is another block diagram of the cloud computing system of FIG. 1 illustrating a web-based data aggregator of the configurator of FIG. 1.

Upon completion of the job, data aggregator 84 (FIG. 3) is operative to collect data from each node 16. In particular, the data collected by the monitoring tools of each node 16 (e.g., job output, performance statistics, application logs, etc.; see module 214) are accessed by control server 12 (e.g., memory 90 of FIG. 3). In one embodiment, data aggregator 84 retrieves the data from each node 16. In another embodiment, each node 16 pushes the data to data aggregator 84. In the illustrated embodiment, the data is communicated to control server 12 in the form of log files 98 from each node 16, as illustrated in FIG. 31 (see also FIG. 3). Each log file 98 includes the data collected by one or more of the various monitoring tools of each node 16. As described herein, data aggregator 84 is operative to manipulate and analyze the collected data from the log files 98 and to display (e.g., via display 21 of FIG. 1) the aggregated data to the user in the form of graphs, histograms, charts, etc. Data aggregator 84 also aggregates data from monitoring tools provided on control server 12, such as the Ganglia monitoring tool described in FIG. 27.

Referring again to FIG. 30, data aggregator 84 is operative to collect and aggregate the performance data from each node 16 and to generate logs, statistics, graphs, and other representations of the data based on user selection of corresponding inputs 582-594 of module 216. Data aggregator 84 gathers raw statistical data provided in the log files 98 and provided with other monitoring tools based on user selection of input 586. Data aggregator 84 downloads, based on user selection of input 588, all log files 98 from nodes 16 to the local file system, where it may be further analyzed, or stored for historical trend analysis. Data aggregator 84 retrieves only the log files associated with the SystemTap monitoring tool based on user selection of input 590. Data aggregator 84 displays one or more of the log files 98 provided by nodes 16 on user interface 200 based on user selection of input 582. Data aggregator 84 displays statistical data on user interface 200 in the form of graphs and charts based on user selection of input 584. The statistical data include performance data associated with, for example, the performance of network 18 and network communication by nodes 16, the performance of various hardware components of node 16, the workload execution, and the performance of the overall node cluster 14. Data aggregator 84 generates one or more graphs for display on user interface 200 illustrating various data collected from nodes 16 and from other monitoring tools based on user selection of input 592.

In one embodiment, data aggregator 84 selects the data to display based on the data selected for monitoring with the monitoring tools configured in Monitoring module 214. In another embodiment, data aggregator 84 selects the data aggregated and displayed based on user inputs to Control and Status module 216. For example, a user selects which log files 98, statistical data, and graphs to display upon selecting respective inputs 582, 584, and 592. In one embodiment, data aggregator 84 selects which data to display in graphs and selects how to display the data (e.g., line graph, bar graph, histogram, etc.) based on user inputs to user interface 200. Exemplary graphical data displayed based on selection of input 592 include processor speed versus added network delay, workload execution speed versus number of processor cores, workload execution speed versus number of processing threads per core, the number of data packets transmitted or received by a particular node 16 over time, the number of data packets of a certain size communicated over time, the time spent by data packets in a network stack, etc.

Configuring Boot-Time Parameters of Nodes of the Cloud Computing System

Figure 36:
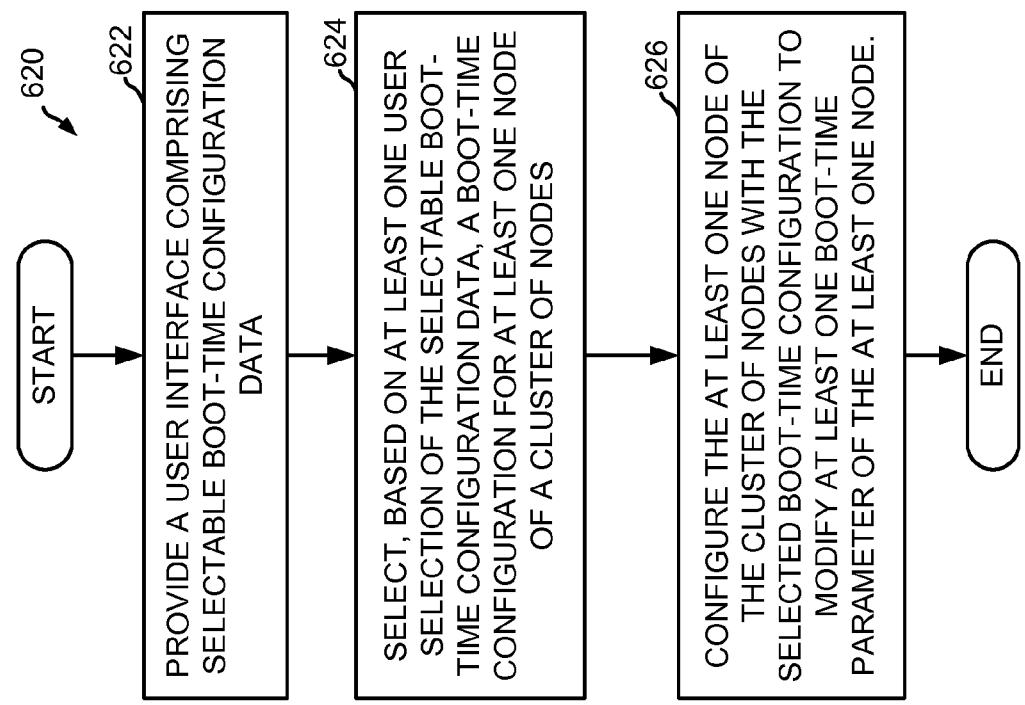
FIG. 36 is a flow chart of an exemplary method of operation of the configurator of FIG. 3 for selecting a boot-time configuration of at least one node of the cluster of nodes of FIG. 1.

FIG. 36 illustrates a flow diagram 620 of an exemplary operation performed by configurator 22 of FIGS. 1 and 3 for configuring a boot-time configuration of cloud computing system 10. Reference is made to FIGS. 1 and 3 throughout the description of FIG. 36. In the illustrated embodiment, configurator 22 configures node cluster 14 of FIG. 1 according to the flow diagram 620 of FIG. 36 based on a plurality of user selections received via user interface 200. At block 622, configurator 22 provides user interface 200 comprising selectable boot-time configuration data. Exemplary selectable boot-time configuration data includes selectable inputs 269, 271 and fields 268, 270, 272, 274, 276 of the displayed screen of FIG. 10. At block 624, node configurator 72 of configurator 22 selects, based on at least one user selection of the selectable boot-time configuration data, a boot-time configuration for at least one node 16 of a cluster of nodes 14 of the cloud computing system 10.

At block 626, configurator 22 configures the at least one node 16 of the cluster of nodes 14 with the selected boot-time configuration to modify at least one boot-time parameter of the at least one node 16. For example, the at least one boot-time parameter includes a number of processing cores (based on input to field 268) of the at least one node 16 that are enabled during an execution of the workload and/or an amount of system memory (based on input to fields 270, 272) that is accessible by the operating system 44 (FIG. 2) of the at least one node 16. Further, a modified boot-time parameter may identify a subset of the plurality of instructions of the workload to be executed by the at least one node 16 based on the number of instructions input to field 274 and selection of the corresponding custom input 271. As such, the workload is executed with the cluster of nodes 14 based on the modification of the at least one boot-time parameter of the at least one node 16. In one embodiment, configurator 22 initiates the execution of the workload, and the cluster of nodes 14 executes the workload with at least one of a reduced computing capacity and a reduced memory capacity based on the modification of the at least one boot-time parameter. In particular, a modification to the number of processing cores with field 268 and selection of corresponding input 271 serves to reduce the computing capacity, and a modification to the number of system memory with fields 270, 272 and selection of corresponding input 271 serves to reduce the memory capacity.

In one embodiment, node configurator 72 selects, based on at least one user selection of the selectable boot-time configuration data, a first boot-time configuration for a first node 16 of the cluster of nodes 14 and a second boot-time configuration for a second node 16 of the cluster of nodes 14. In this embodiment, the first boot-time configuration includes a first modification of at least one boot-time parameter of the first node 16 and the second boot-time configuration includes a second modification of at least one boot-time parameter of the second node 16, and the first modification is different from the second modification. In one example, the first boot-time configuration includes enabling two processing cores of the first node 16, and the second boot-time configuration includes enabling three processing cores of the second node 16. Other suitable modifications of boot-time parameters of each node 16 may be provided as described above.

Figure 37:
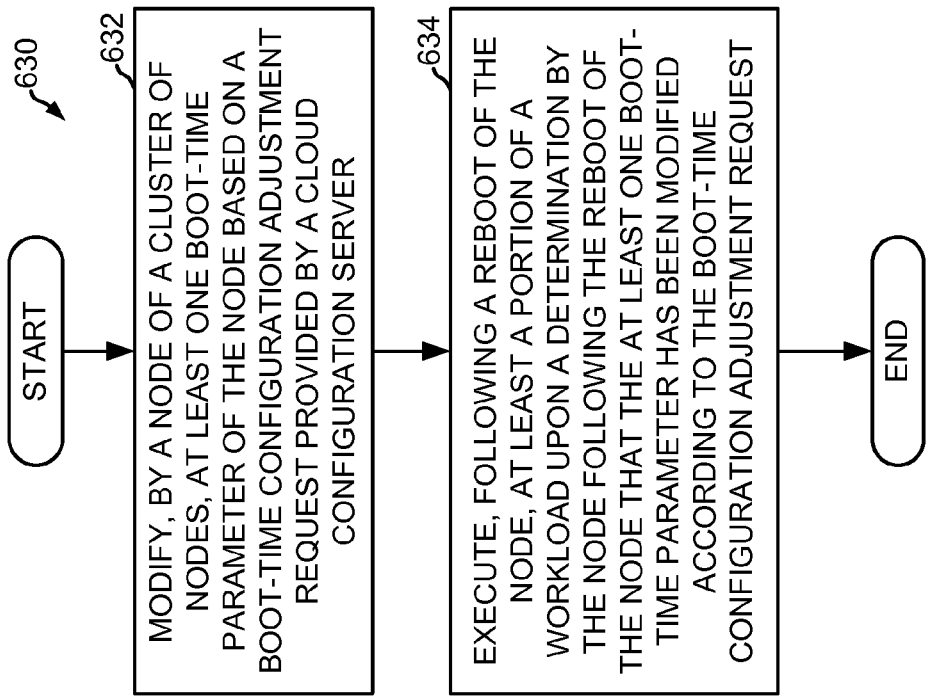
FIG. 37 is a flow chart of an exemplary method of operation of a node of the cluster of nodes of FIG. 1 for modifying at least one boot-time parameter of the node.

FIG. 37 illustrates a flow diagram 630 of an exemplary operation performed by a node 16 of the cluster of nodes 14 of FIG. 1 for configuring a boot-time configuration of the node 16. Reference is made to FIGS. 1 and 3 throughout the description of FIG. 37. At block 632, a node 16 of cluster of nodes 14 modifies at least one boot-time parameter of the node 16 based on a boot-time configuration adjustment request provided by cloud configuration server 12. In the illustrated embodiment, the boot-time configuration adjustment request is provided in a configuration file 28 (FIG. 3) and identifies a requested modification to one or more boot-time parameters of node 16 based on user selections made via inputs 270, 271 and fields 268, 270, 272, 274, 276 of FIG. 10, described herein. In the illustrated embodiment, the node 16 has an initial boot-time configuration prior to the modifying the at least one boot-time parameter and a modified boot-time configuration following the modifying the at least one boot-time parameter. The modified boot-time configuration provides at least one of a reduced computing capacity and a reduced memory capacity of the node 16, as described herein.

At block 634, node 16 executes, following a reboot of the node 16 by the node 16, at least a portion of a workload upon a determination by the node 16 following the reboot of the node 16 that the at least one boot-time parameter has been modified according to the boot-time configuration adjustment request. In one embodiment, node 16 obtains the at least a portion of the workload from cloud configuration server 12 and executes the workload based on the modification to the at least one boot-time parameter. In one embodiment, the determination by node 16 is based on a flag (e.g., one or more bits) set by the node 16 following the modification to the at least one boot-time parameter and prior to the reboot of the node 16. A set flag indicates to the node 16 following a restart of the node 16 that the at least one boot-time parameter has already been modified, and thus node 16 does not attempt to modify the at least one boot-time parameter and reboot again. In one embodiment, the determination is based on a comparison of a boot-time configuration of the node 16 and a requested boot-time configuration identified with the boot-time configuration adjustment request. For example, node 16 compares the current boot-time parameters of the node 16 with the requested boot-time parameters identified with the boot-time configuration adjustment request and, if the parameters are the same, does not attempt to modify the at least one boot-time parameter and reboot again. In one embodiment, when node 16 receives a new configuration file containing a new boot-time configuration adjustment request, node 16 clears the flag before implementing the modification to the boot-time parameters according to the new boot-time configuration adjustment request.

Figure 38:
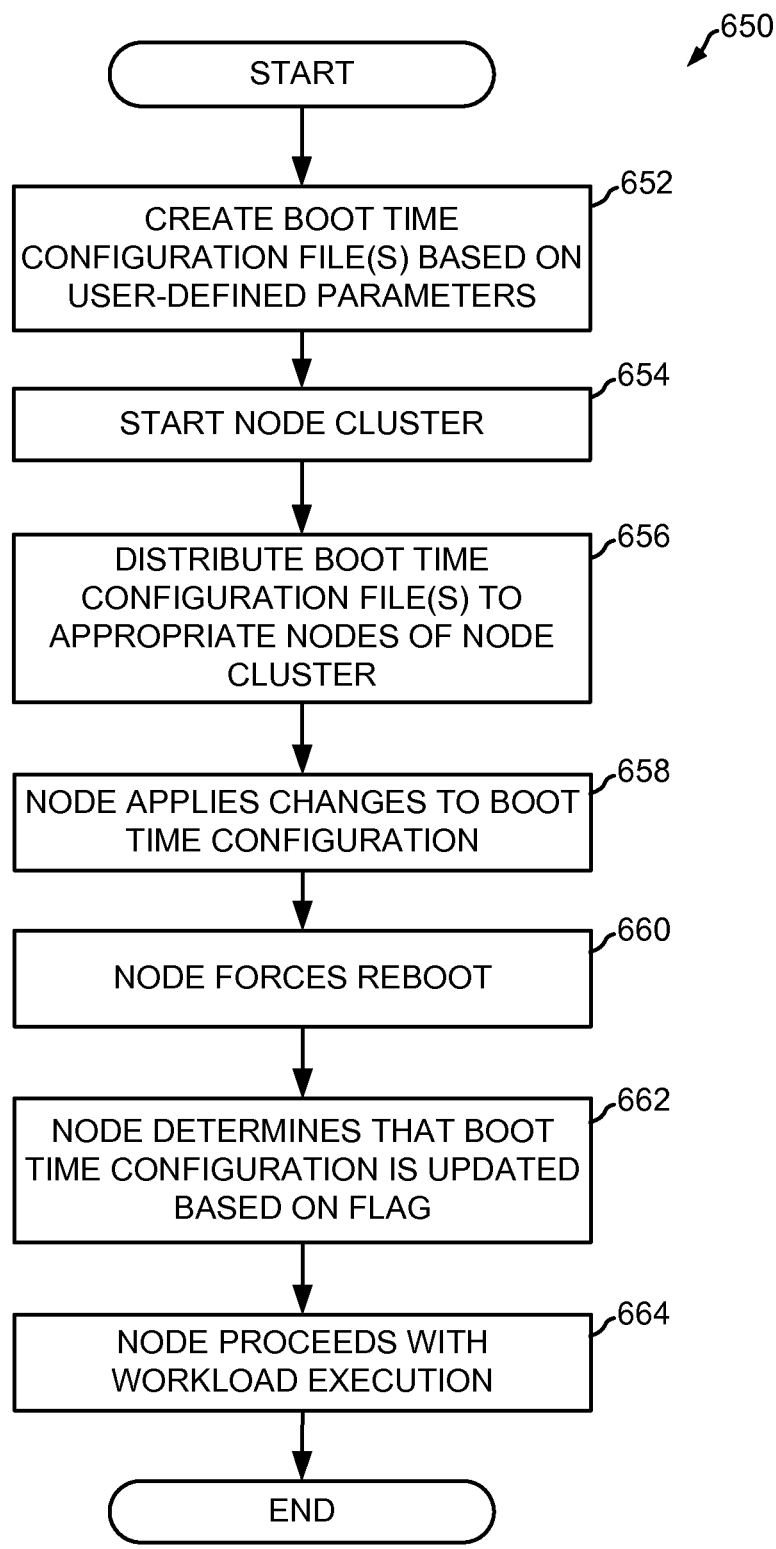
FIG. 38 is a flow chart of an exemplary method of operation of the cloud computing system of FIG. 1 for modifying a boot-time configuration of one or more nodes of the cluster of nodes of FIG. 1.

FIG. 38 illustrates a flow diagram 650 of an exemplary detailed operation performed by cloud computing system 10 for configuring a boot-time configuration of one or more nodes 16 of node cluster 14. Reference is made to FIGS. 1 and 3 throughout the description of FIG. 38. In the illustrated embodiment, configurator 22 performs blocks 652-656 of FIG. 38, and each configured node 16 performs blocks 658-664 of FIG. 38. At block 652, configurator 22 creates one or more boot-time configuration files 28 (FIG. 3) for corresponding nodes 16 based on user-defined boot-time parameters entered via user interface 200 (FIG. 10), as described herein. In one embodiment, the boot-time configuration file 28 is a patch for one or more configuration files of the node 16 or is in a task-specific file/data format. At block 654, configurator 22 starts the cluster of nodes 14 (e.g., upon user selection of input 560, or inputs 562, 564, of FIG. 30, as described herein). At block 656, configurator 22 distributes the boot-time configuration file(s) to the appropriate nodes 16 of the cluster of nodes 14. In one embodiment, each node 16 receives a boot-time configuration file, and each file may identify unique boot-time parameters for the respective node 16. In one embodiment, the configuration files 28 are pushed to the nodes, such as via a secure shell (SSH) file transfer, via an ftp client, via a user data string in Amazon AWS, or via another suitable file transfer mechanism. In another embodiment, the nodes 16 each query (e.g., via an HTTP request) control server 12 or master node 16 for the boot-time configuration information. At block 658, the node 16 applies the desired boot-time parameter changes specified in the received boot-time configuration file 28. In one example, the node 16 applies a patch to the boot files of the node 16, or the node 16 uses a utility to generate a new set of boot files for the node 16 based on the boot-time parameters specified in the received boot-time configuration file 28. In one embodiment, during or upon applying the desired boot-time changes at block 658, node 16 sets a status flag that indicates that the boot-time configuration has been updated, as described herein. At block 660, the node 16 forces a reboot following the application of the boot-time configuration changes. Upon rebooting, node 16 determines at block 662 that the boot-time configuration of the node 16 has already been updated with the boot-time parameter changes specified in the received boot-time configuration file 28. In one embodiment, node 16 determines the boot-time configuration is updated at block 662 based on the status flag set at block 658 or based on a comparison of the current boot-time configuration of the node 16 to the boot-time configuration file 28, as described herein. As such, node 16 reduces the likelihood of applying the boot-time configuration changes more than once. At block 664, node 16 proceeds with the execution of other tasks, including execution of the workload or the portion of the workload received from control server 12.

Modifying and/or Emulating a Network Configuration

Figure 39:
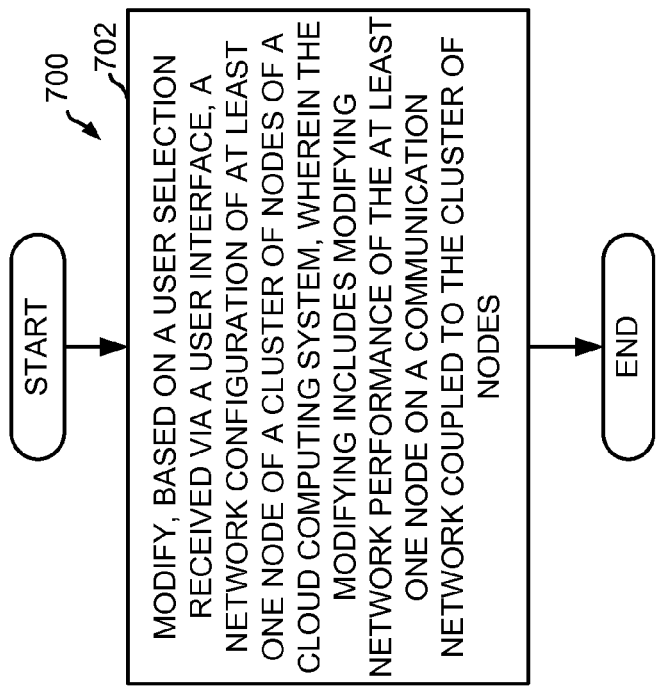
FIG. 39 is a flow chart of an exemplary method of operation of the configurator of FIG. 3 for modifying a communication network configuration of at least one node of the cluster of nodes of FIG. 1.

FIG. 39 illustrates a flow diagram 700 of an exemplary operation performed by configurator 22 of FIGS. 1 and 3 for modifying a network configuration of the allocated cluster of nodes 14 of cloud computing system 10. Reference is made to FIGS. 1 and 3 as well as FIGS. 11-17 throughout the description of FIG. 39. At block 702, network configurator 74 modifies, based on a user selection received via user interface 200, a network configuration of at least one node 16 of cluster of nodes 14 of the cloud computing system 10. Modifying the network configuration of the at least one node 16 at block 702 comprises modifying the network performance of the at least one node 16 on communication network 18 (FIG. 1). The network performance is modified by modifying network parameters such as the packet communication rate, dropped or corrupted packets, reordered packets, etc., as described herein. In the illustrated embodiment, network configurator 74 modifies the network configuration of a node 16 by generating a network configuration file 28 (FIG. 3) based on the user selections and input provided via module 280 of user interface 200, described herein with respect to FIGS. 11-17, and by providing the network configuration file 28 to the node 16 (or the node 16 fetching the file 28). Nodes 16 then implement the changes to the network configuration of the node 16 specified in the accessed network configuration file 28. In the illustrated embodiment, the at least one node 16 has an initial network configuration prior to the modifying and a modified network configuration following the modifying. In one embodiment, the modified network configuration reduces network performance of the at least one node 16 on the communication network 18 during an execution of the selected workload. Alternatively, the modified network configuration increases network performance of the at least one node 16, such as, for example, by decreasing the communication delay value specified via field 302 of FIG. 11.

In one embodiment, network configurator 74 modifies the network configuration of the at least one node 16 by changing at least one network parameter of the at least one node 16 to limit the network performance of the at least one node 16 on communication network 18 during an execution of the workload. In one embodiment, the at least one network parameter that is changed comprises at least one of a packet communication delay, a packet loss rate, a packet duplication rate, a packet corruption rate, a packet reordering rate, and a packet communication rate, which are selectable by a user via tabs 282-294, as described herein. As such, network configurator 74 limits the network performance of the at least one node 16 by generating and providing the node 16 access to a configuration file 28 that identifies a modification to a network parameter (e.g., an increased communication delay between nodes 16, an increased packet loss rate or corruption rate, etc.).

In the illustrated embodiment, configurator 22 provides user interface 200 comprising selectable network configuration data, and network configurator 74 modifies the network configuration of the at least one node 16 based on at least one user selection of the selectable network configuration data, as described herein. Exemplary selectable network configuration data includes inputs 298-301 and corresponding fields 302-312 of FIG. 11, inputs 313, 314 and corresponding fields 315, 316 of FIG. 12, inputs 317, 318 and corresponding fields 319, 320 of FIG. 13, input 321 and corresponding field 322 of FIG. 14, inputs 323, 324 and corresponding fields 325, 326 of FIG. 15, inputs 327-330, 335-338 and corresponding fields 331-334 of FIG. 16, and input 340 and corresponding field 342 of FIG. 17. In one embodiment, network configurator 74 modifies the network performance by changing (i.e., via the network configuration file 28), based on at least one user selection of the selectable network configuration data, a first network parameter of a first node 16 of cluster of nodes 14 to limit the network performance of the first node 16 on the communication network 18 during the execution of the workload and by changing a second network parameter of a second node 16 of cluster of nodes 14 to limit the network performance of the second node 16 on the communication network 18 during the execution of the workload. In one embodiment, the first network parameter is different from the second network parameter. As such, network configurator 74 is operative to modify different network parameters of different nodes 16 of cluster of nodes 14 to achieve desired network characteristics of cluster of nodes 14 during workload execution.

Figure 40:
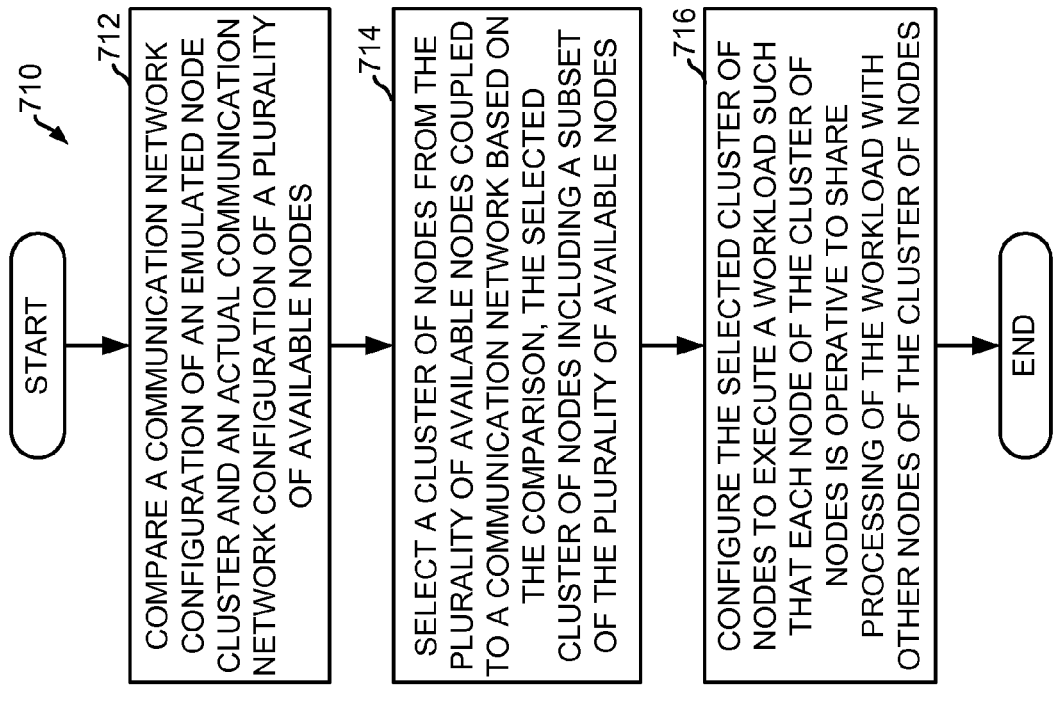
FIG. 40 is a flow chart of an exemplary method of operation of the configurator of FIG. 3 for selecting a cluster of nodes for a cloud computing system based on a network configuration of an emulated node cluster.
Figure 41:
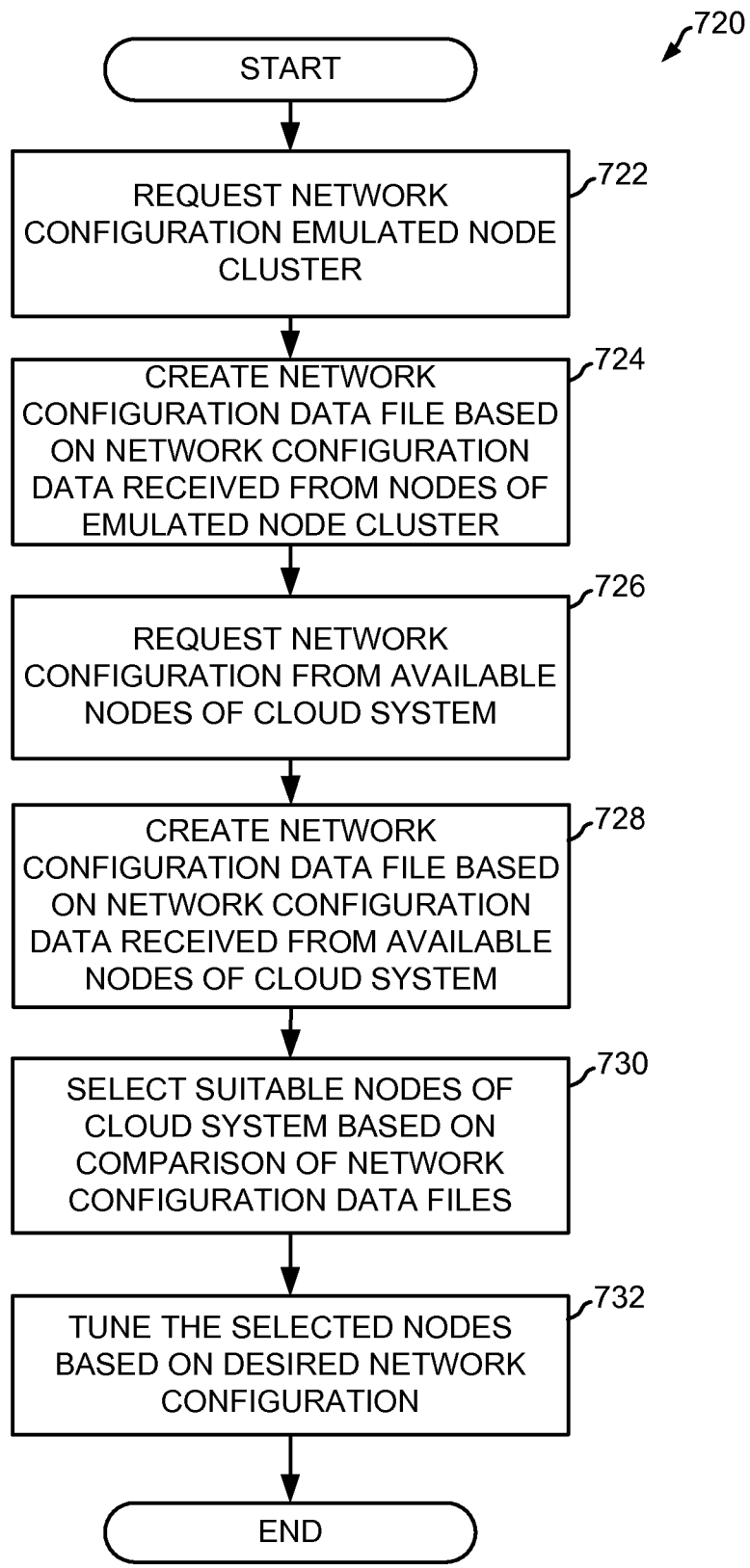
FIG. 41 is a flow chart of another exemplary method of operation of the configurator of FIG. 3 for selecting and configuring a cluster of nodes for a cloud computing system based on a network configuration of an emulated node cluster.

In the illustrated embodiment, configurator 22 is further operative to select a cluster of nodes 14 for cloud computing system 10 having a network configuration that substantially matches a network configuration of an emulated node cluster, as described herein with respect to FIGS. 40-42. As referenced herein, an emulated node cluster includes any group of networked nodes that has a known network configuration that is to be emulated by the node cluster 14 selected by control server 12. Each node of the emulated node cluster includes one or more processing devices and memory accessible by the processing devices. In one embodiment, the emulated node cluster does not include the available nodes 16 selectable by configurator 22. For example, the emulated node cluster includes nodes that are separate from the available nodes 16 housed in the one or more data center(s) and accessible by configurator 22, such as nodes that are provided by a user. Alternatively, the emulated node cluster may include a group of the available nodes 16. The network topology and network performance characteristics of the emulated node cluster is obtained using one or more network performance tests, as described below. Referring to FIG. 40, a flow diagram 710 of an exemplary operation performed by configurator 22 of FIGS. 1 and 3 is illustrated for selecting a cluster of nodes 14 that have network characteristics substantially matching network characteristics of an emulated node cluster. Reference is made to FIGS. 1 and 3 throughout the description of FIG. 40. In the illustrated embodiment, configurator 22 selects and configures node cluster 14 of FIG. 1 according to the flow diagram 710 of FIG. 40 based on user selections received via user interface 200, as described herein. At block 712, node configurator 72 compares a communication network configuration of an emulated node cluster and an actual communication network configuration of the plurality of available nodes 16. At block 714, node configurator 72 selects a cluster of nodes 14 for cloud computing system 10 from a plurality of available nodes 16 coupled to communication network 18 based on the comparison of block 712. The selected cluster of nodes 14 include a subset of the plurality of available nodes 16. At block 716, node configurator 72 configures the selected cluster of nodes 14 to execute a workload such that each node 16 of the cluster of nodes 14 is operative to share processing of the workload with other nodes 16 of the cluster of nodes 14, as described herein. In one embodiment, blocks 712-716 are initiated upon deployment of the cloud configuration based on user input to module 216 of FIG. 30, as described herein.

In the illustrated embodiment, the communication network configuration of the emulated node cluster and the actual communication network configuration of the plurality of available nodes 16 each include communication network characteristics associated with the corresponding nodes. Node configurator 72 selects the cluster of nodes 14 based on similarities between the communication network characteristics of the emulated node cluster and the communication network characteristics of the plurality of available nodes 16. Exemplary communication network characteristics include network topology and network parameters. Exemplary network parameters include communication rates and latencies between nodes, network bandwidth between nodes, and packet error rates. Network topology includes the physical and logical connectivity of the nodes, the identification of which nodes and groups of nodes of the node cluster are physically located near or far from each other, the type of connection between the nodes (e.g., fiber optic link, satellite connection, etc.), and other suitable characteristics. The packet error rate includes dropped or lost packets, corrupted packets, reordered packets, duplicated packets, etc. In one embodiment, node configurator 72 prioritizes the communication network characteristics of the emulated node cluster and selects the cluster of nodes 14 based on the prioritized communication network characteristics, as described herein with respect to FIG. 41.

In the illustrated embodiment, node configurator 72 initiates a network performance test on the available nodes 16 to identify the actual communication network configuration of the available nodes 16. Any suitable network performance test may be used. For example, node configurator 72 may send a request to each available node 16 to execute a computer network administration utility such as Packet Internet Groper ("Ping") to test and collect data regarding the network performance between available nodes 16. Based on the results of the Ping test provided by each node 16, node configurator 72 determines the actual communication network configuration of the available nodes 16. In one embodiment, Ping is used in conjunction with other network performance tests to obtain the actual communication network configuration. Configurator 22 aggregates the network performance test results received from nodes 16 to create a network descriptor data file or object (see data file 750 of FIG. 42, for example) that identifies the actual communication network configuration of the available nodes 16. In one embodiment, configurator 22 initiates the network performance test and aggregates the results based on user input to user interface 200. For example, a user selection of button 586 of FIG. 30 or another suitable input may cause configurator 22 to initiate the test and aggregate the results.

In the illustrated embodiment, node configurator 72 also accesses one or more data files (e.g., data file 750 of FIG. 42) identifying the communication network configuration of the emulated node cluster. In one embodiment, the data file(s) are obtained offline of control server 12 by implementing the one or more network performance tests on the emulated cluster of nodes (e.g., Ping test, etc.). In one embodiment, configurator 22 loads the data file associated with the emulated node cluster into accessible memory (e.g., memory 90 of FIG. 3). For example, configurator 22 may load the data file based on a user identifying the location of the data file via user interface 200, such as via inputs to table 226 of FIG. 7. As such, configurator 22 performs the comparison at block 712 of FIG. 40 by comparing the communication network characteristics identified in the generated data file associated with the available nodes 16 and the accessed data file associated with the emulated node cluster.

An exemplary data file 750 is illustrated in FIG. 42. Data file 750 identifies a network configuration of any suitable networked nodes, such as available nodes 16 accessible by control server 12 or nodes of an emulated node cluster. As shown, data file 750 identifies several groups of nodes illustratively including Groups A, B, . . . M. Each Group A, B, M includes nodes that are physically near each other, such as nodes on the same physical rack of a data center. Lines 6-11 identify network parameters associated with network communication by nodes of Group A, lines 15-22 identify network parameters associated with network communication by nodes of Group B, and lines 27-34 identify network parameters associated with network communication by nodes of Group M. For example, lines 6 and 7 identify a latency, bandwidth, and error rate associated with communication between nodes of Group A. Lines 8 and 9 identify a latency, bandwidth, and error rate associated with communication between Group A nodes and Group B nodes. Similarly, lines 10 and 11 identify a latency, bandwidth, and error rate associated with communication between Group A nodes and Group M nodes. The network parameters associated with communication by nodes of Groups B and M are similarly identified in data file 750. Data file 750 may identify additional network configuration data, such as network topology data and other network parameters, as described herein.

Referring to FIG. 41, a flow diagram 720 is illustrated of an exemplary detailed operation performed by one or more computing devices, including configurator 22 of FIGS. 1 and 3, for selecting a cluster of nodes 14 that have network characteristics substantially matching network characteristics of an emulated node cluster. Reference is made to FIGS. 1 and 3 throughout the description of FIG. 41. At block 722, a network configuration is requested from each node of the emulated node cluster. For example, the network performance test is initiated on each node, and the test results are received by the computing device, as described herein. At block 724, the network configuration data file (e.g., data file 750) is created based on the network configuration data received from the nodes of the emulated node cluster resulting from the performance test. As described herein, blocks 722 and 724 may be performed offline by a computing system separate from cloud computing system 10, such as with computer 20 of FIG. 1, for example.

At block 726, configurator 22 requests a network configuration from each available node 16 or from a group of available nodes 16 of the data center. For example, configurator 22 initiates the network performance test on the available nodes 16, and configurator 22 aggregates the configuration data resulting from the network performance tests, as described herein. At block 728, configurator 22 creates a network configuration data file (e.g., data file 750) based on the network configuration data received from available nodes 16. As such, configurator 22 has access to two configuration data files, including a data file describing the emulated node cluster and a data file describing the available nodes 16. Configurator 22 selects suitable nodes 16 from the available nodes 16 that have similar network characteristics as the emulated node cluster based on the comparison of the network properties identified in the two data files, as represented at block 730. In one embodiment, configurator 22 further selects suitable nodes at block 730 based on a comparison of the node hardware characteristics (e.g., processing capacity, memory capacity, etc.) of the emulated node cluster and the available nodes 16, as described herein.

At block 732, configurator 22 tunes the selected nodes 16 based on the desired network configuration parameters identified in the data file associated with the emulated node cluster. For example, the network characteristics of the selected nodes 16 may not exactly match the network characteristics of the emulated node cluster, and further network tuning may be required or desired. As such, the operating system 44, network topology driver 48, and/or other network components and network parameters of each node 16 are tuned to further achieve the desired network performance of the emulated node cluster. In one embodiment, configurator 22 tunes the selected nodes 16 automatically based on the network characteristics identified in the data file. In one embodiment, network parameters are tuned further based on user input provided via module 206 of user interface 200, as described herein with respect to FIGS. 11-17, for example.

In one exemplary embodiment, configurator 22 selects the suitable nodes 16 at block 730 using the following "best matching" technique, although other suitable methods and algorithms may be provided. Configurator 22 considers Z network properties (i.e., characteristics) when comparing the network configuration data of the data files (e.g., latency—$p_0$, bandwidth—$p_1$, error rate—$p_Z$), and nodes $X_1, X_2, \ldots, X_Q$ are the nodes on the emulated node cluster. Configurator 22 selects a subset of available nodes 16 (e.g., nodes $Y_1, Y_2, \ldots, Y_Q$) that are most similar to nodes $X_1, X_2, \ldots, X_Q$ with respect to network properties $p_1, p_2, \ldots, p_x$. Although other algorithms may be used to perform the selection, one exemplary algorithm implemented by configurator 22 for findable a suitable subset of available nodes 16 includes prioritizing the network properties. In an exemplary prioritization, property $p_0$ has higher priority than property $p_1$, and property $p_k$ has higher priority than property $p_{k+1}$. As such, in the illustrated example, latency is given a higher priority than bandwidth during the node selection, and bandwidth is given a higher priority than error rate during the node selection. A function P(N,X,Y) with inputs N (network property), X (node), and Y (node) may be configured to return the value of network property N between network nodes X and Y. Such a function may be implemented using the network descriptor data files/objects (e.g., data files 750) created at blocks 724, 728. An initial list of nodes L={$Y_1, Y_2, Y_3, \ldots$} contains all of the available nodes 16. For each node in the cloud where $1 \leq g \leq R$ (R is the total number of nodes in L, $R \geq Q$), the following equation (1) applies:

$$Sx(g)\Sigma_{1 \leq N \leq Z, 1 \leq h \leq R, g \neq h} P(N, Y_g, Y_h) \qquad (1)$$

For each node $X_i$ in the emulated node cluster, where $1 \leq i \leq Q$ (Q is the number of nodes in the emulated node cluster), the following equation (2) applies:

$$Sy(i)\Sigma_{1 \leq N \leq Z, 1 \leq j \leq R, i \neq j} P(N, Yi, Yj) \qquad (2)$$

The algorithm proceeds to find an available node $Y_w$ for the cloud computing system 10 such that $S_y(w)-S_x(i)=\min_v(Sy(v)-Sx(f))$. As such, node $Y_w$ is used to simulate original node $X_i$, and node $Y_w$ is removed from list L. The algorithm proceeds until a full set of available nodes 16 are selected. Other suitable methods and algorithms for selecting the nodes 16 at block 730 may be provided.

In one exemplary embodiment, configurator 22 tunes the selected nodes 16 at block 732 using the following method, although other methods and algorithms may be provided. With this method, configurator runs a configuration application that automatically creates the appropriate network simulation layer on each node 16. If using a Netem network delay and loss emulator, the following algorithm is implemented by configurator 22. For each node in the emulated node cluster, $G_s$ is the node group that the emulated node belongs to (i.e., each node group comprises nodes that are physically near each other, e.g., same rack). For each group $G_i$ where $1<=i<=E$ and E is the total number of groups defined in the data file associated with the emulated node cluster, the following is performed by configurator 22. Configurator 22 looks up the desired network properties $p_0 \ldots p_N$ for outgoing traffic from node $G_s$ to node $G_i$. Configurator 22 creates a new class of service, such as by using the command "tc class add dev." for example. Configurator 22 creates a new queuing discipline, such as by using the command "tc qdisc add dev," for example. Configurator 22 sets the desired network properties to the class or queuing discipline "qdisc." The bandwidth and burst network properties are specified at the class, and all other properties (latency, error rate, etc.) are specified at the queuing discipline. For each node $Y_n$, $Gy_n$ is the group that the node $Y_n$ belongs to. Configurator 22 configures a filter based on the destination IP address (address of node $Y_n$) and assigns it to class $Gy_n$. This can be done, for example, using the command "tc filter add dev."

As a result, if the Netem emulator is turned on, the selected node cluster 14 will have similar network performance to the emulated node cluster with respect to at least the following network properties: minimum latency, maximum bandwidth, maximum burst rate, minimum packet corruption rate, minimum packet loss rate, and minimum packet reordering rate. Other suitable methods and algorithms for tuning the nodes 16 at block 732 may be provided.

In one embodiment, blocks 726-732 of FIG. 41 are repeated with different groups of available nodes 16 until the full cluster of nodes 14 is selected that corresponds to the emulated node cluster. In one embodiment, the emulated node cluster is theoretical in that the physical nodes 16 may or may not exist, but the desired network configuration is known and provided as input to configurator 22 for performing the node selection. In one embodiment, upon selecting the cluster of nodes 14 based on the emulated node cluster, configurator 22 is operative to test various workloads with the selected cluster of nodes 14 having the desired network configuration, such as using batch processor 80 described herein.

Allocating a Cluster of Nodes Based on Hardware Characteristics

Figure 43:
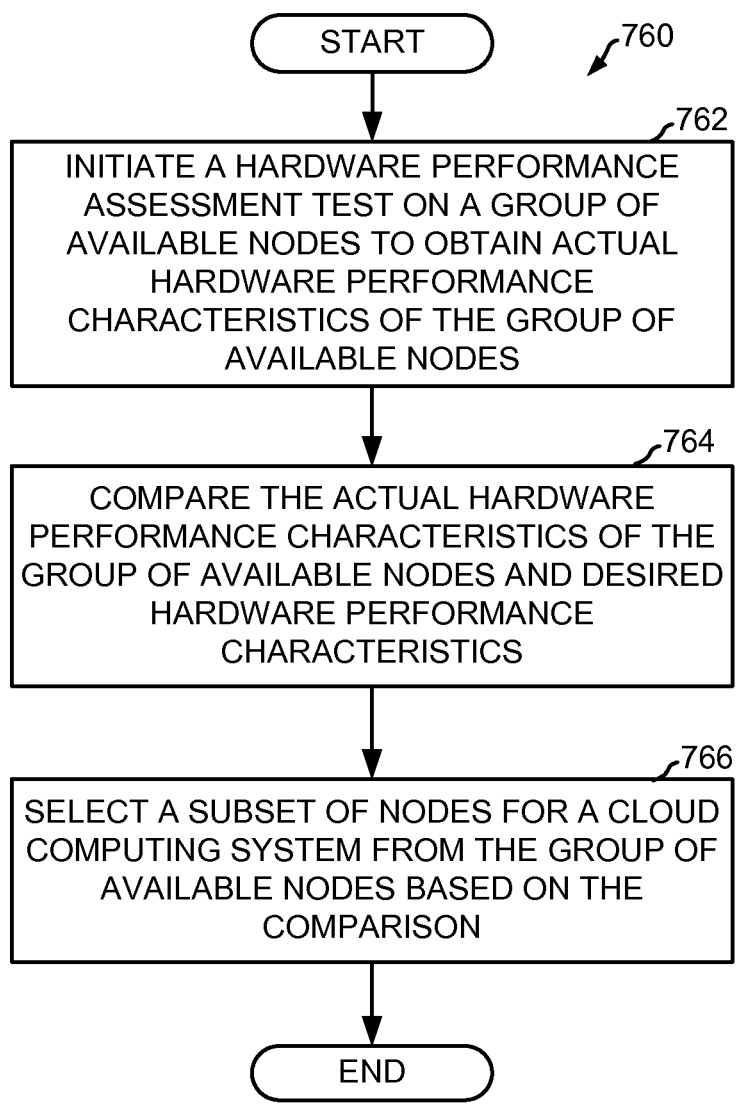
FIG. 43 is a flow chart of an exemplary method of operation of the configurator of FIG. 3 for selecting the cluster of nodes of FIG. 1.

FIG. 43 illustrates a flow diagram 760 of an exemplary operation performed by configurator 22 of FIGS. 1 and 3 for allocating a cluster of nodes 14 for cloud computing system 10. Reference is made to FIGS. 1-3 throughout the description of FIG. 43. At block 762, configurator 22 (e.g., data monitor configurator 82) initiates a hardware performance assessment test on a group of available nodes 16 of one or more data centers to obtain actual hardware performance characteristics of the group of available nodes 16. At block 764, node configurator 72 compares the actual hardware performance characteristics of the group of available nodes 16 and desired hardware performance characteristics identified based on user selections via user interface 200. At block 766, node configurator 72 selects a subset of nodes 16 for the cloud computing system 10 from the group of available nodes 16 based on the comparison at block 764. The subset of nodes 16, such as node cluster 14 or a group of nodes 16 of the node cluster 14, are operative to share processing of a workload, as described herein. The number of nodes 16 in the subset of nodes 16 is less than or equal to a number of nodes 16 requested by the user for the node cluster 14, as described herein.

In one embodiment, node configurator 72 receives a user request via user interface 200 requesting a cluster of nodes for the cloud computing system 10 having the desired hardware performance characteristics. The user request identifies the desired hardware performance characteristics based on, for example, user selections of selectable hardware configuration data, such as selection boxes 259, inputs 262, and field 256 of FIG. 8 and selectable inputs 265 of FIG. 9. In one embodiment, the fields of table 264 of FIG. 9 are selectable/modifiable to further identify desired hardware performance characteristics. Node configurator 72 may identify the desired hardware performance characteristics based on other suitable selectable inputs and fields of user interface 200. Node configurator 72 selects the group of available nodes 16 for testing with the hardware performance assessment test based on the user request of the cluster of nodes and the desired hardware performance characteristics identified in the request (e.g., based on hardware similarities between the available nodes 16 and the requested cluster of nodes). In the illustrated embodiment, the number of nodes 16 of the group of available nodes 16 is greater than the number of nodes 16 of the cluster of nodes requested with the user request.

An exemplary hardware performance characteristic includes the computer architecture of a node 16, such as whether the node 16 has a 64-bit processor architecture or a 32-bit processor architecture to support a workload that requires native 32-bit and/or 64-bit operations. Other exemplary hardware performance characteristics include a manufacturer of the processor(s) 40 of the node 16 (e.g., AMD, Intel, Nvidia, etc.), an operating frequency of the processor(s) 40 of the node 16, and a read/write performance of the node 16. Still other exemplary hardware performance characteristics include: a system memory capacity and a disk space (storage capacity); number and size of processors 40 of the node 16; a cache size of the node 16; available instruction sets of the node 16; disk I/O performance, hard drive speed of the node 16; the ability of the node 16 to support emulating software; the chipset; the type of memory of the node 16; the network communication latency/bandwidth between nodes 16; and other suitable hardware performance characteristics. In the illustrated embodiment, each of these hardware performance characteristics may be specified as desired by a user based on the user request provided via user interface 200. Further, one or more hardware performance assessment tests are operative to determine these actual hardware performance characteristics of each selected available node 16.

In one embodiment, node configurator 72 initiates the hardware performance assessment test at block 762 by deploying one or more hardware performance assessment tools to each node 16 that are operative to identify or determine the hardware performance characteristics of the node 16 and to generate hardware configuration data representative of these characteristics. Data aggregator 84 is then operative to aggregate the hardware performance data provided by the hardware performance assessment tools such that node configurator 72 can determine the actual hardware performance characteristics of each node 16 based on the aggregated data. An exemplary assessment tool includes a CPU identification tool ("CPUID"), which is known in the art, that includes an executable operation code for identifying the type of processor(s) of the node 16 and various characteristics/features of the processor (e.g., manufacturer, processor speed and capacity, available memory and disk space, etc.). Another exemplary monitoring tool includes a software code module that when executed by the node 16 is operative to test for an instruction set extension or instruction type to determine the instruction set compatible with the node 16 and/or the manufacturer of the processor(s). Another exemplary monitoring tool includes software code modules that when executed by the node 16 are operative to test whether a node 16 has 64-bit or 32-bit architecture. For example, such a test may involve issuing a command or processing request and measuring how long the processor takes to complete the request. Other suitable assessment tools may be provided.

In one embodiment, the number of nodes 16 of the subset of nodes 16 selected at block 766 is less than the number of nodes 16 identified in the user request. As such, configurator 22 repeats steps 762-766 to obtain additional subsets of nodes 16 until the number of selected nodes 16 is equal to the number of nodes 16 requested with the user request. In one embodiment, after selecting the first subset of nodes 16 at block 766, node configurator 72 selects a second group of available nodes 16 different from the first group of available nodes 16 initially tested at block 762. Data monitor configurator 82 initiates the hardware performance assessment test on the second group of available nodes 16 to obtain actual hardware performance characteristics of the second group of available nodes 16, and node configurator 72 selects a second subset of nodes 16 for the cloud computing system 10 from the second group of available nodes 16 based on a comparison by the node configurator 72 of the actual hardware performance characteristics of the second group of available nodes 16 and the desired hardware performance characteristics. In one embodiment, upon the combined number of nodes of the selected subsets of nodes 16 being equal to the number of nodes 16 requested with the user request, node configurator 72 configures the selected subsets of nodes 16 as the cluster of nodes 14 of cloud computing system 10 (i.e., configures the node cluster 14 with user-specified configuration parameters and runs workloads on the node cluster 14, etc.).

Figure 44:
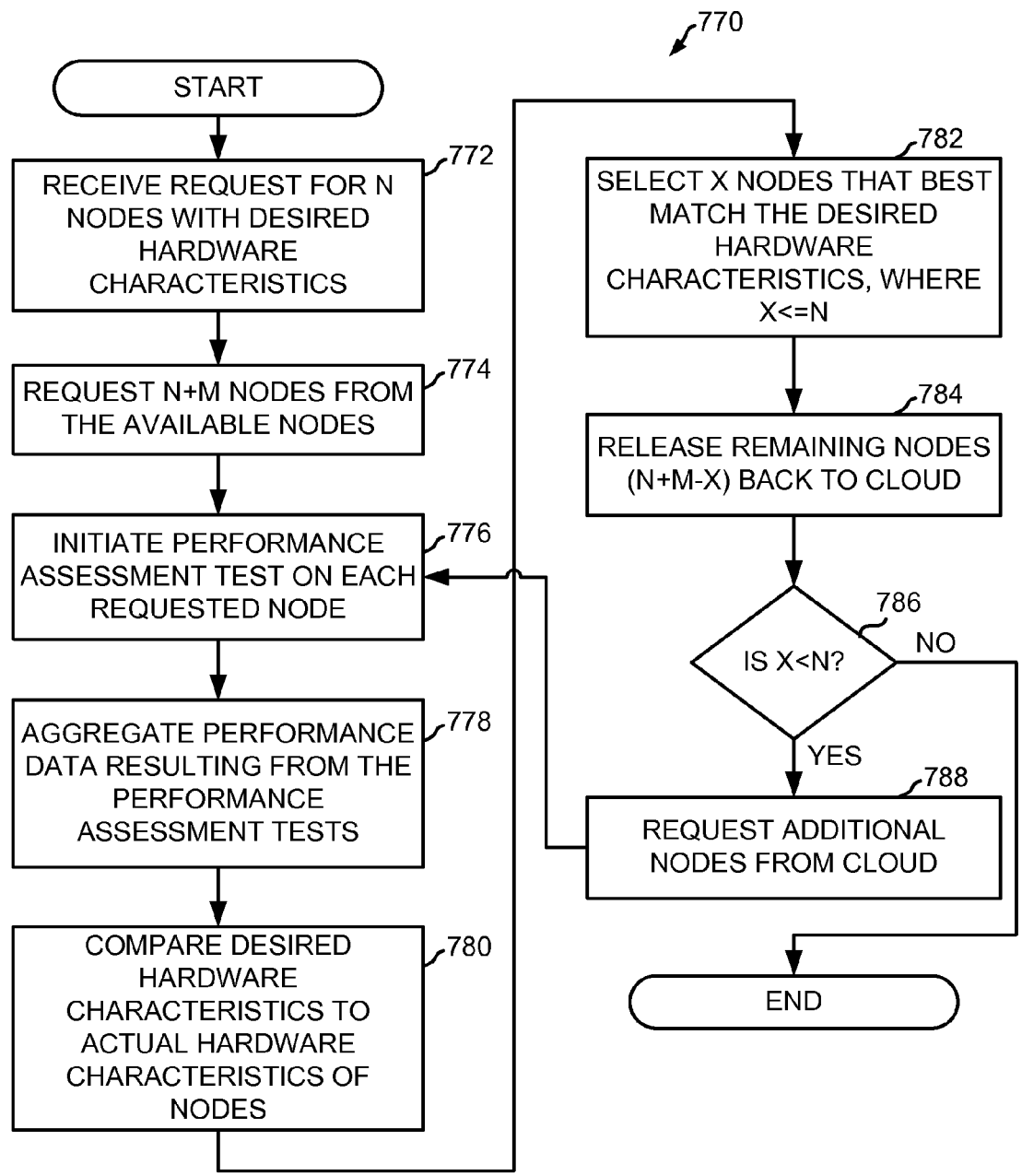
FIG. 44 is a flow chart of another exemplary method of operation of the configurator of FIG. 3 for selecting the cluster of nodes of FIG. 1.

Referring to FIG. 44, a flow diagram 770 is illustrated of an exemplary detailed operation performed by one or more computing devices, including configurator 22 of FIGS. 1 and 3, for selecting a cluster of nodes 14 that have hardware characteristics substantially matching desired hardware characteristics specified by a user. Reference is made to FIGS. 1-3 throughout the description of FIG. 44. At block 772, node configurator 72 receives a user request for N nodes 16 having desired hardware performance characteristics, where N is any suitable number of desired nodes 16. In one embodiment, the user request is based on user selection of selectable hardware configuration data (e.g., FIGS. 8 and 9), as described herein with respect to FIG. 43. At block 774, node configurator 72 requests or reserves N+M nodes 16 from the available nodes 16 of the accessed data center(s) or cloud. M is any suitable number such that the number (N+M) of reserved available nodes 16 exceeds the number N of requested nodes 16. For example, M may equal N or may equal twice N. Alternatively, node configurator 72 may request N available nodes 16 at block 774. In one embodiment, the (N+M) nodes 16 are allocated or reserved using an application specific API (e.g., an Amazon AWS API, an OpenStack API, a custom API, etc.). Node configurator 72 requests the available nodes 16 at block 774 (and block 788) based on the available nodes 16 having similar hardware characteristics as the desired cluster of nodes. For example, node configurator 72 may reserve available nodes 16 that have the same node type (e.g., small, medium, large, x-large, as described herein).

At block 776, data monitor configurator 82 initiates the hardware performance assessment test on each reserved node 16 by deploying one or more hardware performance assessment tools, and data aggregator 84 aggregates (e.g., collects and stores) hardware performance data resulting from the hardware performance assessment tests initiated on each node 16, as described herein with respect to FIG. 43. In one embodiment, the hardware performance assessment tools are software code modules preinstalled at nodes 16 or installed on nodes 16 using SSH, HTTP, or some other suitable protocol/mechanism.

At block 780, node configurator 72 compares the desired hardware performance characteristics of the user request (block 772) with the actual hardware performance characteristics resulting from the hardware performance assessment tests. Based on similarities in the actual and desired hardware performance characteristics, node configurator 72 at block 782 selects X nodes 16 from the (N+M) reserved nodes 16 that best match the desired hardware characteristics, where X is any number that is less than or equal to the number N of requested nodes 16. Any suitable algorithm may be used to compare the hardware characteristics and to select best-matching nodes 16, such as the "best matching" technique described herein with respect to FIG. 41 based on hardware characteristics. At block 784, node configurator 72 releases the remaining unselected available nodes 16 (e.g., (N+M)–X) back to the data center(s) or cloud, such as by using application specific APIs, for example, so that the unselected available nodes 16 are available for use with other cloud computing systems. Upon the selected number X of nodes 16 being less than the requested number N of nodes 16 at block 786, node configurator 72 requests or reserves additional nodes 16 from the data center(s)/cloud at block 788. Configurator 22 then repeats steps 776-786 until the total number of selected nodes 16 (i.e., the combined number of nodes 16 resulting from all iterations of the selection method) is equal to the number N of requested nodes 16. The selected nodes 16 are then configured as the cluster of nodes 14 for performing the cloud computing tasks assigned by the user.

In one embodiment, the method of FIG. 44 operates in conjunction with the method of FIG. 41 to select a cluster of nodes 14 having desired hardware characteristics and network characteristics. In one embodiment, the method of FIG. 44 selects nodes 16 further based on the nodes 16 having close network proximity. In one embodiment, the hardware characteristics identified with the user request at block 772 are prioritized prior to selecting nodes 16 for the node cluster 14. In one embodiment, the method of FIG. 44 (and FIG. 43) is run automatically by configurator 22 to find a suitable match of the actual selected cluster of nodes 14 with the desired cluster of nodes specified by the user. Alternatively, a user may be given the option by configurator 22 to initiate the operations of FIGS. 43 and 44 based on selectable inputs of user interface 200, for example.

Figure 45:
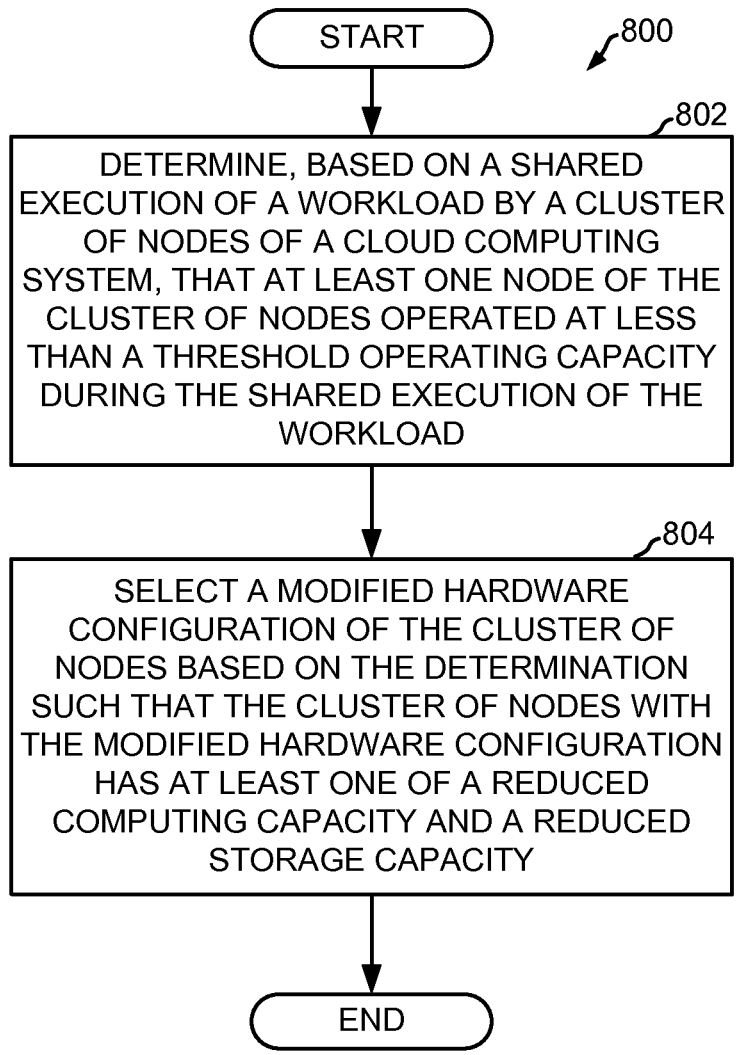
FIG. 45 is a flow chart of an exemplary method of operation of the configurator of FIG. 3 for selecting a hardware configuration of the cluster of nodes of FIG. 1.

Selecting and/or Modifying a Hardware Configuration of the Cloud Computing System FIG. 45 illustrates a flow diagram 800 of an exemplary operation performed by configurator 22 of FIGS. 1 and 3 for selecting a hardware configuration of the cluster of nodes 14 of cloud computing system 10. Reference is made to FIGS. 1 and 3 throughout the description of FIG. 45. At block 802, node configurator 72 determines, based on a shared execution of a workload by cluster of nodes 14 of the cloud computing system 10, that at least one node 16 of the cluster of nodes 14 operated at less than a threshold operating capacity during the shared execution of the workload. The threshold operating capacity is illustratively based on the hardware utilization by the at least one node 16, e.g., the utilization of processor 40 and/or memory 42 during workload execution. The threshold operating capacity may be any suitable threshold, such as, for example, a maximum operating capacity (100%) or a 90% operating capacity. At block 804, node configurator 72 selects a modified hardware configuration of the cluster of nodes 14 based on the determination at block 802 such that the cluster of nodes 14 with the modified hardware configuration has at least one of a reduced computing capacity and a reduced storage capacity.

In one embodiment, node configurator 72 selects the modified hardware configuration by selecting at least one different node 16 from a plurality of available nodes 16 of the data center and replacing the at least one node 16 of the cluster of nodes 14 with the at least one different node 16. The different node 16 has at least one of a reduced computing capacity and a reduced storage capacity compared with the replaced node 16 of the cluster of nodes 14. For example, node configurator 72 selects a different node 16 from the available nodes 16 that has a slower processor 40, fewer processing cores, less memory capacity, or any other suitable reduced hardware characteristic as compared with the replaced node 16. For example, the replaced node 16 has more computing power or memory capacity than is required to process the workload such that portions of the hardware of the replaced node 16 are underutilized during workload execution. In the illustrated embodiment, the different node 16 is selected such that it is operative to process the workload with a similar performance (e.g., similar execution speed, etc.) as the one or more replaced nodes 16 but also more efficiently due to the reduced computing and/or storage capacity of the different node 16. As such, the cluster of nodes 14 modified with the different node 16 executes the workload more efficiently due to the reduced computing and/or storage capacity of the different node 16 while exhibiting little or no overall performance loss. For example, the node cluster 14 executes the workload at a substantially similar speed with the different node 16 as with the replaced node 16.

In one embodiment, node configurator 72 selects and implements the modified hardware configuration of block 804 by selecting and removing one or more nodes 16 from the cluster of nodes 14 without replacing the removed nodes 16 with different nodes 16. For example, node configurator 72 determines that one or more nodes 16 of the node cluster 14 are not needed for the remaining nodes 16 of node cluster 14 to execute the workload with a similar execution performance. Node configurator 72 thus removes these one or more nodes 16 from the node cluster 14 and releases these nodes 16 back to the data center. In one embodiment, node configurator 72 selects and implements the modified hardware configuration of block 804 by reducing at least one of the computing capacity and memory capacity of one or more nodes 16 of the node cluster 14 (e.g., by adjusting the boot-time parameters described herein).

In the illustrated embodiment, configurator 22 has access to hardware usage cost data that identifies the hardware usage cost associated with using various hardware resources (e.g., nodes 16) for the node cluster 14. For example, the cloud computing service (e.g., Amazon, OpenStack, etc.) charges a usage cost based on the hardware, such as the computing capacity and memory capacity, of each selected node 16 of the node cluster 14. As such, in one embodiment, node configurator 72 selects the at least one different node 16 to replace one or more nodes 16 of the node cluster 14 further based on a comparison by the node configurator 72 of usage cost data associated with using the at least one different node 16 in the cluster of nodes 14 and usage cost data associated with using the at least one replaced node 16 in the cluster of nodes 14. In one embodiment, node configurator 72 selects the at least one different node 16 upon the usage cost of the at least one different node 16 being less than the usage cost of the replaced node 16. For example, node configurator 72 calculates the cost of the hardware resources (e.g., nodes 16) used in the cluster of nodes 14 and determines cost benefits associated with potential hardware configuration changes of the cluster of nodes 14. For example, node configurator 72 selects one or more different nodes 16 that will result in a more efficient use of allocated hardware resources of the node cluster 14 at a lower usage cost and with minimum performance loss. In one embodiment, configurator 22 configures the network configuration or other configuration parameters based on a similar cost analysis.

In the illustrated embodiment, configurator 22 monitors the hardware utilization of each node 16 by deploying one or more hardware utilization monitoring tools to each node 16 of the cluster of nodes 14. Execution of the hardware utilization monitoring tools by each node 16 is operative to cause the at least one processor 40 of each node 16 to monitor a utilization or usage of the computer hardware (e.g., processor 40, memory 42, memory controller, etc.) during the execution of the workload. The monitoring tools then cause the nodes 16 to provide hardware utilization data accessible by configurator 22 that is associated with the hardware utilization of each node 16 during execution of the workload. Data aggregator 84 of configurator 22 is operative to aggregate the hardware utilization data provided by each node 16 such that configurator 22 determines the hardware utilization of each node 16 based on the aggregated hardware utilization data. Exemplary hardware monitoring tools are described herein with respect to Monitoring module 214 of FIGS. 26-29. For example, the IOStat and VMStat tools include code modules executable by the node processor 40 to monitor the percentage of time the processor 40, virtual memory, and/or memory controller is busy executing instructions or performing I/O operations during workload execution, the percentage of time these components are waiting/stalled during workload execution, and other suitable utilization parameters. Based on the determined hardware utilization of a node 16, node configurator 72 may determine that less memory and or less computing power is needed for that node 16 than was initially requested and allocated and may replace or remove the node 16 from the cluster 14, as described herein.

In one embodiment, node configurator 72 displays selectable hardware configuration data on user interface 200 that represents the selected modified hardware configuration selected at block 804. Based on user selection of the selectable hardware configuration data, node configurator 72 modifies the hardware configuration of the cluster of nodes 14, e.g., replaces or removes a node 16 of the node cluster 14. Exemplary selectable hardware configuration data is illustrated in table 258 of FIG. 8 with selectable inputs 259, 262. For example, node configurator 72 may display the recommended modified hardware configuration of node cluster 14 in table 258 by listing the recommended nodes 16 of the node cluster 14 including one or more different nodes 16 or removed nodes 16. The user selects the inputs 259 corresponding to the listed nodes 16 to accept the hardware changes, and node configurator 72 configures the modified node cluster 14 based on the accepted changes upon initiation of workload deployment, described herein. In one embodiment, the hardware usage cost is also displayed with user interface 200 for one or more recommended hardware configurations of the node cluster 14 to allow a user to select a configuration for implementation based on the associated usage cost. Other suitable interfaces may be provided for displaying the modified hardware configuration of the cluster of nodes 14. In one embodiment, node configurator 72 automatically configures the cluster of nodes 14 with the modified hardware configuration selected at block 804 without user input or confirmation, and initiates further executions of the workload with the modified node cluster 14.

Figure 46:
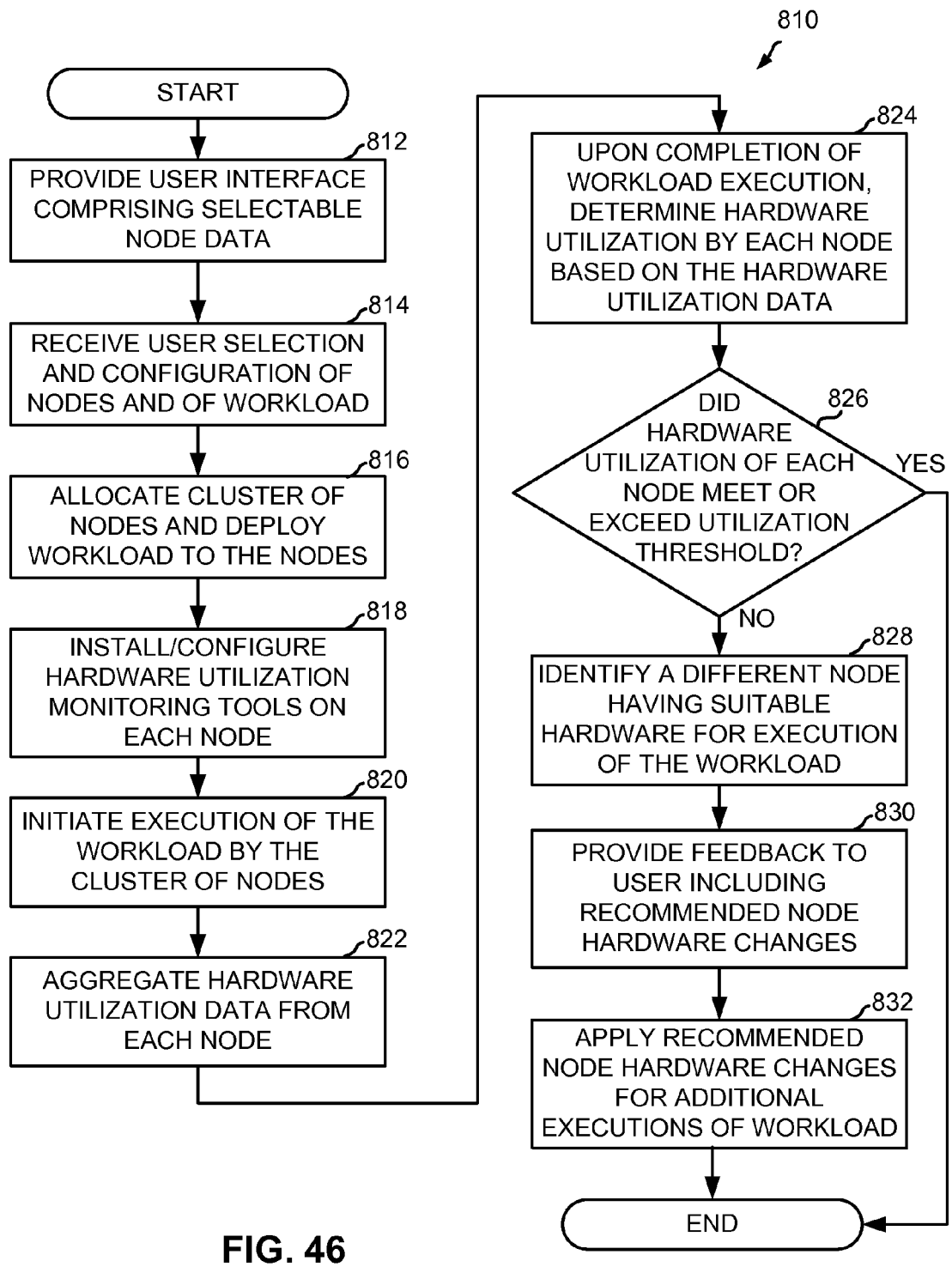
FIG. 46 is a flow chart of another exemplary method of operation of the configurator of FIG. 3 for selecting a hardware configuration of the cluster of nodes of FIG. 1.

Referring to FIG. 46, a flow diagram 810 is illustrated of an exemplary detailed operation performed by one or more computing devices, including configurator 22 of FIGS. 1 and 3, for selecting a hardware configuration of the cluster of nodes 14 of cloud computing system 10. Reference is made to FIGS. 1-3 throughout the description of FIG. 46. At block 812, configurator 22 provides user interface 200 including selectable node data to allow for user selection at block 814 of a desired cluster of nodes 14 with a desired hardware configuration, as described herein. At block 816, configurator 22 selects and configures the selected cluster of nodes 14 and deploys the workload to the cluster of nodes 14, as described herein. At block 818, configurator 22 installs and/or configures the hardware utilization monitoring tools on each node 16 of the node cluster 14. In one embodiment, the monitoring tools are selected by a user via Monitoring module 214 of FIGS. 26-29. Alternatively, configurator 22 may automatically deploy one or more monitoring tools, such as the IOStat and VMStat tools, based on initiation of the method of FIG. 46. At block 820, workload configurator 78 initiates execution of a workload on the cluster of nodes 14, and at block 822, following or during the execution, data aggregator 84 collects and stores the hardware utilization data provided by the monitoring tools of each node 16.

Upon completion of the workload execution by the node cluster 14, node configurator 72 determines the hardware utilization of each node 16 based on the hardware utilization data, as represented with block 824. At block 826, node configurator 72 determines whether the hardware utilization of each node 16 met or exceeded a utilization threshold (e.g., 100% utilization, 90% utilization, or any other suitable utilization threshold). In one embodiment, node configurator 72 compares multiple utilization measurements to one or more utilization thresholds at block 826, such as processor utilization, memory utilization, memory controller utilization, etc. If yes at block 826, the node cluster 14 is determined to be suitable for further workload executions, i.e., no adjustments to the hardware configuration of the node cluster 14 are made by configurator 22. For each node 16 that does not meet or exceed the utilization threshold at block 826, node configurator 72 identifies a different, replacement node 16 from the available nodes 16 of the data center that has hardware that is suitable for execution of the workload (i.e., similar performance to the replaced node(s) 16) while having less computing or memory capacity as the replaced node 16, as described herein with respect to FIG. 45. At block 830, node configurator 72 provides feedback to a user of any recommended hardware configuration changes identified at block 828 by displaying the recommended hardware configuration of the cluster of nodes 14 on user interface 200, as described with respect to FIG. 45. At block 832, node configurator 72 applies the recommended hardware configuration changes for future executions of the workload by removing and/or replacing nodes 16 of the original node cluster 14 with the different nodes 16 identified at block 828.

In one embodiment, a selection by the user of a selectable input of user interface 200 causes node configurator 72 to run the hardware configuration method described with FIGS. 45 and 46 to find a suitable configuration of node cluster 14 for executing the workload. Alternatively, configurator 22 may automatically implement the method of FIGS. 45 and 46, such as upon initiation of a batch processing job, for example, to find a suitable alternative configuration of the cluster of nodes 14 that does not significantly limit workload performance.

Tuning the Cloud Computing System

Figure 47:
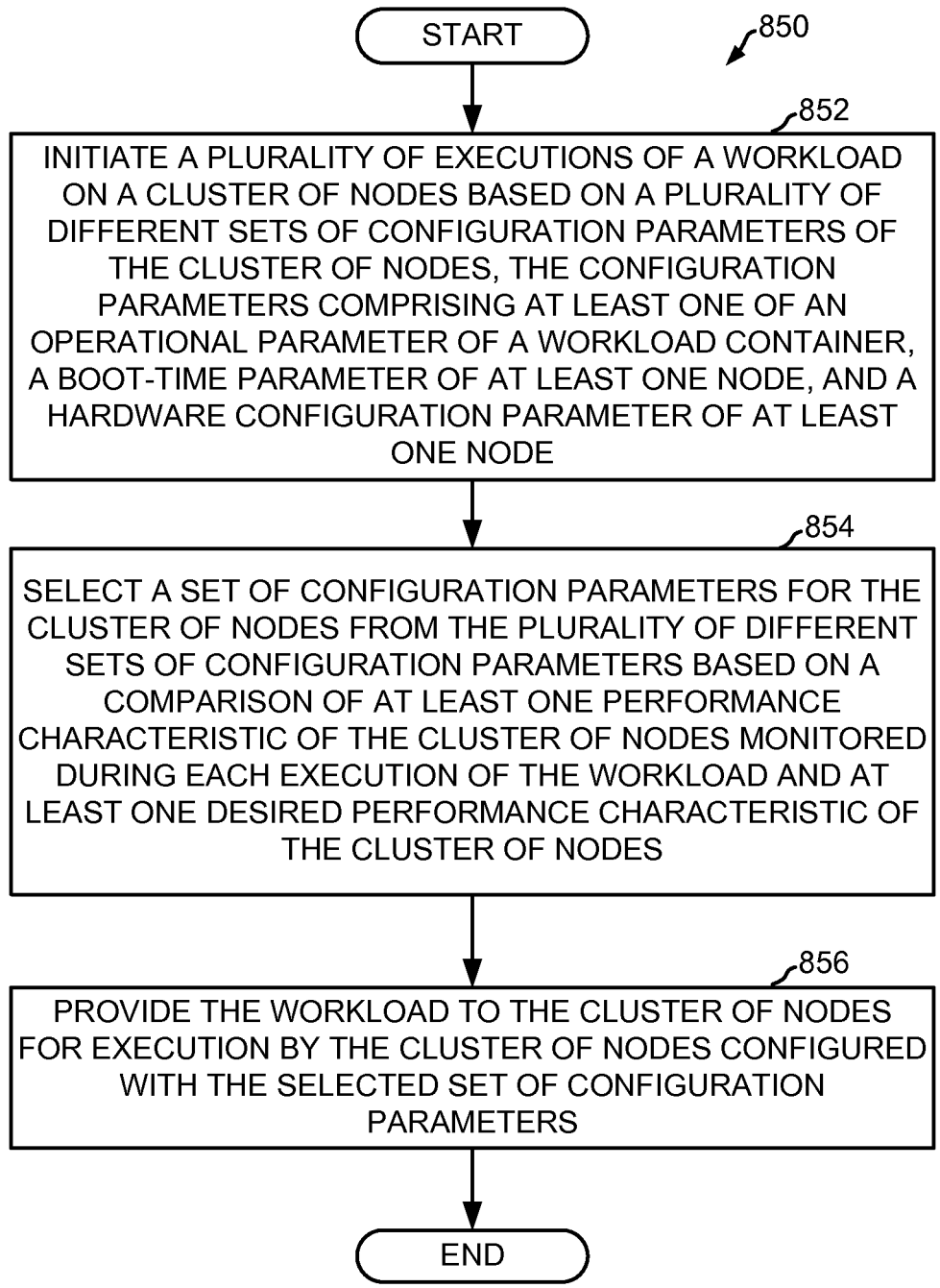
FIG. 47 is a flow chart of an exemplary method of operation of the configurator of FIG. 3 for selecting configuration parameters for the cluster of nodes of FIG. 1 based on monitored performance characteristics of the cluster of nodes.

FIG. 47 illustrates a flow diagram 850 of an exemplary operation performed by configurator 22 of FIGS. 1 and 3 for selecting a suitable configuration of the cluster of nodes 14 of cloud computing system 10 from a plurality of available configurations. Reference is made to FIGS. 1 and 3 throughout the description of FIG. 47. At block 852, configurator 22 (e.g., batch processor 80) initiates a plurality of executions of a workload on cluster of nodes 14 based on a plurality of different sets of configuration parameters for the cluster of nodes 14. The configuration parameters, provided as input to nodes 16 by configurator 22 (e.g., via one or more configuration files 28 as described herein), are adjustable by configurator 22 to provide the different sets of configuration parameters, and the workload is executed by the cluster of nodes 14 with each different set of configuration parameters. In one embodiment, configurator 22 adjusts the configuration parameters for each workload execution based on user input provided via user interface 200, as described herein. In one embodiment, the configuration parameters include at least one of the following: an operational parameter of the workload container of at least one node 16, a boot-time parameter of at least one node 16, and a hardware configuration parameter of at least one node 16.

At block 854, node configurator 72 selects a set of configuration parameters for the cluster of nodes 14 from the plurality of different sets of configuration parameters. At block 856, workload configurator 78 provides (e.g., deploys) the workload to the cluster of nodes 14 for execution by the cluster of nodes 14 configured with the selected set of configuration parameters. As such, future executions of the workload are performed by the cluster of nodes 14 having a configuration that is based on the selected set of configuration parameters.

The selection of the set of configuration parameters at block 854 is based on a comparison by the node configurator 72 of at least one performance characteristic of the cluster of nodes 14 monitored (e.g., with monitoring tools) during each execution of the workload and at least one desired performance characteristic of the cluster of nodes 14. For example, in one embodiment node configurator 72 selects the set of configuration parameters that result in performance characteristics of the node cluster 14 during workload execution that best match desired performance characteristics specified by a user. In the illustrated embodiment, the desired performance characteristics are identified by node configurator 72 based on user input provided via user interface 200. For example, user interface 200 includes selectable performance data, such as selectable inputs or fillable fields, that allow a user to select desired performance characteristics of the cluster of nodes 14 when executing a selected workload. See, for example, fillable field 276 of FIG. 10 or any other suitable selectable input or field of user interface 200 configured to receive user input identifying desired performance characteristics. In another example, node configurator 72 may load a user-provided file containing data identifying the desired performance characteristics, such as based on user selection of inputs 238, 228, 230, 232 of FIG. 7 and/or button 494 of the batch processor module 212 of FIG. 25, for example.

Exemplary performance characteristics specified by the user and monitored during workload execution include a workload execution time, a processor utilization by a node 16, a memory utilization by a node 16, a power consumption by a node 16, a hard disk input/output (I/O) utilization by a node 16, and a network utilization by a node 16. Other suitable performance characteristics may be monitored and/or specified by a user, such as the performance characteristics monitored with the monitoring tools described herein with respect to FIGS. 26-29.

In one embodiment, the selection of the set of configuration parameters at block 854 is further based on a determination by node configurator 72 that a value associated with one or more performance characteristics monitored during an execution of the workload falls within a range of acceptable values associated with one or more corresponding desired performance characteristics. For example, ranges of acceptable values (e.g., input by a user or set by node configurator 72) associated with corresponding desired performance characteristics may include 85% to 100% processor utilization and 85% to 100% memory utilization. Accordingly, node configurator 72 selects a set of configuration parameters that result in 95% processor utilization and 90% memory utilization but rejects a set of configuration parameters resulting in 80% processor utilization and 75% memory utilization. Upon multiple sets of configuration parameters resulting in performance characteristics that meet the acceptable range of values, node configurator 72 selects the set of configuration parameters based on additional factors, such as the best performance values, the lowest usage cost, priorities of the performance characteristics, or other suitable factors. Upon no sets of configuration parameters resulting in performance characteristics that fall within the acceptable ranges, node configurator 72 selects the set that results in the best matching performance characteristics, automatically further adjusts configuration parameters until an appropriate set is found, and/or notifies the user that no sets of configuration parameters were found to be acceptable.

In one embodiment, node configurator 72 assigns a score value to each different set of configuration parameters based on the similarities of the monitored performance characteristics to the desired performance characteristics. As such, the selection of the set of configuration parameters at block 854 is further based on the score value assigned to the selected set of configuration parameters. For example, node configurator 72 selects the set of configuration parameters resulting in the highest score value. The score value ranks the sets of configuration parameters based on how closely the performance characteristics of the node cluster 14 match the desired performance characteristics.

In one embodiment, the selection of the set of configuration parameters at block 854 is further based on a comparison of usage cost data associated with using different available nodes 16 or network configurations with the cluster of nodes 14. For example, node configurator 72 may select a set of configuration parameters that result in a processor and memory utilization greater than a threshold utilization level and a usage cost less than a threshold cost level. Any other suitable considerations of usage cost may be applied to the selection at block 854.

In one embodiment, configurator 22 initiates a first execution of the workload on node cluster 14 based on an initial set configuration parameters provided by a user (e.g., via user interface 200). In this embodiment, to find a set of configuration parameters resulting in the desired performance characteristics, node configurator 72 steps through different sets of configuration parameters by automatically adjusting at least one configuration parameter of the initial set and initiating additional executions of the workload based on the modified initial sets. Any suitable design space exploration method or algorithm may be used to explore different sets of configuration parameters in this fashion.

In one embodiment, data monitor aggregator 82 deploys one or more node and network performance monitoring tools (described with FIGS. 26-29, for example) to each node 16 of the cluster of nodes 14. The monitoring tools when executed by each node 16 (or by control server 12) are operative to monitor performance characteristics of each node 16 during each execution of the workload, as described herein. The executed monitoring tools generate performance data representing the performance characteristics of the corresponding node 16 that are accessible by configurator 22. Data aggregator 84 aggregates the performance data provided by the performance monitoring tools of each node 16, and node configurator 72 selects the set of configuration parameters at block 854 based on the aggregated performance data.

As described herein, the different sets of configuration parameters of the cluster of nodes 14 include at least one of an operational parameter of the workload container, a boot-time parameter, and a hardware configuration parameter. Exemplary operational parameters of the workload container are described herein with respect to FIGS. 4-6, 19, and 20 and include, for example, operational parameters associated with at least one of a read/write operation, a file system operation, a network socket operation, and a sorting operation. The operational parameters are selected and modified by workload container configurator 76 based on user selections of the selectable data (e.g., inputs and fields) illustrated in FIGS. 19 and 20 and described herein. Exemplary operational parameters associated with the read/write operation include a memory buffer size for the read/write operation and a size of a data block transferred during the read/write operation. Exemplary operational parameters associated with the file system operation comprises at least one of a number of file system records stored in memory of each node 16 and a number of processing threads of each node 16 allocated for processing requests for the file system. An exemplary operational parameter associated with the sorting operation includes a number of data streams to merge when performing the sorting operation. Other suitable operational parameters of a workload container may be provided.

Exemplary boot-time parameters are described herein with respect to FIGS. 10 and 36-38 and include, for example, a number of processing cores of a node 16 that are enabled during an execution of the workload and an amount of system memory of a node 16 that is accessible by an operating system 44 of the node 16. The boot-time parameters are selected and modified by node configurator 72 based on user selection of the selectable data (e.g., inputs and fields) illustrated in FIG. 10 and described herein. Other suitable boot-time parameters may be provided. Exemplary hardware configuration parameters are described herein with respect to FIGS. 8, 9, and 43-46 and include, for example, at least one of a number of processors 40 of a node 16, an amount of system memory of a node 16, and an amount of hard disk space of a node 16. The hardware configuration parameters are selected and modified by node configurator 72 based on user selection of the selectable data (e.g., inputs and fields) illustrated in FIGS. 8 and 9 and described herein. Other suitable hardware configuration parameters may be provided.

Figure 48:
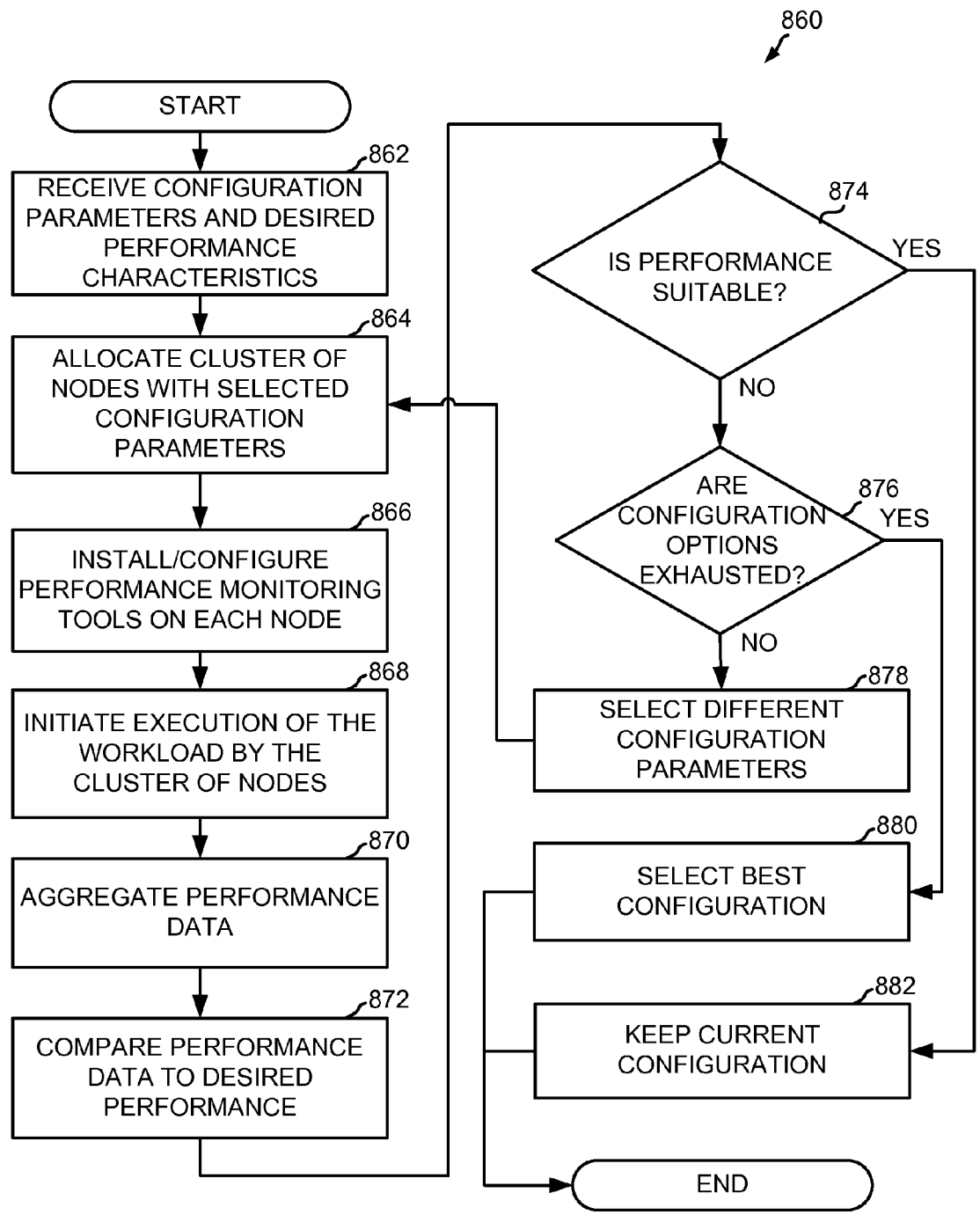
FIG. 48 is a flow chart of another exemplary method of operation of the configurator of FIG. 3 for selecting configuration parameters for the cluster of nodes of FIG. 1 based on monitored performance characteristics of the cluster of nodes.

Referring to FIG. 48, a flow diagram 860 is illustrated of an exemplary detailed operation performed by one or more computing devices, including configurator 22 of FIGS. 1 and 3, for selecting a suitable configuration of the cluster of nodes 14 of cloud computing system 10 from a plurality of available configurations. Reference is made to FIGS. 1-3 throughout the description of FIG. 48. In the illustrated embodiment of FIG. 48, configurator 22 stops searching for a suitable set of configuration parameters upon the actual performance of the node cluster 14 meeting or exceeding the desired performance. In another embodiment, configurator 22 tries each set of identified configuration parameters before selecting a set of configuration parameters that are a best match based on the desired performance characteristics and/or other suitable factors (e.g., usage cost).

At block 862, configurator 22 receives one or more sets of configuration parameters as well as the desired performance characteristics associated with the workload execution based on user input received via user interface 200, as described herein. At block 864, configurator 22 allocates a cluster of nodes 14 and configures the cluster of nodes 14 with a set of configuration parameters received at block 862. In one embodiment, configurator 22 deploys one or more configuration files 28 to nodes 16 identifying the configuration parameters at block 864, as described herein. Configurator 22 installs and/or configures one or more monitoring tools (e.g., selected by a user via module 214, for example) on each node 16 at block 866 and initiates an execution of the workload by the cluster of nodes 14 at block 868. Upon or during execution of the workload, configurator 22 aggregates the performance data generated by the one or more monitoring tools of each node 16 at block 870. Based on the aggregated performance data, at block 872 configurator 22 compares the desired performance characteristics identified at block 862 with the actual performance characteristics of the cluster 14 identified with the aggregated performance data, as described herein. At block 874, configurator 22 determines if the performance characteristics are suitable as compared with the desired performance characteristics (e.g., within an acceptable range, having a suitable score value, etc.), as described herein. If yes at block 874, configurator keeps the current configuration parameters last implemented at block 864 for future executions of the workload. If the performance characteristics are not as desired at block 874 and if the available different sets of configuration parameters are not exhausted at block 876, configurator 22 selects a different set of configuration parameters at block 878, and repeats the functions of blocks 864-876. For example, configurator 22 may implement a different set of configuration parameters identified at block 862 or an incrementally adjusted set of parameters provided by configurator 22, as described above. The process repeats until the configurator 22 finds a suitable set of configuration parameters at block 874 or the configuration parameter options are exhausted at block 876. If the configuration options are exhausted at block 876, configurator 22 selects the set of configuration parameters that provided the best performance characteristics and other identified characteristics (e.g., usage cost) at block 880.

Among other advantages, the method and system allow for the selection and generation of synthetic test workloads used, for example, in testing the performance of the cloud computing system based on desired characteristics of a workload. The synthetic test workload is retargetable such that alternative computer architectures of a cloud computing system may be targeted. Other advantages will be recognized by those of ordinary skill in the art.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

What is claimed is:

1. A method of configuring a computing system carried out by one or more computing devices, the method comprising:
providing a user interface comprising selectable actual workload data and selectable synthetic test workload data;
selecting, based on a user selection received via the user interface of at least one of the selectable actual workload data and the selectable synthetic test workload data, a workload for execution on a cluster of nodes of the computing system, the workload being selected from a plurality of available workloads including an actual workload and a synthetic test workload, the actual workload comprising a code module stored in memory accessible by the one or more computing devices; and
configuring the cluster of nodes of the computing system to execute the selected workload such that processing of the selected workload is distributed across the cluster of nodes.

2. The method of claim 1, wherein the one or more computing devices selects from a pre-generated synthetic test workload and a set of user-defined workload parameters based on the user selection of the selectable synthetic test workload data, the pre-generated synthetic test workload comprises a code module stored in memory accessible by the one or more computing devices, and the one or more computing devices is operative to generate a synthetic test workload based on the selection of the set of user-defined workload parameters.

3. The method of claim 1, further comprising generating, by a code synthesizer of the one or more computing devices, the synthetic test workload based on user-defined workload parameters received via the user interface, the user-defined workload parameters identifying execution characteristics of the synthetic test workload.

4. The method of claim 3, wherein the user-defined workload parameters comprise at least one of: a number of instructions of the synthetic test workload, a type of instruction of the synthetic test workload, a latency associated with an execution of at least one instruction of the synthetic test workload, and a maximum number of execution iterations of the synthetic test workload, and wherein the type of instruction includes at least one of an integer instruction, a floating point instruction, and a branch instruction.

5. The method of claim 3, wherein the user-defined workload parameters identify at least a portion of an instruction set architecture of a node of the cluster of nodes.

6. The method of claim 3, wherein the one or more computing devices generates the synthetic test workload such that an execution of the synthetic test workload by the cluster of nodes is operative to simulate execution characteristics associated with an execution of an actual workload by the cluster of nodes.

7. The method of claim 1, further comprising selecting, based on a user selection received via the user interface, a workload container module for operation on each node of the cluster of nodes, the workload container module comprising a code module that when executed by the each node is operative to coordinate execution of the selected workload on the cluster of nodes.

8. A computing configuration system comprising:
at least one processor comprising:
a configurator operative to provide a graphical user interface comprising selectable actual workload data and selectable synthetic test workload data;
a workload configurator operative to select, based on a user selection received via the graphical user interface of at least one of the selectable actual workload data and the selectable synthetic test workload data, a workload for execution on a cluster of nodes of a computing system, the workload being selected from a plurality of available workloads including an actual workload and a synthetic test workload, the actual workload comprising a code module stored in a memory accessible by the one or more computing devices; and
a node configurator operative to configure the cluster of nodes of the computing system to execute the selected workload such that processing of the selected workload is distributed across the cluster of nodes.

9. The system of claim 8, the system comprising memory containing executable instructions that when executed by the at least one processor cause the at least one processor to provide the graphical user interface on a display, the graphical user interface comprising data representing the workload configurator and the node configurator.

10. The system of claim 8, wherein the workload configurator selects from a pre-generated synthetic test workload and a set of user-defined workload parameters based on the user selection of the selectable synthetic test workload data, the pre-generated synthetic test workload comprises a code module stored in memory accessible by the workload configurator, and the workload configurator is operative to generate a synthetic test workload based on the selection of the set of user-defined workload parameters.

11. The system of claim 8, wherein the workload configurator comprises a code synthesizer operative to generate the synthetic test workload based on user-defined workload parameters received via the user interface, and the user-defined workload parameters identify execution characteristics of the synthetic test workload.

12. The system of claim 11, wherein the user-defined workload parameters comprise at least one of: a number of instructions of the synthetic test workload, a type of instruction of the synthetic test workload, a latency associated with an execution of at least one instruction of the synthetic test workload, and a maximum number of execution iterations of the synthetic test workload, and wherein the type of instruction includes at least one of an integer instruction, a floating point instruction, and a branch instruction.

13. A method of configuring a computing system carried out by one or more computing devices, the method comprising:
identifying, by the one or more computing devices, a computer architecture of each node of a cluster of nodes of the computing system, the computer architecture including at least one of an instruction set architecture and a microarchitecture;
generating, by a code synthesizer of the one or more computing devices, a synthetic test workload for execution on the cluster of nodes of the computing system based on the identified computer architecture of each node and a set of user-defined workload parameters provided via a user interface, the set of user-defined workload parameters identifying execution characteristics of the synthetic test workload; and
configuring the cluster of nodes of the computing system with the synthetic test workload to execute the synthetic test workload such that processing of the synthetic test workload is distributed across the cluster of nodes.

14. The method of claim 13, further including collecting performance data indicative of a performance of each node of the cluster of nodes during execution of the synthetic test workload by the cluster of nodes.

15. The method of claim 13, further comprising
providing the user interface, the user interface comprising selectable synthetic test workload data; and
selecting the set of user-defined workload parameters for generating the synthetic test workload based on at least one user selection of the selectable synthetic test workload data.

16. The method of claim 13, wherein the set of user-defined workload parameters are identified in a data structure displayed on a user interface, the data structure including a plurality of modifiable input fields, wherein each modifiable input field identifies at least one user-defined workload parameter.

17. The method of claim 16, wherein the set of user-defined workload parameters comprise at least one of: a number of instructions of the synthetic test workload, a type of instruction of the synthetic test workload, a latency associated with an execution of at least one instruction of the synthetic test workload, and a maximum number of execution iterations of the synthetic test workload, and wherein the type of instruction includes at least one of an integer instruction, a floating point instruction, and a branch instruction.

18. The method of claim 13, further comprising
generating, by the code synthesizer, a plurality of synthetic test workloads, each synthetic test workload being generated based on a different computer architecture associated with nodes of the computing system, each computer architecture including at least one of an instruction set architecture and a microarchitecture.

19. The method of claim 13, further comprising
selecting a modified hardware configuration of at least one node of the cluster of nodes based on a user selection received via the user interface; and
configuring the cluster of nodes having the modified hardware configuration to execute the synthetic test workload, the modified hardware configuration being operative to reduce at least one of a computing capacity and a memory capacity of the at least one node during execution of the synthetic test workload.

20. A computing configuration system comprising:
at least one processor comprising:
- a workload configurator operative to identify a computer architecture of each node of a cluster of nodes of a computing system and to generate a synthetic test workload for execution on the cluster of nodes of the computing system based on the identified computer architecture of each node and a set of user-defined workload parameters provided via a user interface, the set of user-defined workload parameters identifying execution characteristics of the synthetic test workload, the computer architecture including at least one of an instruction set architecture and a microarchitecture;
- a node configurator operative to configure the cluster of nodes of the computing system with the synthetic test workload to execute the synthetic test workload such that processing of the synthetic test workload is distributed across the cluster of nodes; and
- a data aggregator operative to collect performance data indicative of a performance of the cluster of nodes during execution of the synthetic test workload by the cluster of nodes.

21. The system of claim 20, further comprising memory containing executable instructions that when executed by the at least one processor cause the at least one processor to provide the user interface comprising selectable synthetic test workload data, wherein the workload configurator is operative to select the set of user-defined workload parameters for generating the synthetic test workload based on at least one user selection of the selectable synthetic test workload data.

22. The system of claim 20, wherein the set of user-defined workload parameters are identified in a data structure displayed on a user interface, and the data structure includes a plurality of modifiable input fields each identifying at least one user-defined workload parameter.

23. The system of claim 22, wherein the user-defined workload parameters comprise at least one of: a number of instructions of the synthetic test workload, a type of instruction of the synthetic test workload, a latency associated with an execution of at least one instruction of the synthetic test workload, and a maximum number of execution iterations of the synthetic test workload, and wherein the type of instruction includes at least one of an integer instruction, a floating point instruction, and a branch instruction.

24. The system of claim 20, wherein the workload configurator is operative to generate a plurality of synthetic test workloads, each synthetic test workload being generated based on a different computer architecture associated with nodes of the computing system, each computer architecture including at least one of an instruction set architecture and a microarchitecture.

* * * * *